US012658993B2

(12) United States Patent
    Kaver et al.

(10) Patent No.:  US 12,658,993 B2
(45) Date of Patent:       Jun. 16, 2026

(54) MULTI-TIER DIGITAL BEAMFORMING

(71) Applicants:Innophase, Inc., San Diego, CA (US);
                Parallel Wireless, Inc., Nashua, NH
                (US)

(72) Inventors: Yaniv Kaver, Kefar Seva (IL); **Efi
                Dror, Kadima-Zoran (IL); Jongheon
                Kim, Irvine, CA (US); Yang Xu**, San
                Diego, CA (US)

(73) Assignees: Innophase, Inc., San Diego, CA (US);
                Parallel Wireless, Inc., Nashua, NH
                (US)

( * ) Notice:    Subject to any disclaimer, the term of this
                patent is extended or adjusted under 35
                U.S.C. 154(b) by 90 days.

(21) Appl. No.: 18/346,186

(22) Filed:      Jun. 30, 2023

(65)                Prior Publication Data

US 2024/0007159 A1       Jan. 4, 2024

Related U.S. Application Data

(60) Provisional application No. 63/357,576, filed on Jun.
     30, 2022.

(51) Int. Cl.
     H04B 7/06           (2006.01)
(52) U.S. Cl.
     CPC ................................. H04B 7/0617 (2013.01)
(58) Field of Classification Search
     CPC ...... H04B 7/0617; H01Q 3/36; H01Q 21/062;
                 H01Q 21/26; H01Q 21/28; H01Q 23/00
     See application file for complete search history.

(56)                References Cited

U.S. PATENT DOCUMENTS 7,035,323 B1 *   4/2006   Arato .................... H04L 25/14
                                                          375/222
    10,243,573 B1     3/2019   Goyal et al.
                               (Continued)

FOREIGN PATENT DOCUMENTS

CN        112994733 A      6/2021
     EP          3734865 A1    11/2020
                               (Continued)

OTHER PUBLICATIONS

International Search Report and Written Opinion for PCT/US2023/
069562, Oct. 19, 2023, 1-11 (11 pages).
                               (Continued)

*Primary Examiner* — Jean B Corrielus

(57)                  ABSTRACT
A method and apparatus for multi-tier beamforming are
disclosed. The method includes receiving a first-tier beam-
formed frequency-domain IQ data packet and a plurality of
second-tier beamformed frequency-domain IQ data packets
at a transceiver integrated circuit (IC) subarray. Each trans-
ceiver IC of the transceiver IC subarray (i) forms a multi-tier
beamformed frequency-domain IQ data set by combining
beamformed frequency-domain IQ data from the first-tier
beamformed frequency-domain IQ data packet with beam-
formed frequency-domain IQ data from selected ones of the
second-tier beamformed frequency-domain IQ data packets,
(ii) generates a discrete-time-domain signal from the multi-
tier beamformed frequency-domain IQ data set, and (ii)
generates a modulated radio frequency (RF) signal from the
discrete-time-domain signal. The method further includes
transmitting a multi-tier beamformed signal by transmitting
respective modulated RF signals from the transceiver ICs of
the transceiver IC subarray via a corresponding adjacent
antenna element subarray.

20 Claims, 19 Drawing Sheets

(56) References Cited

U.S. PATENT DOCUMENTS

| | | | |
|---|---|---|---|
| 10,263,330 | B2 | 4/2019 | Martikkala et al. |
| 10,389,411 | B2 | 8/2019 | Noam et al. |
| 10,756,443 | B1 | 8/2020 | Struhsaker et al. |
| 11,018,416 | B2 | 5/2021 | Bisiules et al. |
| 11,158,942 | B1 | 10/2021 | Scott et al. |
| 11,956,058 | B1 | 4/2024 | Abdelmonem |
| 2005/0012665 | A1 | 1/2005 | Runyon et al. |
| 2005/0287978 | A1 | 12/2005 | Maltsev et al. |
| 2006/0244675 | A1 | 11/2006 | Elliot et al. |
| 2011/0134972 | A1* | 6/2011 | Zhu .......................... H01Q 3/34 |
| | | | 375/219 |
| 2013/0116011 | A1 | 5/2013 | Lee et al. |
| 2014/0210666 | A1 | 7/2014 | Maltsev et al. |
| 2014/0370823 | A1 | 12/2014 | Yu |
| 2016/0072605 | A1 | 3/2016 | Kruecker et al. |
| 2016/0197660 | A1 | 7/2016 | O'Keeffe et al. |
| 2016/0240922 | A1 | 8/2016 | Veihl et al. |
| 2016/0352010 | A1 | 12/2016 | Haskell et al. |
| 2017/0063590 | A1 | 3/2017 | Dhananjay et al. |
| 2017/0085005 | A1 | 3/2017 | Aue et al. |
| 2017/0262398 | A1 | 9/2017 | Lugo et al. |
| 2018/0048063 | A1 | 2/2018 | Hallivuori |
| 2018/0059215 | A1 | 3/2018 | Turbiner et al. |
| 2018/0359018 | A1 | 12/2018 | Ling |
| 2019/0020400 | A1 | 1/2019 | Ling et al. |
| 2019/0089434 | A1 | 3/2019 | Rainish et al. |
| 2019/0349783 | A1 | 11/2019 | Barker et al. |
| 2020/0220613 | A1 | 7/2020 | Rutt et al. |
| 2020/0274591 | A1 | 8/2020 | Kumar et al. |
| 2021/0297131 | A1 | 9/2021 | Xu et al. |
| 2021/0314008 | A1 | 10/2021 | Törmänen et al. |
| 2021/0376837 | A1 | 12/2021 | Jacquet et al. |
| 2021/0391904 | A1 | 12/2021 | Jam et al. |
| 2022/0013921 | A1 | 1/2022 | Xu et al. |
| 2023/0155652 | A1 | 5/2023 | Pianka |

FOREIGN PATENT DOCUMENTS

| | | | |
|---|---|---|---|
| JP | 2007532031 | A | 11/2007 |
| WO | 2019098897 | A1 | 5/2019 |
| WO | 2024007025 | A1 | 1/2024 |

OTHER PUBLICATIONS

International Search Report and Written Opinion for PCT/US2023/069558, Nov. 2, 2023, 1-13 (13 pages).

International Search Report and Written Opinion for PCT/US2023/069557, Nov. 2, 2023, 1-9 (9 pages).

International Search Report and Written Opinion for PCT/US2023/069561, Oct. 23, 2023, 1-10 (10 pages).

International Search Report and Written Opinion for PCT/US2023/069560, Oct. 24, 2023, 1-11 (11 pages).

Fulton, Caleb, et al., "Digital Phased Arrays: Challenges and Opportunities", Proceedings of the IEEE, vol. 104, No. 3, Mar. 1, 2016, 487-503 (17 pages).

Zhou, Xiaoping, et al., "A Manifold Learning Two-Tier Beamforming Scheme Optimizes Resource Management in Massive MIMO Networks", IEEE Access, vol. 8, Jan. 6, 2020, 22976-22987 (12 pages).

International Search Report and Written Opinion for PCT/US2023/069556, Oct. 25, 2023, 1-13 (13 pages).

International Search Report and Written Opinion for PCT/US2023/085926, May 3, 2024, 1-10 (10 pages).

International Search Report and Written Opinion for PCT/US2023/085923, Apr. 4, 2024, 1-10 (10 pages).

International Search Report and Written Opinion for PCT/US2023/085924, May 6, 2024, 1-12 (12 pages).

\* cited by examiner

MULTI-TIER DIGITAL BEAMFORMING

CROSS-REFERENCE TO RELATED APPLICATIONS

This application claims the benefit of U.S. Provisional Application No. 63/357,576, filed Jun. 30, 2022, naming Yaniv Kaver, Efi Dror, Jongheon Kim, and Yang Xu as inventors, entitled "Multi-Tier Digital Beamforming in Transceiver Arrays", the entirety of which is hereby incorporated herein by reference for all purposes.

BACKGROUND

The present disclosure relates to the field of telecommunications, and more specifically to a distribution of signals for transmission over antenna radiating elements. It may find applications in the field of wireless communications such as 2G/3G/4G, LTE, LTE Advanced, and 5G, and the like.

This section is intended to introduce the reader to various aspects of art, which may be related to various aspects of the present disclosure that are described and/or claimed below. This discussion is believed to be helpful in providing the reader with background information to facilitate a better understanding of the various aspects of the systems and methods described herein. Accordingly, it should be understood that these statements are to be read in this light, and not as admissions of prior art.

SUMMARY

According to embodiments described herein, a method includes receiving a first-tier beamformed frequency-domain IQ data packet and a plurality of second-tier beamformed frequency-domain IQ data packets at a transceiver integrated circuit (IC) subarray having a plurality of interconnected transceiver ICs, the transceiver ICs interconnected via a plurality of serial data connections; and at each transceiver IC of the transceiver IC subarray: forming a multi-tier beamformed frequency-domain IQ data set by combining beamformed frequency-domain IQ data from the first-tier beamformed frequency-domain IQ data packet with beamformed frequency-domain IQ data from selected ones of the second-tier beamformed frequency-domain IQ data packets of the plurality of second-tier beamformed frequency-domain IQ data packets; generating a discrete-time-domain signal from the multi-tier beamformed frequency-domain IQ data set using a digital signal processor (DSP) within the transceiver IC; generating a modulated radio frequency (RF) signal from the discrete-time-domain signal; and, transmitting a multi-tier beamformed signal by transmitting respective modulated RF signals from the transceiver ICs of the transceiver IC subarray via a corresponding adjacent antenna element subarray.

In some embodiments of the method, receiving a first-tier beamformed frequency-domain IQ data packet and a plurality of second-tier beamformed frequency-domain IQ data packets at a transceiver integrated circuit (IC) subarray further comprises: forwarding the first-tier beamformed frequency-domain IQ data packet from a first transceiver IC of the transceiver IC subarray to additional transceiver ICs of the transceiver IC subarray for common processing; and, forwarding only a subset of the second-tier beamformed frequency-domain IQ data packets of the plurality of second-tier beamformed frequency-domain IQ data packets from the first transceiver IC to the additional transceiver ICs.

The subset of the second-tier beamformed frequency-domain IQ data packets is identified, in some embodiments, according to packet headers.

In some embodiments of the method, combining beamformed frequency-domain IQ data from the first-tier beamformed frequency-domain IQ data packet with beamformed frequency-domain IQ data from selected ones of the second-tier beamformed frequency-domain IQ data packets comprises concatenating beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. In some other embodiments, combining beamformed frequency-domain IQ data from the first-tier beamformed frequency-domain IQ data packet with beamformed frequency-domain IQ data from selected ones of the second-tier beamformed frequency-domain IQ data packets comprises forming a weighted sum of beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. The weighted sum is, in some embodiments, calculated according to beamforming weights received from a beamformer.

In further embodiments of the method, combining beamformed frequency-domain IQ data from the first-tier beamformed frequency-domain IQ data packet with beamformed frequency-domain IQ data from selected ones of the second-tier beamformed frequency-domain IQ data packets comprises: converting the beamformed frequency-domain IQ data from the first-tier beamformed frequency-domain IQ data packet to a first-tier beamformed time-domain signal; converting the beamformed frequency-domain IQ data from selected ones of the second-tier beamformed frequency-domain IQ data packets to a second-tier beamformed time-domain signal; and, adding the first-tier beamformed time-domain signal and the second-tier beamformed time-domain signal. The first-tier beamformed frequency-domain IQ data packet and the selected ones of the second-tier beamformed frequency-domain IQ data packets are, in some embodiments, associated with different component carriers.

Additionally, in some embodiments of the method, receiving the first-tier beamformed frequency-domain IQ data packet and a plurality of second-tier beamformed frequency-domain IQ data packets further comprises receiving second-tier beamformed frequency-domain IQ data packets for processing by transceiver ICs at an end of the transceiver IC subarray prior to receiving second-tier beamformed frequency-domain IQ data packets for processing by transceiver ICs at a beginning of the transceiver IC subarray.

In yet further embodiments of the method, transmitting the multi-tier beamformed signal further comprises transmitting respective modulated RF signals from transceiver ICs of a plurality of transceiver IC subarrays via a corresponding plurality of adjacent antenna element subarrays.

According to additional embodiments, an apparatus comprises a beamformer processor configured to generate a first-tier beamformed frequency-domain IQ data packet and a plurality of second-tier beamformed frequency-domain IQ data packets; a transceiver integrated circuit (IC) subarray connected to the beamformer processor and having a plurality of interconnected transceiver ICs interconnected via a plurality of serial data connections; and each transceiver IC of the transceiver IC subarray comprises: a digital signal processor (DSP) configured to form a multi-tier beamformed frequency-domain IQ data set and to generate a discrete-time-domain signal from the multi-tier beamformed frequency-domain IQ data set; a radio frequency modulator configured to generate a modulated radio frequency (RF) signal from the discrete-time-domain signal; and, an antenna element subarray connected to the transceiver IC subarray configured to transmit a multi-tier beamformed signal by transmitting respective modulated RF signals from the transceiver ICs of the transceiver IC subarray.

In some embodiments of the apparatus, the transceiver IC subarray comprises a first transceiver IC having a packet header processor configured to forward the first-tier beamformed frequency-domain IQ data packet from the first transceiver IC to additional transceiver ICs of the transceiver IC subarray for common processing and configured to forward only a subset of the second-tier beamformed frequency-domain IQ data packets from the first transceiver IC to the additional transceiver ICs. The packet header processor is configured, in some embodiments, to identify the subset of the second-tier beamformed frequency-domain IQ data packets according to packet headers.

In some embodiments of the apparatus, the DSP is configured to combine beamformed frequency-domain IQ data from the first-tier beamformed frequency-domain IQ data packet with beamformed frequency-domain IQ data from selected ones of the second-tier beamformed frequency-domain IQ data packets by concatenating beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. In some other embodiments, the DSP is configured to combine beamformed frequency-domain IQ data from the first-tier beamformed frequency-domain IQ data packet with beamformed frequency-domain IQ data from selected ones of the second-tier beamformed frequency-domain IQ data packets by forming a weighted sum of beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. The DSP is configured, in some embodiments, to calculate the weighted sum according to beamforming weights received from the beamformer processor.

In further embodiments of the apparatus, the DSP is configured to: convert the beamformed frequency-domain IQ data from the first-tier beamformed frequency-domain IQ data packet to a first-tier beamformed time-domain signal; convert the beamformed frequency-domain IQ data from selected ones of the second-tier beamformed frequency-domain IQ data packets to a second-tier beamformed time-domain signal; and, add the first-tier beamformed time-domain signal and the second-tier beamformed time-domain signal.

In some embodiments, the apparatus further comprises a packet header processor configured to identify separate component carriers associated with the first-tier beamformed frequency-domain IQ data packet and the selected ones of the second-tier beamformed frequency-domain IQ data packets. Additionally, in some embodiments, the beamformer processor is configured to transmit the second-tier beamformed frequency-domain IQ data packets for processing by transceiver ICs at an end of the transceiver IC subarray prior to transmitting second-tier beamformed frequency-domain IQ data packets for processing by transceiver ICs at a beginning of the transceiver IC subarray.

Additionally, in some embodiments, the apparatus further comprises: a plurality of transceiver IC subarrays and a corresponding plurality of adjacent antenna element subarrays, configured to transmit the multi-tier beamformed signal.

References in the specification to "one embodiment," "an embodiment," "an example embodiment," and the like indicate that the embodiment described may include a particular feature, structure, or characteristic; but not every embodiment necessarily includes that particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described.

DETAILED DESCRIPTION

Figure 1:
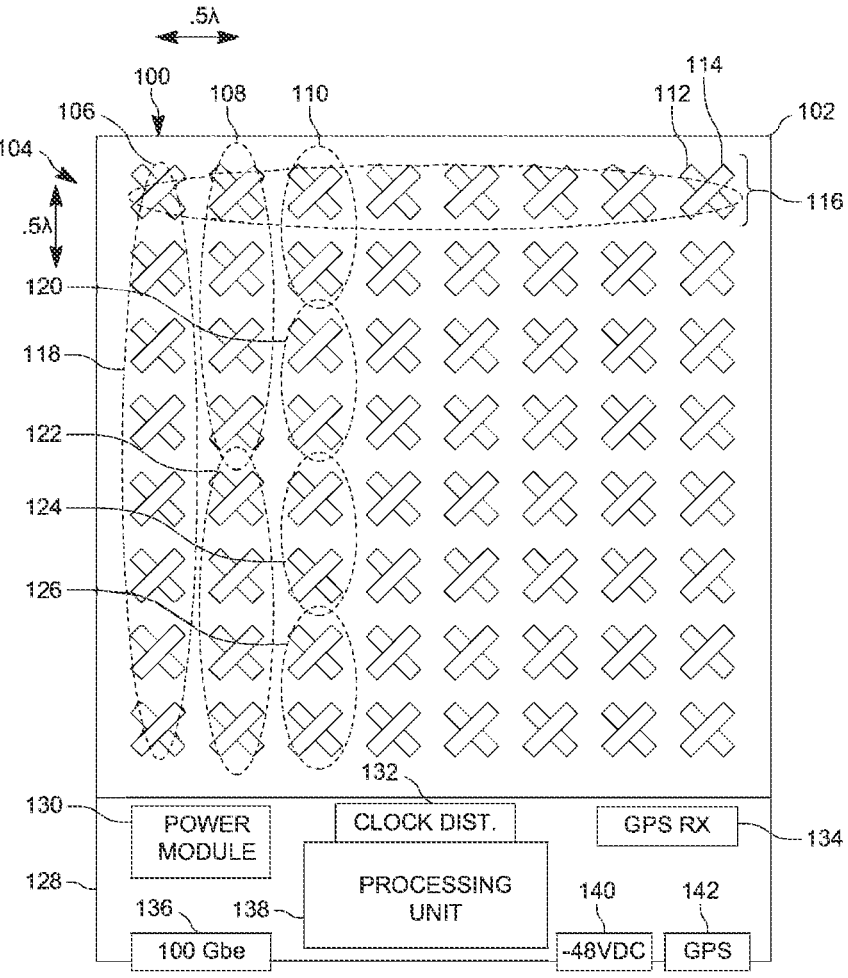
FIG. 1 depicts one embodiment of an active antenna array assembly, or active antenna unit (AAU) in accordance with some embodiments.

FIG. 1 depicts an antenna array assembly 100, in accordance with some embodiments. As depicted, the antenna array assembly 100 has a grid of radiating elements (also referred to herein as antenna elements or antenna radiating elements) generally arranged in rows (e.g., a row 104) and columns (e.g., a column 100) on a panel 102, which may be a printed circuit board (PCB) or other suitable support structure for the radiating elements. Locations within the grid, such as a location 116, may have collocated radiating elements such as elements 112 and 114, to provide different radiating polarizations, typically referred to as horizontal and vertical polarities, or equivalently, plus 45 degrees (+45°) and minus 45 degrees (−45°). The grid of radiating elements may be arranged in a regular array pattern as shown in FIG. 1. In one embodiment the radiating elements are positioned at approximately ½ wavelength (λ) distance apart, where the wavelength λ is associated with the desired frequency operating range of the antenna array, which may be associated with a carrier frequency of the system or, more generally, a center frequency of the system, especially in embodiments employing a frequency division duplex system (FDD) utilizing multiple carrier frequencies. Some embodiments may operate within multiple frequency bands, and in one such embodiment, an array such as that shown in FIG. 1 may be configured to operate within a first band using a first frequency with wavelength $\lambda_1$, and to operate in a second frequency band having a wavelength $\lambda_2=2\lambda_1$. In such an embodiment, operation in the first band ($\lambda_1$) may utilize adjacent antenna radiating elements spaced apart by distance $0.5\lambda_1$ as shown, but for operation in the second, lower frequency band (having wavelength $\lambda_2$), elements spaced two apart (e.g., every other row, or every other column) have a spacing of $0.5\lambda_2$, and therefore may be used for operation in the second frequency band.

Although the antenna array panels may be configured with more antenna pairs (e.g., 128, 194, 256, 512, etc.) or even fewer antennas (e.g., 32, 16, etc.), the specific array of FIG. 1 depicts 64 horizontal radiating elements and 64 vertical radiating elements that are pair-wise collocated and arranged in an 8×8 square configuration on a panel approximately 35-40 centimeters by 35-40 centimeters, where the radiating elements are spaced approximately 4.3 centimeters apart. The antenna array assembly 100 also includes a circuit board assembly 128 including a power module 130, a clock distribution circuit 132, a global positioning satellite (GPS) receiver 134, a processor circuit 138 for performing, inter alia, packet protocol processing, and in some embodiments, beamforming, a network data interface 136, power supply connector 140 and GPS connector 142.

In various embodiments as described herein below, the radiating elements may be grouped into subarrays such as the column subarray 106 having eight vertical radiating elements and eight horizontal radiating elements, or smaller subarrays such as grouping 108 and 122 each having four horizontal and four vertical elements, or groupings 110, 120, 124, 126, each having two vertical and two horizontal radiating elements. In some embodiments, antenna subarrays may comprise a two-dimensional set of elements, such as four cross-polarized radiating elements arranged in a square configuration, or six cross-polarized pairs arranged in a 2×3 grid. Alternatives include a set of two or more adjacent vertical polarized elements forming one antenna element subarray, and the corresponding set of vertical polarized elements of the cross-polarized pairs forming a separate subarray. In a further embodiment each cross-polarized pair of radiating elements may be individually driven array elements.

Each subarray of radiating elements may be driven by a radio frequency (RF) signal generated by a set of transceivers located adjacent to the antennas. As used herein, the term "antenna subarray" refers to a grouping of radiating elements that are positioned in a corresponding array pattern that are functionally interrelated primarily according to their connections to a corresponding set of cooperative RF transceiver integrated circuits (ICs) that are used to process the RF signals associated with the radiating elements of the antenna subarray. In such a case, the transceiver circuits comprise a set, or group, of serially-connected transceiver integrated circuit packages (referred to hereinafter as "transceiver ICs"), that have a first transceiver IC connected via a serial data connection (or "link") to a beamformer processor, and a series of point-to-point serial data connections between the transceiver ICs, where, in some embodiments, the data path terminates at the last transceiver IC of the group. In an alternative embodiment, the transceiver ICs may be interconnected in a ring configuration where the last transceiver IC in the chain may be connected either back to the beamformer processor with an additional serial data connection, or may be connected to the last transceiver IC in a separate subarray chain of serially-connected transceiver ICs.

Note that in some embodiments, a given group of transceiver ICs in a transceiver IC subarray (i.e, a set of serially-connected transceiver ICs) that is associated with a corresponding antenna subarray may be capable of processing independent RF signals for each radiating element. Thus, as used herein, the term "antenna subarray" refers to that set of antenna elements (of a possibly larger antenna element array) that is associated with a given set of transceiver ICs. In some embodiments described herein, a group of radiating elements may act in a coordinated fashion by transmitting the same or similar RF signals (or set of RF signals for H and V polarizations) with possible phase differences between them so as to achieve a desired radiation pattern for beam-forming, antenna tilt, or similar directionality.

Figure 2:
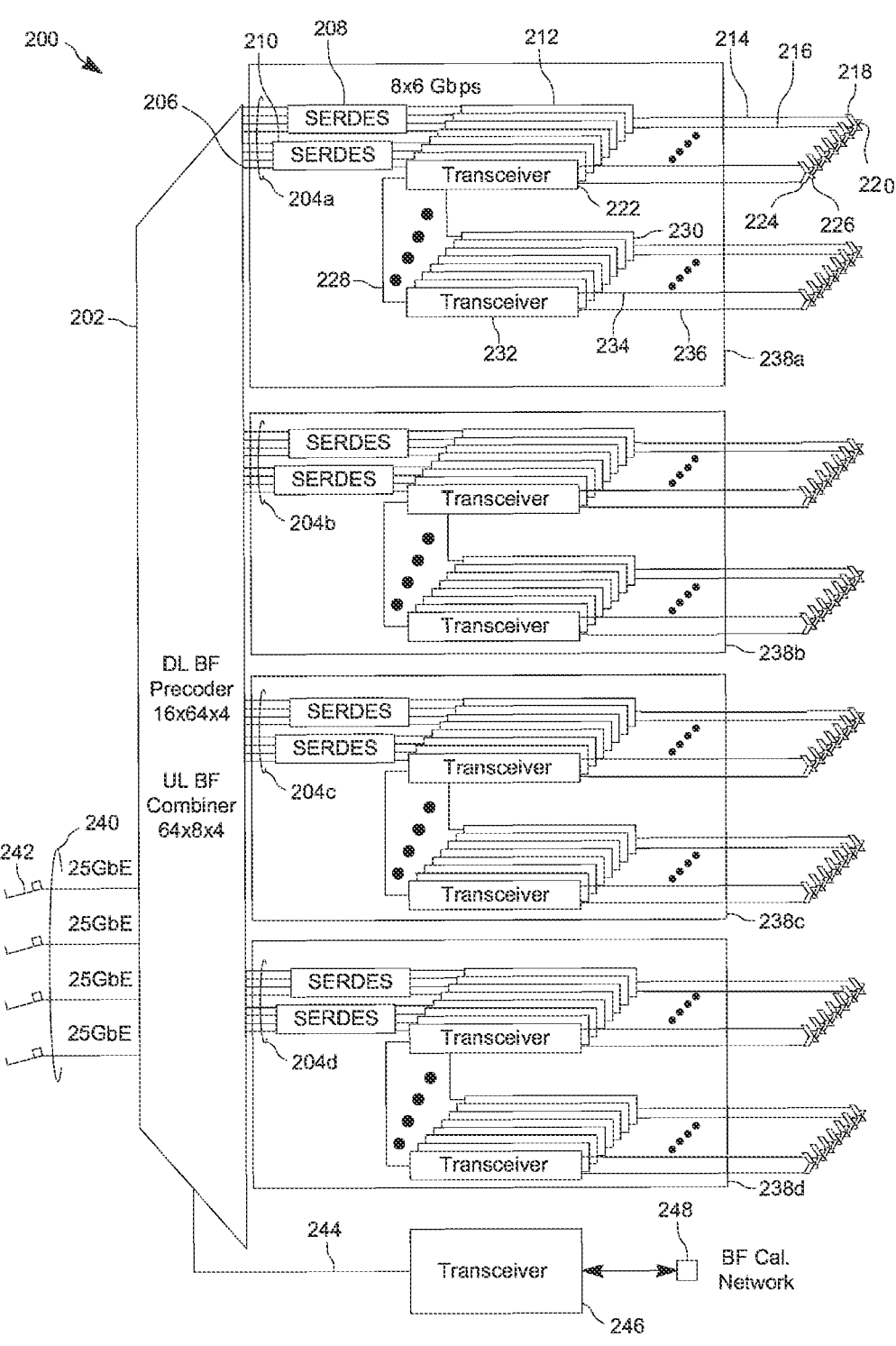
FIG. 2 depicts a radio unit architecture having a plurality of groups of serially connected transceivers used to process RF communication signals associated with corresponding groups of antenna radiating elements, in accordance with some embodiments.

FIG. 2 depicts a radio unit architecture having a plurality of groups of serially-connected transceivers used to process RF communication signals associated with corresponding groups of antenna radiating elements, in accordance with some embodiments. As shown in FIG. 2, each serially-connected transceiver IC group contains at least two serially-connected transceiver ICs being physically arranged in a transceiver IC subarray. Specifically, a transceiver IC 222, which is connected to a beamformer processor (referred herein, in some places, as "BFP") 202 over a serial data link 206, is also serially connected to a transceiver IC 232 via a full-duplex serial data link 228, thereby forming a vertically-oriented transceiver IC subarray along a column of the panel array, such as a grouping 110. Similarly, a transceiver IC 212 is connected to a transceiver IC 230, forming another transceiver IC subarray.

Each serial data link between transceiver ICs (e.g., 228) utilizes a Serdes (SERializer/DESerializer) transceiver or set of Serdes transceivers to establish the point-to-point links. In one embodiment, each transceiver IC includes two such Serdes transceivers. Alternatively, a higher number of Serdes devices may be included to provide a higher level of interconnectivity among the transceiver ICs. The Serdes may utilize a standard serial data signaling format, such as 2-level pulse-amplitude-modulated (PAM2) non-return to zero (NRZ) differential signal transmitted on a pair of conductors. In one embodiment, a data rate of 6 G bits-per-second (Gbps) PAM2 is sufficient to convey aggregated signal-port IQ data packets (including headers), as well as to provide additional throughput capacity for transmitting control-plane messaging to the transceiver ICs. Serial link data rates may be selected to accommodate the data packets to and from the individual transceiver IC subarrays according to the desired deployment, including a desired number of independent signal ports, a desired number of component carriers, multi-band operation (thereby adding further carriers), FDD or TDD, the number of transceiver ICs connected in the transceiver IC subarray, etc.

Additionally, as will be described in more detail below, in various embodiments, each serial data link between the beamformer processor 202 and a given transceiver IC subarray, as well as serial data links serially interconnecting individual transceiver ICs within the given transceiver IC subarray, may have sufficient data rates to accommodate data packets carrying IQ data that is in either the frequency domain or the time domain. In this regard, as will be described in greater detail, each transceiver IC subarray may, e.g., (i) receive/transmit an aggregated frequency-domain IQ data packet to/from the beamformer processor if frequency-to-time domain conversion (on the transmit side) and time-to-frequency domain conversion (on the receive side) is carried out at an individual transceiver IC (e.g., via the iFFT (inverse fast-Fourier Transform) and FFT (Fast Fourier Transform) processing, respectively) or (ii) receive/transmit an aggregated time-domain IQ data packet to/from the beamformer processor if frequency-to-time domain conversion (on the transmit side) and time-to-frequency domain conversion (on the receive side) is instead carried out at the beamformer processor (e.g., via the iFFT and FFT processing, respectively).

As one illustration of a serial link date rate, one symbol of a 100 Mhz OFDM 5G carrier with 30 KHz subcarrier spacing would be transmitted in a 33.33 microsecond (usec) time window. The data rate required for such a transmission on two signal ports (e.g., separate signals for H and V polarizations), having 3,300 subcarriers, with 2 samples per subcarrier (I/Q), having, e.g., 12 bits/sample, results in 2*3,300*2*12=158.4 kbps for each of 14 OFDM symbol time slots, 14 of which will be transmitted in a 0.5 milli-second transmission slot, resulting in a net required data rate of 158.4k*14 bits/0.5 millisceonds=4.43 Gbps. If 8b-10b encoding is used on the serial data links, and an additional 10% is added for packet header and protocol overhead, then a throughput of approximately 1.1*4.43*10/8 Gbps=6.1 Gbps would be required per carrier, for a dual signal port. In some embodiments, a serial data transmission capacity of 6.1 Gbps for each transceiver IC subarray, (i.e., a set of serially-linked transceiver ICs) is sufficient. For other embodiments having independently controlled signal ports at each transceiver IC, a total throughput on the order of 12 Gbps, or even 20 Gbps is sufficient for most applications and configurations as described herein, although 30 Gbps may be achieved if desired for certain other embodiments.

For a lower-capacity deployment, a lower serial data rate is sufficient. For example, a dual polarized 20 MHz 4G LTE data signal, utilizing a size 2,048 FFT, occupying a 66.67 usec transmission slot time window, requires a data through-put of: 2 ports*1,200 subcarriers×2 (I/Q samples/subcarrier)×12 (bits/sample)/66.67 μsec window=1,200×2×12×/ 66.67 μsec=approximately 864 Mbps. If the data rate is increase by 10/8 to accommodate 8b-10b encoding, and 10% for overhead, the data rate is approximately 1.2 Gbps.

In a further embodiment of the transceiver IC serial data ports, a four-wire interface may be used to double the data rate. Alternatively, so-called ensemble NRZ (ENRZ) signaling, using correlated signals in the form of vector signal codes, may be sent over the four wires to carry 3 bits/baud (i.e., per signaling interval), resulting in a tripling of the data rate (at the same baud rate) rather than a mere doubling. Thus, using a 7.5 G baud/sec signaling rate, data throughput of 22.5 Gbps may be reliably achieved across the distances from the beamformer to the transceiver IC subarrays. As a further alternative, PAM4 signaling may be used (in combination with NRZ or ENRZ signaling), or other vector signal formats (e.g., correlated NRZ (so-called CNRZ-5), using correlated signals to convey 5 bits over six wires) to provide increased data throughput without large increases in signaling baud rates.

In its entirety, FIG. 2 depicts a total of 8 columns of transceiver ICs, each column having 8 transceiver ICs for a total of 64 transceiver ICs, where each transceiver IC is configured to process two separate transmit signals (e.g., different RF signals on H and V signal ports) and two separate receive signals (H/V signal ports). However, because in the embodiment of FIG. 2, the first two rows of 8 transceiver ICs are pair-wise connected, these 16 transceiver ICs form a single "row" 238a of 8 transceiver IC groups, also referred to herein as transceiver IC subarrays. Similarly, the other transceiver ICs are grouped into 3 more "rows" (238b, 238c, 238d) of 8 transceiver subarrays each, for a total of 8 columns×4 rows of transceiver IC groups (32 transceiver IC subarrays). In physical dimensions, each column is the width associated with a single collocated cross-polarized antenna, but each "row" of transceiver IC groups encompasses two rows of cross-polarized antenna elements.

Figure 4:
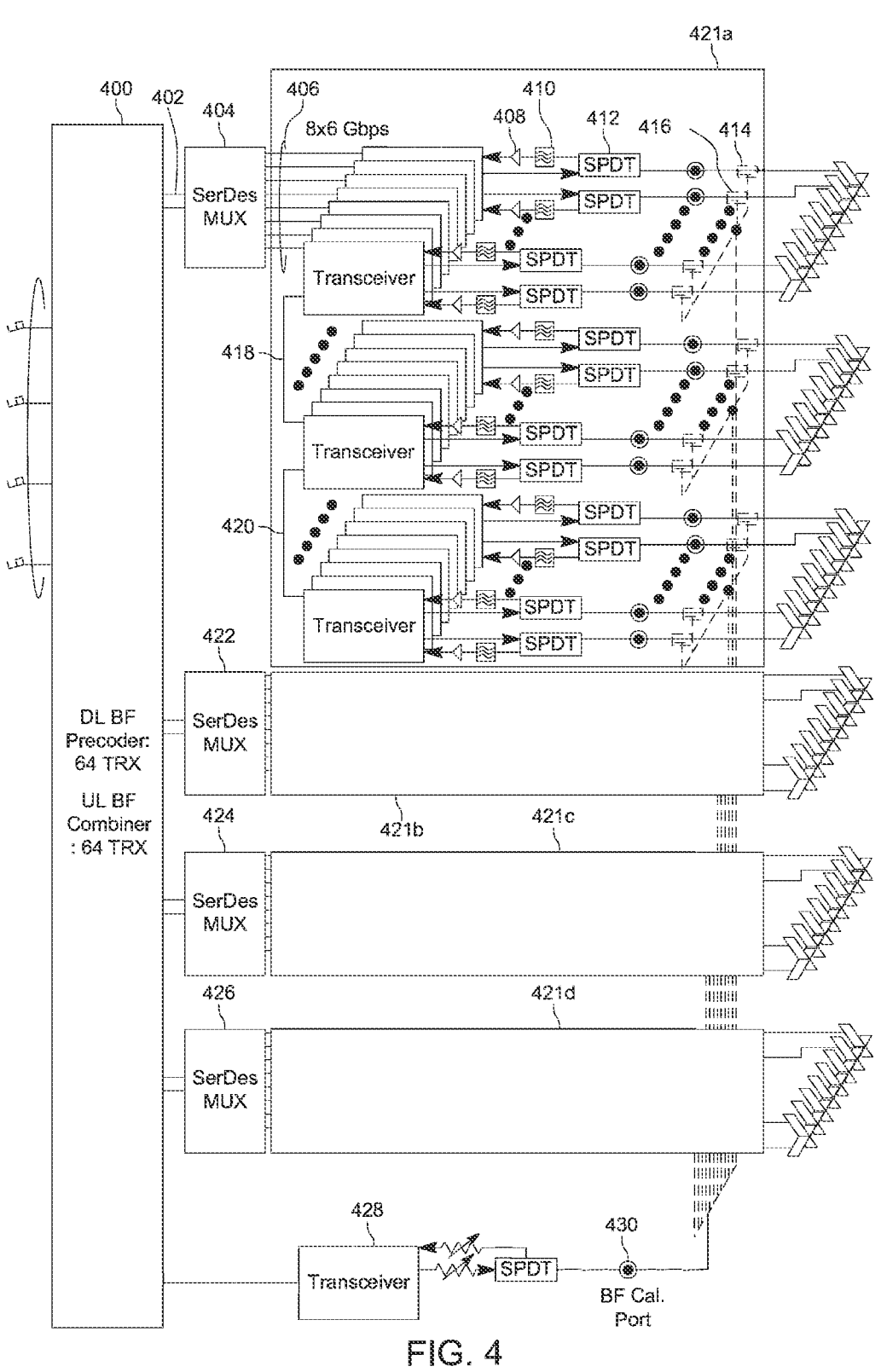
FIG. 4 is an alternative embodiment of a radio unit architecture having a hierarchical data distribution topology to the respective groups of serially connected transceivers.

FIG. 4, described further herein below, also depicts 32 transceiver IC subarrays in an 8×4 transceiver IC subarray configuration. However, each transceiver IC subarray comprises three serially-connected transceiver ICs. Note that the transceiver IC subarrays are positioned element-wise adjacent to corresponding radiating antenna elements arranged in a corresponding antenna subarray. In some embodiments, the transceiver IC subarrays are positioned on the backside of the antenna array panel 102, but still adjacent (i.e., in close proximity) to the respective radiating elements used to transmit and/or receive the RF communication signals associated with the given transceiver IC. In some embodiments, the transceiver ICs may be coupled to the radiating elements through vias, intermediate structures, and/or circuits, such as transmit and receive filters mounted on the panel, or on subpanels positioned behind the structure supporting the array(s) of antenna radiating elements.

Element-wise adjacency refers to the relative positioning of the transceiver IC subarrays and the corresponding antenna subarrays being superimposed with each other, such that each individual transceiver IC of the given transceiver IC subarray is positioned in a region of the panel 102 associated with the corresponding antenna radiating elements of the antenna array or subarray that will be used to transmit and receive the signals associated with that individual transceiver IC.

As a further example of element-wise adjacency, in some embodiments, such as a frequency division duplex (FDD) system, two transceiver ICs (one dedicated for generating two transmit (H/V) signals at a transmit frequency, the other for processing two receive (H/V) signals at the receive frequency) may form a transceiver IC subarray that is associated with an antenna subarray consisting of a single collocated cross-polarized antenna. In a dual-band FDD configuration, four transceiver ICs may be linked as a transceiver subarray and positioned adjacent to an antenna subarray consisting of a single collocated cross-polarized antenna.

The feature of element-wise adjacency provides for a distributed transceiver IC architecture that allows the amplified transmit RF signals generated by each given transceiver IC to suffer very little power loss or noise degradation as it traverses the very short physical connection from the transceiver IC to the radiating elements. In some embodiments, different ratios of transceiver ICs and radiating elements may be pair-wise adjacent, such as two transceiver ICs may be placed adjacent to each set of three cross-polarized elements, etc.

Throughout this description, many embodiments are depicted utilizing transceiver ICs (e.g., 212, 222, 230, 232, etc.) that include two independent full-duplex transceivers comprising two transmitters/amplifiers and two independent receivers, each transceiver associated with an RF signal port (e.g., 214 or 216) that is interconnected to a respective antenna radiating element (e.g., 218, 220, respectively). Thus, in one embodiment, a single transceiver IC comprises an integrated circuit having two full transceivers that transmit and receive two independent RF signals, configured such that one RF signal port (tx/rx) is associated with an H-polarized signal port (e.g., 214) and one RF signal port (tx/rx) is associated with a V-polarized signal port (e.g., 216). In such embodiments, each transceiver IC may be referred to as a 2T2R transceiver IC, and may be associated with a pair of collocated cross-polarized radiating elements. As illustrative examples, each cross-polarized pair of radiating elements (218, 220); (224, 226); and (234, 236) is associated with a respective single transceiver integrated circuit, such as the transceiver IC 212 associated with cross-polarized radiating elements (218, 220), the transceiver IC 222 associated with elements (224, 226), and the transceiver IC 232 associated with elements (234, 236).

In other embodiments, the transceiver ICs may each be configured to provide, e.g., four separate analog RF transmit and receive paths through four independent signal ports (4T4R). Such embodiments may include dual PLLs for generating carrier frequencies of both a transmit carrier and a receive carrier for full utilization of the transceiver IC when operating in an FDD signaling mode. The specific number of transceivers contained within a given transceiver IC may depend on such factors as total desired output power of the panel, the use of additional external power amplifiers, FDD or TDD operation, the data carrying capacity of the serial data links that provide interconnections between the transceiver ICs, as well as many other factors.

More generally with reference to FIG. 2, the circuitry of Radio Unit 200, all of which may be deployed within a single active antenna panel assembly, includes a high-throughput packet-based interface 252 to a base station or Distributed Unit (DU) (not shown). The interface 252 may comprise a plurality of separate physical network interfaces, such as four separate 25 Gbit ethernet links provided over fiber optic cables using small form factor pluggable (SFP) modules 242, or quad SFP (QSFP) modules. The ethernet protocol, the CPRI/eCPRI protocols, or similar protocols may be used to convey data across the interface 240. The beamformer processor (BFP) 202 performs precoding and beamforming operations for downlink transmit data, and responsively generates aggregated signal-port IQ data packets for transmission to the respective transceiver IC subarrays, as further described below with reference to FIGS. 8, 9 and 10. As noted above, in some embodiments, the IQ data packets may contain frequency-domain IQ values for subcarriers within an OFDM (Orthogonal Frequency Division Multiplexing) communication system, such as LTE, or 5G, communication systems. In other embodiments, the IQ data packets may instead contain time-domain IQ values for subcarriers within the OFDM communication system, or for other carriers such as 2G GSM signals. In the uplink direction, the BFP 202 performs beamformer combining to obtain the virtual beamformed antenna port signals, and further combining to recover user data layers, as further described below with respect to FIG. 11.

In the embodiment depicted in FIG. 2, the beamformer processor 202 is connected to each transceiver IC subarray via a serial data link such as the link 206. Depending upon the length of the data links, depicted as 4 sets 204a, 204b, 204c, 204d of 8 links each, each data link may utilize a Serdes repeater/retimer, 208, 210, to extend the range of the serial data link from the BFP 202 to the regions of the panel 102 where the given transceiver IC subarrays (and corresponding antenna subarray elements) are located. In an alternative embodiment shown in FIG. 4, the BFP 400 is connected to a set of transceiver IC subarrays over a high-speed Serdes link 402, whereupon a Serdes multiplexer (MUX) 404 (and respective high-speed links to Serdes MUXs 422, 424, 426) de-multiplexes (i.e., separates) the high-rate serial data streams into lower-rate serial data streams 406 directed to each individual transceiver IC subarray. The Serdes MUX devices 404, 422, 424, 426 perform the reverse multiplexing operation for uplink data being conveyed from the transceiver IC subarrays to the BFP 202.

Referring to FIG. 2, one example transceiver IC subarray comprises the transceiver IC 222 and the transceiver IC 232, which are coupled via the serial data link 228. These two transceiver ICs are located adjacent to their respective antenna radiating elements 224, 226 and 234, 236, respectively. In some embodiments, they are placed on one side of a PC board, in close proximity to the antenna elements, and electrically connected using a thru-via, or by intermediate circuit elements such as a filter, biplexer, quadriplexer, SPDT (single-pole double-throw) TDM switch, etc. As shown in FIG. 2, each transceiver IC generates two separate RF transmit downlink (DL) signals for H and V polarities, and receives and process two separate RF uplink (UL) signals. Also depicted is an observation transceiver 246 connected to the BFP 202 by a serial data link 244, with RF signal connections 248 being interconnected with each transceiver over a calibration network.

Figure 3:
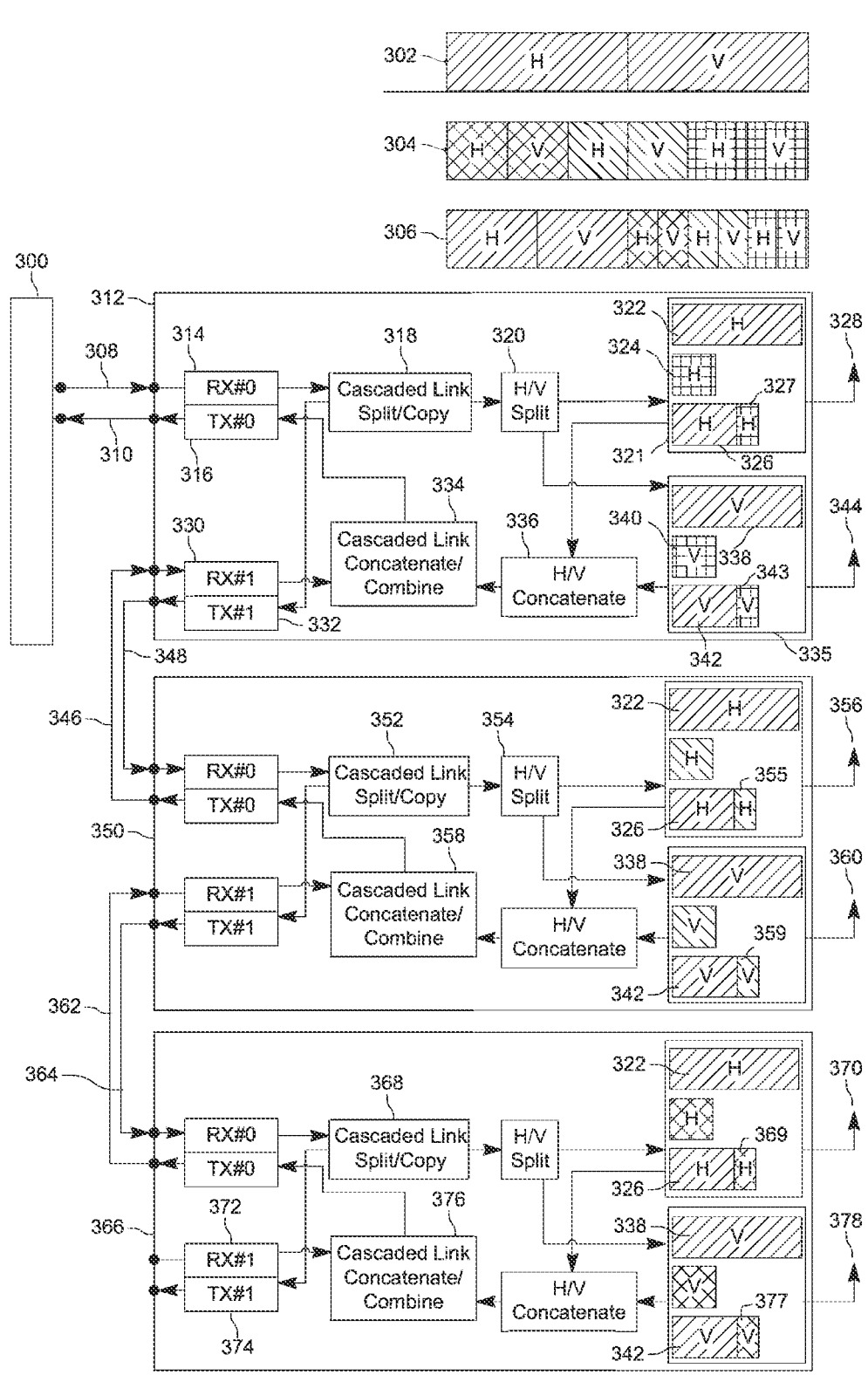
FIG. 3 depicts one group of serially-connected transceivers where incoming packets for transmission are received at a first transceiver and are propagated through serial data connections to the other transceivers in the group, and where incoming RF signals are processed and packetized for forwarded back along the serial transceiver chain, in accordance with some embodiments.

FIG. 3 depicts one such group of serially-connected transceivers that would be placed in a transceiver IC sub-array position, element-wise adjacent to antenna radiating elements of a corresponding antenna subarray positioned within the antenna panel array 102. Incoming packets for DL transmission are received over a serial data link 308 from a BFP 300 at a first transceiver IC 312, and at least some of the packets are propagated through serial data connections 348, 364 to the other transceiver circuits in transceiver ICs 350, 366 in the transceiver group. Similarly, incoming RF signals on the UL are processed and packetized for forward-ing back along a serial data transceiver IC chain 362, 346, 310. In this embodiment, each transceiver IC is configured to process two separate transmit signal paths and two separate receive signal paths, through two separate signal ports, typically associated with two corresponding antenna radiating elements. The transceiver subarray of FIG. 3, operating in a TDD mode, is configured such that the transceiver IC 312 transmits and receives RF signals on a first signal port 328, and transmits and receives RF signals on a second signal port 344. Similarly, the transceiver IC 350 is associated with signal ports 356 and 360, while the transceiver IC 366 is associated with signal ports 370 and 378.

As previously described, the two transceiver signal ports for a transceiver IC may be interconnected to a single set of cross-polarized antenna elements. For TDD operation, this provides 2T2R (two transmit, and two receive) signal pro-cessing capacity. In an alternative embodiment, the two signal ports may each be connected to corresponding radi-ating elements in two different cross-polarized antenna pairs, e.g., where a first transceiver of the transceiver IC processes transmit and receive signals for a vertical polar-ized element of first cross-polarized radiating element pair, while the second transceiver of the same transceiver IC processes transmit and receive signals for the vertical polar-ized element of a second cross-polarized radiating element pair. A second transceiver IC may then be used to process signals associated with the two horizontal-polarized ele-ments of the two cross-polarized pairs.

In further alternative embodiments, the output of each signal port may be split and connected to a plurality of radiating elements in parallel, such as one signal port being connected in parallel to the vertical polarized radiating elements of two (or three, etc.) cross-polarized pairs, and the other signal port being connected in parallel to the horizontal polarized radiating elements of the same two (or three, etc.) cross-polarized pairs. In still further embodiments described herein below, the amplified RF signals generated by a transceiver IC, or by a plurality of transceiver IC's, maybe provided to additional amplifier stages external to the trans-ceiver IC, and/or combined, before being provided to the radiating element(s).

In some embodiments, for example, frequency domain I/Q data packets are transmitted to sets of serially-connected transceiver ICs distributed on an active antenna panel. The aggregated data packets are a superposition of frequency domain subcarrier-specific data, typically representing allo-cated resource blocks (RBs) across many data layers and possibly many users, with different beamforming weights applied, and thus contain fully beamformed (including MIMO precoding when used) subcarrier IQ sample data for a designated band, component carrier and signal port. Each IQ data packet may have a single header, but nonetheless include concatenated or interleaved data for multiple signal ports, such as for H and V signal ports. Such packets may be referred to as a dual-signal port packets. In some embodi-ments, the packet header may include identification data associated with a particular transceiver IC, and may include IQ data for any number of signal ports that are processed by that transceiver IC, and may generally be referred to as multi-signal port data.

The user-aggregated frequency domain data of packet 302 in FIG. 3, indicates a frequency domain IQ data packet that is commonly processed by the transceiver ICs in a given transceiver IC subarray. Packet 302 may include a header (not shown, for clarity) that identifies various aspects of the type of data contained in the packet, as well as packet identification data such as one or more of: a frequency band ID, a component carrier ID, a signal port ID, and/or a transceiver ID. The primary payload data in the packets 302 comprise subcarrier-specific IQ data for a signal port (with-out limitation, a horizontal-polarized RF signal for, e.g., a specific component carrier, labeled "H" in FIG. 3). The same packet (or, in some embodiments, a separate packet with a separate header and ID data fields), includes subcarrier IQ data for a second signal port (e.g., a vertical-polarized RF signal for, e.g., the same component carrier, labeled "V" in FIG. 3). In numerous embodiments described herein, a single transceiver IC is configured to process two separate signal port IQ packets, and the corresponding IQ data for the two signal ports may be combined in a single packet with a single header, and may be referred to herein from time to time as a "dual signal port packet". The packet 302 is depicted as concatenated IQ data sets for subcarriers of the H polarized signal port, and for the V polarized signal port, but the IQ data may also be interleaved, such as an IQ sample pair for the H signal port, and a pair for the V signal port, for subcarrier 1, followed by IQ pairs for H and V for subcarrier 2, etc. Each I and Q sample may be represented as some number of bits, such as 12, 14 or 16, etc., depending upon the desired signal resolution. The packet 302 may contain IQ sample data for a number of subcarriers such as 612, 1,596, 3,276, or more, subcarriers, for each signal port, for specific carriers, and frequency bands.

As noted above, aggregated beamformed IQ data packets communicated over serial data connections (links) from/to a BFP (beamformer processor) and between and among trans-ceiver ICs may contain either frequency-domain (subcarrier-specific) IQ data or time-domain (subcarrier-specific) IQ data. In this regard, it should be noted that packet data transmissions of aggregated beamformed frequency domain IQ data packets over the serial data connections from/to the BFP and between and among transceiver ICs is more effi-cient than packet data transmissions of aggregated beam-formed time-domain IQ data. In particular, frequency-do-main IQ data specifies in-phase and quadrature (IQ) values for specific subcarriers that are to be used in the transmission (and reception) of data in a given communication system. However, for DL signals, such as in a OFDM communica-tion system (e.g., LTE or 5G communication system), prior to converting frequency-domain IQ data to time-domain digital data via iFFTs, zero values may need to be inserted in the IQ data set to account for unused sub-carriers within a given component carrier (e.g., subcarriers used as guard bands), thereby resulting in a time domain sequence of converted IQ data having many more IQ data points that need to be conveyed to the transceiver ICs/transceiver IC subarrays (e.g., originally conveyed from the BFP and then distributed accordingly between the transceiver ICs in a given transceiver IC subarray). Similarly, for UL signals, frequency-domain IQ data processed via FFTs may exclude frequency domain values for unused subcarriers, whereas the equivalent time-domain IQ data associated with unused subcarriers is a constituent part of the time-domain IQ data that may not be removed prior to transmission of the time-domain data over the serial data connections as described herein.

In this regard, depending on a bandwidth of a given communication channel, an increase in an efficiency of communicating frequency-domain IQ data over the corresponding time-domain IQ data may be of relative importance. By way of example, for a 20 MHz-wide LTE channel, a ratio of unused subcarriers to data-modulated subcarriers will be larger than a similar ratio for a 100 MHz-wide LTE channel. Accordingly, it becomes more efficient to communicate subcarrier-specific IQ data in the frequency-domain rather than in time domain. More specifically, as discussed above, even if a subset of subcarriers remains unused (not modulated/loaded with data), time-domain representation of those subcarriers will still result in complex time-domain samples, thereby increasing the amount of data that needs to be transmitted over serial data links. Additionally, serial data links between the BFP and transceiver IC subarrays, as well as serial data links interconnecting individual transceiver ICs in a given transceiver subarray, may have limited data-carrying capacity (e.g., how much data can be communicated over those links per given period of time (data rate)). Hence, in some embodiments, it may be more desirable to carry out IQ packet data transmissions from/to the BFP and between and among transceiver ICs in the frequency domain.

Nonetheless, various embodiments of the signal processing methods and apparatus described herein may utilize time-domain IQ data packets instead. More particularly, as will be described in more detail, in some embodiments, a beamforming processor (BFP) (e.g., the BFP 202, 300, 400, etc.) may be configured to include digital signal processing architecture (e.g., iFFT and FFT processing elements) to transmit and receive time-domain IQ data packets from/to transceiver ICs/transceiver IC subarrays. For instance, in some embodiments, the beamforming processor may include a digital signal processor (DSP) configured with suitable programming instructions to execute algorithms for iFFT and FFT operations. For purposes of illustration, various principles of operation in connection with the arrangement illustrated in FIG. 3 may be discussed below assuming, e.g., that IQ data packets communicated to/from the BFP 300 and between the individual transceiver ICs are frequency-domain IQ data packets.

The transceiver subarray depicted in FIG. 3 is one of many such subarrays on a panel, and each serially-connected transceiver IC group receives a unique data stream of the aggregated signal-port (or dual-signal-port, or multi-signal-port) IQ data packets. Recall that each serially-connected transceiver IC group has at least two serially-connected transceiver ICs, and is physically arranged in a transceiver IC subarray. The transceiver IC subarray, in turn, is positioned element-wise adjacent to corresponding radiating antenna elements arranged in a corresponding antenna subarray.

Transceiver IC 312 receives the unique data stream of aggregated signal-port IQ data packets, such as the user-aggregated frequency domain data of packet 302 (as noted above), at the serial port receiver 314 and provides the data to split-copy register 318 for further processing. In one embodiment, the split-copy register 318 is a packet header processor configured to examine the packet header to determine if the IQ data is intended for processing by its corresponding transceiver IC, and if so forwards the packet to the signal-port split processor 320. The signal-port split processor 320 (also labeled H/V Split) identifies packets or portions of packets that are destined for different signal ports within the transceiver IC, and which may be H and V polarized signals, or other configurations as described herein. The signal-port split processor 320 may be implemented as a register that performs a memory write operation to a digital signal processor (DSP) memory space integrated within the transceiver IC 312. In addition, the split-copy register 318 may determine that the same packet should also be forwarded to the next transceiver IC in the transceiver IC subarray for processing by one or more of the serially-connected transceiver IC's. To reduce latency, the packet header processor, or split-copy register, 318 need not buffer an entire signal-port IQ data packet prior to making a determination to forward the packet to the next transceiver IC by sending the data to serial data transmitter 332 for transmission over serial link 348. In further embodiments, the packet header processor 318 may be configured to operate in transparent mode, where all packets are both saved for local processing and forwarded without header inspection out the second serial transceiver.

With respect to the signal-port packet format 302, the aggregated IQ signal-port packet is forwarded to each transceiver IC using the split-copy circuits 318, 352, 368, and is commonly processed by each transceiver IC. Note that transceiver IC 366 is the last transceiver IC in the chain, and in the embodiment shown, split-copy register 368 forwards packets to the corresponding signal-port split processor, but serial transceiver 372/374 is unused.

Each transceiver IC, in turn, processes the packet by first separating IQ data for a first signal port (H IQ data 322) and the second signal port (V IQ data 338), and providing the data to the transmitters within transceivers 321 and 335, for conversion to the time domain via inverse fast-Fourier Transform (iFFT). As described earlier, the individual IQ port-specific data may be conveyed in separate packets, in which case, the signal port data may be directly stored for further processing without the need for any separation or deinterleaving. The iFFT processing and subsequent time domain processing generates an aggregated signal-port discrete time-domain baseband data signal, followed by conversion to amplified radio frequency (RF) signals at ports 328, 344. The transmitters of the transceivers 321, 335, which will be more fully described with respect to FIGS. 12A and 13A, include a DSP for calculating iFFTs, frequency domain and time domain signal processing elements (cyclic prefix addition, phase and gain adjustments, frequency offsets, filtering and sample rate conversions, Crest Factor Reduction (CFR), Digital pre-Distortion (DPD), etc.), as well as RF modulation and amplification circuits in the form of a multi-phase carrier generator and digital power amplifier. Note that, in alternative embodiments involving, e.g., communication of aggregated signal-port/user IQ data packets in the time domain (as mentioned above), the iFFT processing may be carried out at the beamformer processor instead of the transceiver IC itself (as will be explained in more detail in connection with FIG. 12B).

Hence, some embodiments may include a method comprising: receiving a unique data stream of aggregated signal-port IQ data packets at each serially-connected transceiver IC group of a plurality of serially-connected transceiver IC groups, each serially-connected transceiver IC group comprising at least two serially-connected transceiver ICs being physically arranged in a transceiver IC subarray and positioned element-wise adjacent to corresponding radiating antenna elements arranged in a corresponding antenna subarray; within each serially-connected transceiver IC group, forwarding at least a subset of the aggregated signal-port IQ data packets from a first transceiver IC to a next serially-connected transceiver IC; and at each transceiver IC of the at least two serially-connected transceiver ICs within each serially-connected transceiver IC group: processing at least some of the aggregated signal-port IQ data packets with the transceiver IC's integrated Inverse Fast Fourier Transform (IFFT) processor to convert the aggregated signal-port IQ data packets to an aggregated signal-port discrete time-domain baseband data signal; converting the aggregated signal-port discrete time-domain baseband data signal to an amplified modulated radio frequency signal using the transceiver IC's integrated digital power amplifier and multi-phase carrier generator; and, transmitting the amplified modulated radio frequency signal on at least one of the corresponding adjacent radiating antenna elements.

Further, some embodiments may include an apparatus comprising a plurality of transceiver IC subarrays, each transceiver IC subarray comprising: a first transceiver IC having (i) a first serial digital data port providing a serial data connection to a beamformer processor, the first serial digital data port configured to receive a unique data stream of aggregated signal-port IQ data packets; and, (ii) a second serial digital data port; and, a second transceiver IC having a third serial digital data port connected to the second serial data port of the first transceiver IC and providing a serial data connection to the first transceiver IC. The first and second transceiver ICs may be physically arranged in a transceiver IC subarray and positioned element-wise adjacent to a plurality of radiating antenna elements arranged in an antenna subarray. The first transceiver IC of each transceiver IC subarray may further include a packet processor configured to forward at least a subset of the aggregated signal-port IQ data packets received from the beamformer processor to the respective second transceiver IC. The first and second transceiver ICs may each include a digital signal processor configured to perform an Inverse Fast Fourier Transform (IFFT) to convert the aggregated signal-port IQ data packets to an aggregated signal-port discrete time-domain baseband data signal; time domain processing circuitry configured to convert the aggregated signal-port discrete time-domain baseband data signal to an oversampled signal-port discrete time-domain data signal; and an integrated digital power amplifier and multi-phase carrier generator configured to convert the oversampled signal-port discrete time-domain data signal to an analog modulated radio frequency signal.

When receiving uplink (UL) signals, the receiver portions of the transceivers 321, 335, perform frequency down conversion and analog-to-digital conversion, followed by further time-domain processing (e.g., sample rate conversion, quadrature error correction, filtering, frequency offset corrections, cyclic prefix detection and removal, etc.) followed by FFT conversion to frequency domain IQ data values for each of a plurality of subcarriers in an OFDM signal. Thus, in the receive mode of operation, the transceiver ICs are generating the IQ data packets 322, 338 depicted in FIG. 3, from received RF signals.

In one embodiment, the transceiver IC includes a Digital Signal Processor (DSP) that not only performs all of the iFFT calculations to generate the downlink (DL) transmit time-domain signal port signals, but also processes received uplink (UL) data samples via FFTs to generate receive frequency-domain IQ data signals associated with each of the signal ports. However, in alternative embodiments involving, e.g., communication of aggregated signal-port/user IQ data packets in the time domain, the FFT processing may be carried out at the beamformer processor instead of the transceiver IC itself (as will be explained in more detail in connection with FIG. 12B).

With respect to an embodiment associated with the packet structure 302, the UL frequency domain IQ data from each signal port may first be concatenated into a single packet of the format of the packet 302, with an H and V portion, representing the locally-generated UL receive frequency-domain IQ information at the transceiver IC. But as receive IQ packets are conveyed along the transceiver IC subarray, the receive UL frequency domain IQ packets received over the serial data link from another transceiver IC in the subarray may be combined with the local-generated receive IQ data before transmission to the next transceiver IC. Specifically, when the transceiver IC 350 receives an UL IQ packet on link 362 from the transceiver IC 366, UL IQ packet processor 358 combines the received IQ data with its locally-generated UL IQ data. As described more fully herein, the combination may involve a sample-by-sample addition (i.e., for each subcarrier, the I data samples are added, and the Q samples are added), or the I and Q data of one packet may have a phase rotation added prior to combining. In turn, the combined UL IQ data packet received on the link 346 via Serdes receiver 330, is further combined with locally-generated UL IQ data from transceivers 321 and 335, stored in UL signal-port IQ data concatenator 336. In this manner, for the embodiment associated with packet data format 302, the amount of receive data transmitted along the links 362, 346, 310, remains the same for each serial data link along the transceiver IC subarray.

Hence, in a further embodiment, a method comprises: receiving modulated RF signals at a plurality of signal ports of each transceiver IC in a subarray of serially connected transceiver ICs, generating one or more frequency domain digital data packets of subcarrier IQ data associated with each signal port by demodulating each modulated RF signal from each signal port using an FFT processor within the respective transceiver ICs, forming a plurality of combined frequency domain digital data packets from the transceiver ICs using a set of serial data links between the transceiver ICs of the subarray of serially connected transceiver ICs, and transmitting the plurality of combined frequency domain digital data packets from the subarray of transceiver ICs to a beamformer processor.

Further, in some embodiments, each transceiver IC may be configured to processes signals from two signal ports, such as from a cross-polarized antenna elements, or set of parallel-connected elements. Other embodiments may use transceiver ICs having four separate signal ports. In each embodiment, a given signal port may receive multiple modulated carriers (each have a set of subcarriers), and the demodulated frequency domain data may be packetized according to the component carrier from which it was received. Thus, the one or more frequency domain digital data packets of subcarrier IQ data associated with each signal port may be packetized along with header information identifying the signal port (such as a signal port id), a component carrier (such as a component carrier id), as well as additional identifying information (e.g., a subcarrier subset id for use in multi-tier beamforming). Each transceiver IC may participate in forming the plurality of combined frequency domain digital data packets by receiving frequency domain digital data packets of subcarrier IQ data from a neighboring transceiver IC via the serial data link, and combining it with its own locally-generated frequency domain digital data packets of subcarrier IQ data. Depending on the location of a given transceiver IC with the transceiver IC subarray, some transceiver ICs will actually receive a partially-formed combination of frequency domain digital data packets.

For an embodiment associated with packet structure 304 (note that headers are not illustrated, for clarity), six separate signal-port packets may be provided to the transceiver IC subarray, from which six independent transmit signals may be generated. In general, the AAU system's capability to generate independent RF transmit signals from separate digital IQ data associated with each radiating element is referred to herein as full-dimensional beamforming. In this embodiment, representing a full-dimensional digitally beamformed signal, all six packets are received at transceiver IC 312 over link 308 at receive Serdes 314 and provided to split-copy processor 318. The split-copy processor 308 inspects the packet headers and forwards a first set of two signal port packets (the right-most H/V portions 324, 340, of format 304) to signal-port split processor 320 for transmission processing of IQ data 324 by transceiver 321 (for port 328), and of IQ data 340 by transceiver 335 (for port 344), and forwards the remaining four packets to Serdes transmitter 332. The next transceiver IC 350 receives the four packets over link 348 at its Serdes receiver, and split-copy processor 352 performs packet header analysis to forward two signal-port packets to its signal-port split processor 354 within 350, and the remaining two packets to the Serdes transmitter (TX #0 of transceiver IC 350) for transmission over link 364 to transceiver IC 366. Signal-port split processor 354 provides the H and V signal port IQ data to its transceivers for transmission on signal ports 356, 360, respectively. Transceiver IC 366 receives and processes the remaining two IQ data packets in a similar manner for transmission on ports 370, 378. Note that the amount of serial data decreases along the transceiver IC subarray for DL IQ data packets. In this embodiment, the receive processing does not involve any UL IQ packet data combining. Rather, the packets are merely retransmitted from each transceiver IC (using UL IQ packet processor 358 and UL IQ packet processor 334 for the concatenation/retransmission), such that all six receive UL signal-port IQ packets are conveyed to beamformer processor over link 310 (the packets may be formatted with individual headers, or may be conveyed as concatenated payload with a single header). Note that the amount of data increases as the packets on link 362 from transceiver IC 366 are concatenated with the IQ data from transceiver IC 350 at UL IQ packet processor 358 for transmission over link 346. The amount of data again increases over link 310 as UL IQ data 340 and 324 from UL signal-port IQ data concatenator 336 are concatenated by UL IQ packet processor 334.

In some embodiments, full dimensional beamformed packets that are unique to each signal port may be provided for smaller bandwidth signals, such as 20 MHz data bandwidths. This may be desirable in certain deployments where an AAU panel has been configured with lower rate serial data connections in the transceiver IC subarrays. Thus, even systems having lower speed serial data interconnects can support a full control of signal port signals (and corresponding radiating elements) by concatenating the separate IQ data of the interconnected transceiver IC's, and extracting the relevant data set at each IC. This will allow for support of MU-MIMO in the vertical plane with much higher precision, and support use-cases associated with airborne drones (either drones having data connectivity as a user within the system, or by blocking interference from high elevation interfering drones).

In a third embodiment of the antenna array system, a multi-tier beamforming signaling scheme may be used to provide data transmission and reception. In this embodiment, some transmit IQ data packets are processed commonly among a plurality of transceiver ICs to achieve a first level of beamforming resolution, while additional sets of IQ data packets are distributed to each of the transceiver IC subarrays, where each packet of a given additional set of transmit IQ data packets is processed among fewer (or even one) transceiver IC in the transceiver IC subarray, to obtain a second, higher resolution level of beamforming. Specifically, data format 306 provides a combination of beamforming resolutions, whereby two signal-port IQ data packets (e.g., the first two H and V portions of 306, 326, 342) are processed for transmission by each of the transceiver ICs 312, 350, and 366 in a manner similar to the signal processing described above with respect to the packet format 302. Because the same IQ data is transformed and transmitted by multiple corresponding radiating elements in a subarray, these IQ data packets, referred to herein as "commonly-processed" IQ data result in a first tier of beamforming resolution, where the beams are formed as a result of the phased-signal contributions emanating from the other subarrays (i.e., inter-subarray beamforming). But in addition, a further set of six signal port IQ data packets (the three additional sets of H/V data of 306) are distributed across the given transceiver IC subarray in a manner similar to the signal processing described above with respect to the packet format 304 for full-digital beamformed data. These additional packets are specific to a given signal port and/or transceiver IC, and provide unique IQ data streams for transmission by each individual signal port in the given transceiver IC subarray, thereby providing for transmission and reception of a second tier of beamforming resolution. Specifically, where the beams are formed as a result of the phased-signal contributions emanating from other transceiver ICs within the given subarray, as well as the phased-signal contributions emanating from other transceiver ICs within other transceiver IC subarrays (i.e., second tier beamforming from both intra-subarray beamforming as well as inter-subarray beamforming).

The multi-tier beamforming having packets of the form 306 shown in FIG. 3, and as further described hereinbelow with respect to FIGS. 12A-B, 13A and 13B, utilizes the processing of two separate signal-port IQ packets indicated to be combined for transmission on the same signal port, such as IQ data 326 and IQ data 327 (and, similarly, 342, 343). In one embodiment, the separately beam-formed IQ packets may include the IQ data points for different subcarriers within a single component carrier's set of subcarriers. Thus, each transceiver IC may form its own unique combined set(s) of IQ data points for its respective signal ports prior to iFFT processing. Specifically, the transceiver IC 312 combines, via concatenation, IQ data 326 and 327 for transmission on signal port 328, while combining IQ data 342 with IQ data 343 for transmission on signal port 344.

The transceiver IC 350, the next transceiver IC in the transceiver IC subarray, combines IQ data 326 (the same as that processed by transceiver 321 of transceiver IC 312) with signal port IQ data 355, and combines IQ data 342 (the same commonly-processed IQ data as that processed by the transceiver 335 of transceiver IC 312) with signal port IQ data 359. Similar unique concatenated combinations are shown in transceiver IC 366, where IQ signal-port data packets 326 and 342, are combined with unique signal-port IQ data 369, 377, respectively. Within the transceiver IC subarray, the commonly-processed IQ packets 326 and 342 provide for the first-tier beamforming component contributed by the subarray, while the additional sets of IQ packets distributed within the transceiver IC subarray provide the second-tier beamforming components associated with that subarray.

In a further embodiment, the separate IQ packets may have overlapping subcarriers, in which case the transceiver IC processing includes forming a weighted average of the overlapping subcarriers prior to iFFT processing. In such embodiments, the beamformer processor may convey one or more weights for the transceiver ICs to use when forming the combinations of IQ transmit data for the overlapping subcarriers.

Thus, in one embodiment, multi-tier transmit beamforming comprises: receiving a first-tier beamformed IQ packet and a plurality of second-tier beamformed packets at a plurality of transceiver ICs of a transceiver IC subarray over serial data connections interconnecting the transceiver ICs; and at each transceiver IC: forming a multi-tier beamformed packet by combining the first-tier beamformed IQ packet with at least one of the second-tier beamformed packets of the plurality of second-tier beamformed packets; generating a time domain signal from the multi-tier beamformed packet; transmitting a multi-tier beamformed signal by transmitting respective amplified radio frequency time domain signals from the transceiver ICs of the transceiver IC subarray via a corresponding adjacent antenna element subarray.

In some embodiments, the first-tier beamformed IQ packet and each of the plurality of second-tier beamformed packets contains frequency-domain IQ data. In other embodiments, the first-tier beamformed IQ packet and each of the plurality of second-tier beamformed packets contains time-domain IQ data.

In some embodiments, the multi-tier beamformed packets are formed by combining, via concatenation, IQ samples of separate subcarriers followed by processing the packet with the same iFFT operation. In other embodiments, the multi-tier beamformed packets are formed by combining overlapping subcarriers using weights provided via management plane messages, followed by processing by the same iFFT operation.

In yet a further embodiment, the IQ packets that convey data used for the second-tier beamforming may be associated with subcarriers of a separate component carrier. In such an embodiment, the additional higher-resolution beamformed data may be processed independently using a separate iFFT prior to combining the time domain signals of the two tiers of beamformed signals. Thus, in one embodiment, multi-tier transmit beamforming comprises receiving a first-tier beamformed IQ packet and a plurality of second-tier beamformed packets at a plurality of transceiver ICs of a transceiver IC subarray over serial data connections interconnecting the transceiver ICs; and at each transceiver IC: converting the first-tier (commonly-processed) beamformed IQ packet to a time domain signal and separately converting, via a separate iFFT, at least one of the second-tier beamformed IQ packets of the plurality of second-tier beamformed IQ packets to a time domain signal; combining the two time domain signals to form a signal-port specific multi-tier beamformed time domain signal; transmitting a multi-tier beamformed signal by transmitting amplified radio frequency time domain signals generated from the respective signal-port specific multi-tier beamformed time domain signals from the transceiver ICs of the transceiver IC subarray via a corresponding adjacent antenna element subarray. Multiple transceiver IC subarrays and their counterpart antenna element subarrays cooperatively generate the multi-tier beamformed signals.

In multi-tier beamforming using the distribution of multi-tier IQ packet data among each of a plurality of transceiver IC subarrays, one set of users may be served by aggregated IQ signal-port packets that are copied and forwarded for processing by each transceiver IC along a given transceiver IC subarray, resulting in a first level of beamforming resolution (as determined, for example, by an overall number of unique independent signal-port IQ packet streams sent to an overall number of corresponding transceiver IC subarrays, for processing by each transceiver IC). But in addition, a separate set of users may be served by a higher resolution of beamforming, by distributing additional signal-port specific IQ data packets along the transceiver IC subarray for separate processing by each individual transceiver IC (i.e., not commonly-processed IQ data).

In many embodiments, note that the commonly-processed IQ packets of the multi-tier beamforming signal processing are unique to a particular transceiver IC subarray. In some scenarios, however, to achieve certain desired beam radiation patterns (i.e., those with an even lower degree of beamforming resolution), some commonly-processed IQ packets may be the same for two or more transceiver IC subarrays.

The receive UL signal processing for multi-tier beamforming is also a hybrid of the UL receive signal processing described above, where IQ data combining may be performed for a first pair of signal port IQ packets, and IQ data concatenation may be performed for additional sets of independent UL signal port IQ data packets. Thus, the first-tier beamforming is performed by each transceiver IC participating in forming the UL combined frequency domain digital data packets by receiving frequency domain digital data packets of subcarrier IQ data from a neighboring transceiver IC via the serial data link, and combining it with its own locally-generated frequency domain digital data packets of subcarrier IQ data. The second tier beamformer processing involves conveying the UL receive IQ packets along the transceiver IC subarray without combination, but rather via concatenation (sample-wise or packet-wise, so as to not alter the IQ samples).

In some embodiments configured as an array of N×M transceiver ICs comprising a set of N transceiver IC subarrays each having M serially-connected transceiver ICs, the multi-tier beamforming may be characterized by processing a first set of aggregated beam-formed frequency-domain IQ user data according to a first tier of a beamforming resolution to generate N unique beamformed IQ data packets (or sets of packets, such as an IQ data set for each signal port (e.g., H and V) within a transceiver IC), each for distribution to a respective one of the N transceiver IC subarrays, while also processing a second set of beam-formed aggregated frequency-domain IQ user data sets according to a second tier of beamforming resolution to generate N different sets of M unique beam-formed IQ data packets (or sets of packets for the set of signal ports of each transceiver IC), and with each of the N sets of M packets being distributed to a respective one of the N transceiver IC subarrays. Each of the various packets is sent over respective serial data links to the N transceiver IC subarrays. Each transceiver of a given subarray will commonly process packets associated with the first-tier beamforming data, in combination with only a portion of the separately beamformed second-tier beamformed packets.

Figure 16:
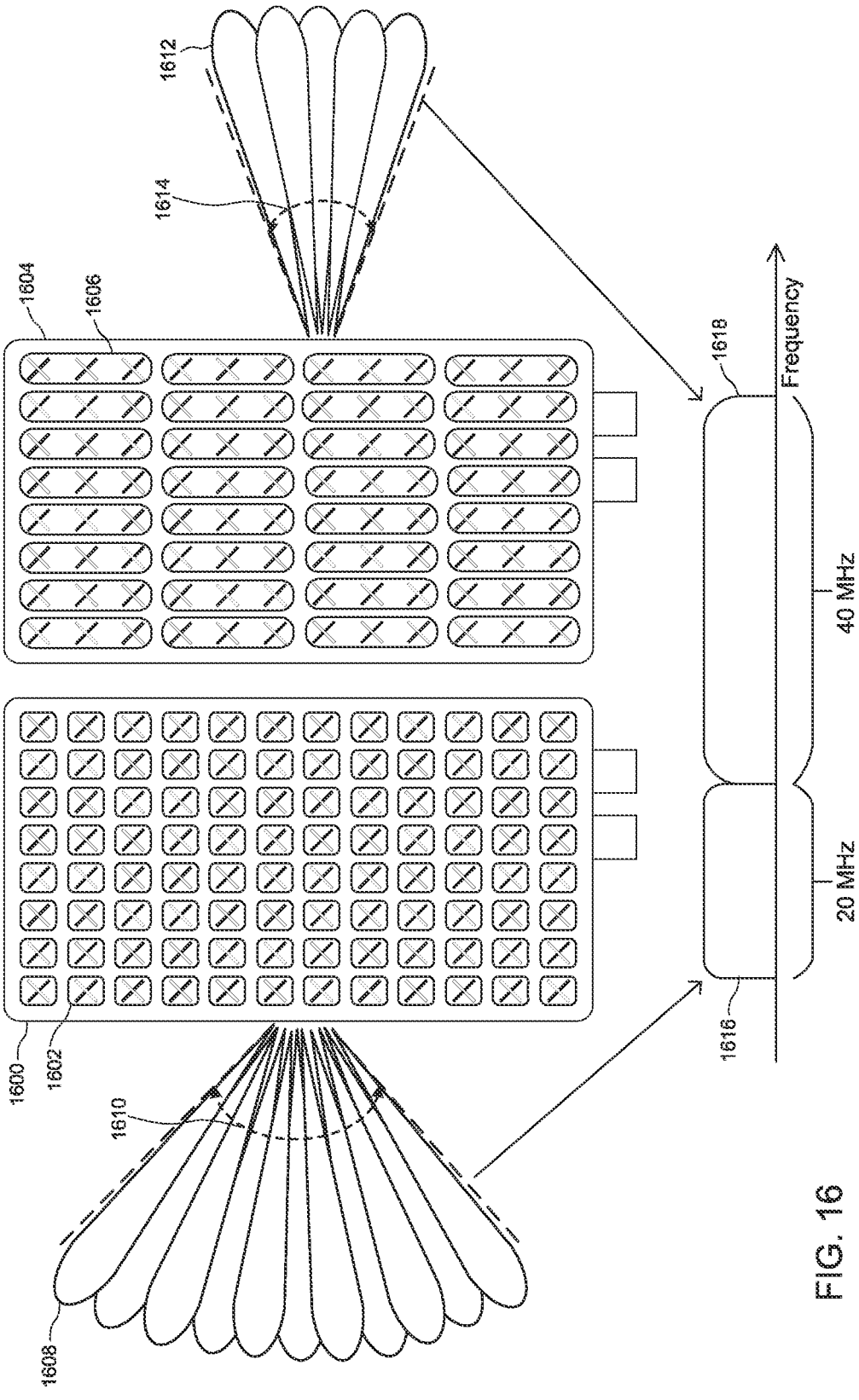
FIG. 16 depicts various additional details of multi-tier beamforming, in accordance with some embodiments; and, FIG. 17 illustrates aspects of beamforming weight errors within a subarray-beamformed signal processing system, in accordance with some embodiments.

With reference to FIG. 16, an embodiment of two-tier beamforming is illustrated, whereby a panel may be configured to process UL and DL data according to a first tier of beamforming using subarray-level beamforming (as shown in a configuration 1604) with three dual-polarized elements per a subarray 1606, and providing beams (e.g., 1612) within a scan range 1614. In the embodiment shown, the subarray-level beamformer generates beamformed IQ packets for frequency content 1618 that are commonly-processed within each respective subarray, as described with respect to the IQ data 326, and 342. The same panel may simultaneously be configured (as shown in a configuration 1600) to provide another, or second, tier of beamforming having higher phase resolution with unique beamformed IQ data sets for generating unique signals at each cross-polarized element 1602. In the embodiment of FIG. 16, the frequency content 1616 may be allocated to the high-resolution beamformed tier, such as the data 327, 343, 355, 359, 369, and 377. The frequency content of the frequency range 1616 and the frequency range 1618 may correspond to different subcarriers within a single component carrier, or may be separate component carriers, etc. as described herein.

Figure 17:
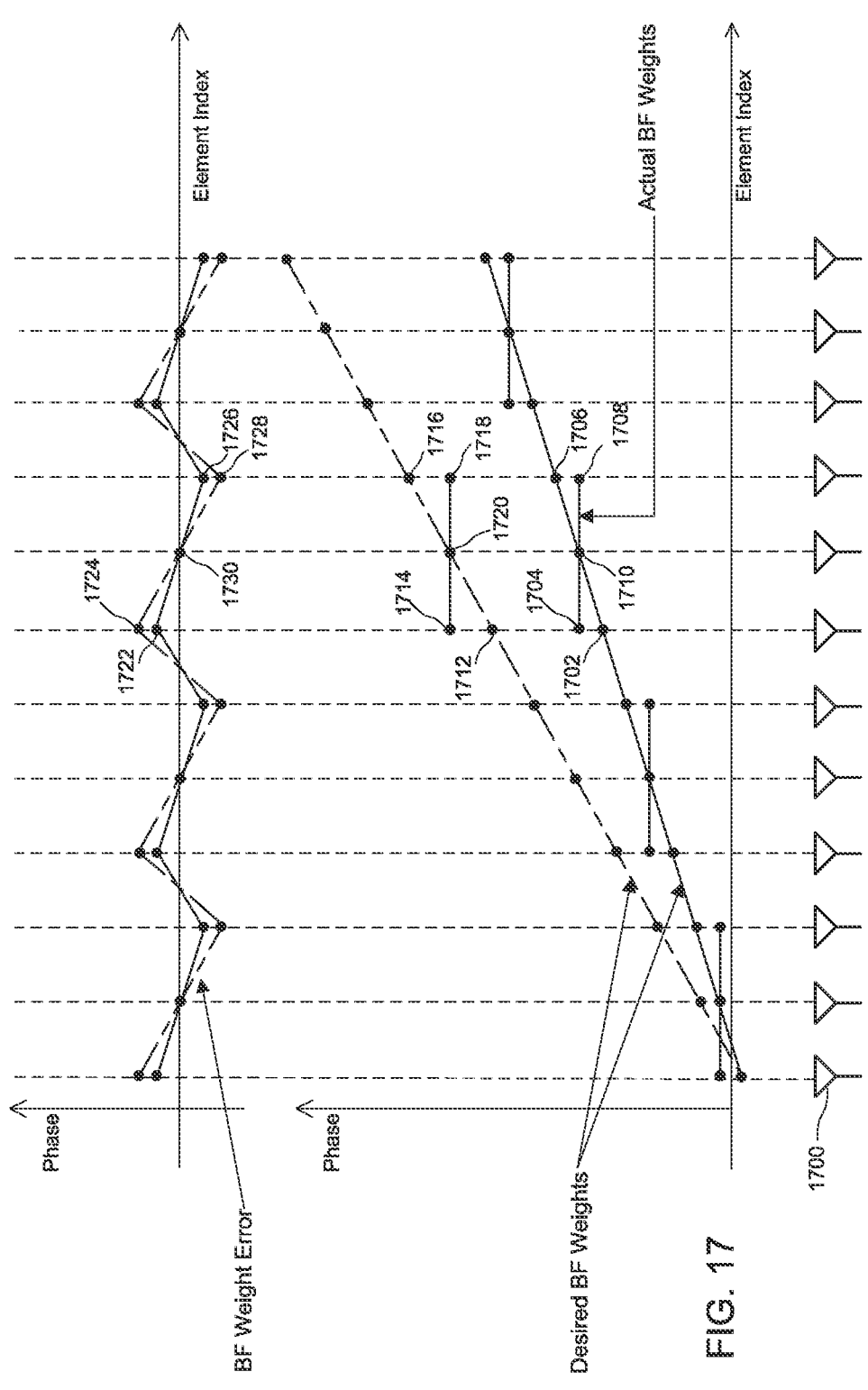

Note that in the second tier of beamforming, the individual beams (e.g., 1608) may be directed across a wider scan range 1610 due to the higher phase resolution. In contrast, the scan angle in subarray beam forming (where a plurality of signal ports transmit and receive signals processed according to a common IQ beamformed packet) has a limited scan range due to the increased quantization error in beam forming weights, as depicted in FIG. 17. In particular, the scan angles of two representative beams represented by diagonal lines labeled "Desired BF Weights" depict two individual beams having different scan angles. In full-dimensional beamforming, the IQ data for each signal port is formed using the desired weights having phases as indicated, including, for example, points 1702, 1710, and 1706 for the lower-angle scan angle, and example points 1712, 1720, and 1716 for the steeper scan angle (shown as the dashed line). However, in subarray beamforming, the commonly processed beamformed IQ data may be generated with an average phase for the desired beam across the elements in the given subarray, shown by example phases 1704, 1710, 1708 for one beam, and phases 1714, 1718, 1720 for the steeper beam. The corresponding beamforming weight phase errors are shown with the lines labeled "BF Weight Error". Note that the steeper scan angle has higher beamformer weight errors. Consequently, the second tier of beam forming allows greater scan angles because no quantization error, and subarray beamforming has a reduced scan range. Note that for two-element subarrays, the beamforming weights used in forming individual beams may be the average value of between two desired phase values, or a value otherwise between the two desired weight phases. The finer phase control avoids what is sometimes called "quantization lobes", which are generated because the applied weights are constrained to be the same for several adjacent elements in the subarray. The quantization lobes increase as the scan angle increases.

In short, the full-dimensional beamforming is done with a higher level of precision in the beamformer weights, whereas the subarray beamforming is performed with an average of the desired weights, introducing errors. Thus, the elements configured according to the configuration 1600 that have full dimensional control have a larger scan range than the subarray beamformed configuration 1604 that is beamformed using averaged bf weights for each given beam (such as UE-specific beams, or spatial multiplexing layer beams, etc.).

The multi-tier beamforming described herein may be used to provide high quality service to a set of users, such as those located in a high rise building within the cell sector without sacrificing coverage (e.g., by limiting the allocated data bandwidth) for other user devices located on the ground level. Similarly, the system enables support of communication with drones and other high elevation devices in combination with ground-level user devices. The system described herein is configured to provide these alternative beamformed transmissions amongst user devices within a single radio unit.

A multi-mode beamforming system may be configured to sequentially or dynamically allocate OFDM transmissions on a slot-by-slot basis according to two or more levels of beamforming resolution. In particular, a first time transmission time interval (TTI) or even a first OFDM symbol time slot, may be allocated to user devices that are beamformed according to a first tier of subarray-level beamforming, such that during transmission signal processing, the transmit IQ data packets sent to each transceiver IC subarray are commonly processed by each of the transceiver ICs within each such subarray. And similarly, during signal reception, the processed IQ data packets of each transceiver IC are combined as they are conveyed from transceiver IC to transceiver IC along the serially-connected transceiver ICs in each subarray. In a second, or subsequent time slot, frequency resource blocks may be allocated to user devices for higher resolution beamforming, including full-control beamformed IQ data according to a second tier of higher phase resolution beamforming, where individual transmit IQ packets are separately formed for serial data transmission, and which are sent to each transceiver IC subarray, for individual processing by specifically addressed transceiver ICs within each such subarray.

In some embodiments, the transmission bandwidth (i.e., the number of IQ sample pairs corresponding to the number of modulated subcarriers) associated with the full-control digital beamformed IQ data packets may be less than the bandwidth being utilized by the commonly processed IQ data packets, such as the comparison between the commonly-processed packet data of 302 and the fully-digital beamformed packet data of 304. In some embodiments, a method of multi-tier beamforming comprises: receiving a first-tier beamformed frequency-domain IQ data packet and a plurality of second-tier beamformed frequency-domain IQ data packets at a transceiver integrated circuit (IC) subarray having a plurality of interconnected transceiver ICs, the transceiver ICs interconnected via a plurality of serial data connections; at each transceiver IC of the transceiver IC subarray: forming a multi-tier beamformed frequency-domain IQ data set by combining beamformed frequency-domain IQ data from the first-tier beamformed frequency-domain IQ data packet with beamformed frequency-domain IQ data from selected ones of the second-tier beamformed frequency-domain IQ data packets of the plurality of second-tier beamformed frequency-domain IQ data packets; generating a discrete-time-domain signal from the multi-tier beamformed frequency-domain IQ data set using a digital signal processor (DSP) within the transceiver IC; generating a modulated radio frequency (RF) signal from the discrete-time-domain signal; and, transmitting a multi-tier beamformed signal by transmitting respective modulated RF signals from the transceiver ICs of the transceiver IC subarray via a corresponding adjacent antenna element subarray. Transmitting the multi-tier beamformed signal may be performed by transmitting respective modulated RF signals from transceiver ICs of a plurality of transceiver IC subarrays via a corresponding plurality of adjacent antenna element subarrays.

In some embodiments, the method includes receiving a first-tier beamformed frequency-domain IQ data packet and a plurality of second-tier beamformed frequency-domain IQ data packets at a transceiver integrated circuit (IC) subarray, wherein receiving further comprises: forwarding the first-tier beamformed frequency-domain IQ data packet from a first transceiver IC of the transceiver IC subarray to additional transceiver ICs of the transceiver IC subarray for common processing; and, forwarding only a subset of the second-tier beamformed frequency-domain IQ data packets of the plurality of second-tier beamformed frequency-domain IQ data packets from the first transceiver IC to the additional transceiver ICs. In some embodiments, the subset of the second-tier beamformed frequency-domain IQ data packets is identified according to packet headers. Some methods combine the beamformed frequency-domain IQ data from the first-tier beamformed frequency-domain IQ data packet with beamformed frequency-domain IQ data from selected ones of the second-tier beamformed frequency-domain IQ data packets by concatenating beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. Combining beamformed frequency-domain IQ data from the first-tier beamformed frequency-domain IQ data packet with beamformed frequency-domain IQ data from selected ones of the second-tier beamformed frequency-domain IQ data packets is performed in some instances by forming a weighted sum of beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. The weighted sum may be calculated according to beamforming weights received from a beamformer.

In further embodiments, combining beamformed frequency-domain IQ data from the first-tier beamformed frequency-domain IQ data packet with beamformed frequency-domain IQ data from selected ones of the second-tier beamformed frequency-domain IQ data packets is done in the time domain by converting the beamformed frequency-domain IQ data from the first-tier beamformed frequency-domain IQ data packet to a first-tier beamformed time-domain signal; converting the beamformed frequency-domain IQ data from selected ones of the second-tier beamformed frequency-domain IQ data packets to a second-tier beamformed time-domain signal; and, adding the first-tier beamformed time-domain signal and the second-tier beamformed time-domain signal.

The first-tier beamformed frequency-domain IQ data packet and the selected ones of the second-tier beamformed frequency-domain IQ data packets may be associated with different component carriers. The method may involve queuing the data packets according to the location of the intended transceiver IC, so that second-tier beamformed frequency-domain IQ data packets are received for processing by transceiver ICs at an end of the transceiver IC subarray prior to receiving second-tier beamformed frequency-domain IQ data packets for processing by transceiver ICs at a beginning of the transceiver IC subarray.

In some alternative embodiments, as noted above, the method of multi-tier (transmit) beamforming may comprise receiving a first-tier beamformed time-domain IQ data packet and a plurality of second-tier beamformed time-domain IQ data packets at a transceiver integrated circuit (IC) subarray, wherein receiving further comprises: forwarding the first-tier beamformed time-domain IQ data packet from a first transceiver IC of the transceiver IC subarray to additional transceiver ICs of the transceiver IC subarray for common processing; and, forwarding only a subset of the second-tier beamformed time-domain IQ data packets of the plurality of second-tier beamformed time-domain IQ data packets from the first transceiver IC to the additional transceiver ICs. In some embodiments, the subset of the second-tier beamformed time-domain IQ data packets is identified according to packet headers. Some alternative methods may combine the beamformed time-domain IQ data from the first-tier beamformed time-domain IQ data packet with beamformed time-domain IQ data from selected ones of the second-tier beamformed time-domain IQ data packets directly in the time domain by, e.g., adding the beamformed time-domain IQ data from the first-tier beamformed time-domain IQ data packet with the beamformed time-domain IQ data from selected ones of the second-tier beamformed time-domain IQ data packets.

Some example embodiments of an apparatus comprise: a beamformer processor configured to generate a first-tier beamformed frequency-domain IQ data packet and a plurality of second-tier beamformed frequency-domain IQ data packets; a transceiver integrated circuit (IC) subarray connected to the beamformer processor and having a plurality of interconnected transceiver ICs interconnected via a plurality of serial data connections; each transceiver IC of the transceiver IC subarray comprising: a digital signal processor (DSP) configured to form a multi-tier beamformed frequency-domain IQ data set and to generate a discrete-time-domain signal from the multi-tier beamformed frequency-domain IQ data set; a radio frequency modulator configured to generate a modulated radio frequency (RF) signal from the discrete-time-domain signal; and, an antenna element subarray connected to the transceiver IC subarray configured to transmit a multi-tier beamformed signal by transmitting respective modulated RF signals from the transceiver ICs of the transceiver IC subarray. The transceiver IC subarray may comprise a first transceiver IC having a packet header processor configured to forward the first-tier beamformed frequency-domain IQ data packet from the first transceiver IC to additional transceiver ICs of the transceiver IC subarray for common processing and configured to forward only a subset of the second-tier beamformed frequency-domain IQ data packets from the first transceiver IC to the additional transceiver ICs. The packet header processor may be configured to identify the subset of the second-tier beamformed frequency-domain IQ data packets according to packet headers.

The DSP may be configured to combine beamformed frequency-domain IQ data from the first-tier beamformed frequency-domain IQ data packet with beamformed frequency-domain IQ data from selected ones of the second-tier beamformed frequency-domain IQ data packets by concatenating beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. The DSP may be configured to combine beamformed frequency-domain IQ data from the first-tier beamformed frequency-domain IQ data packet with beamformed frequency-domain IQ data from selected ones of the second-tier beamformed frequency-domain IQ data packets by forming a weighted sum of beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. The DSP may be configured to calculate the weighted sum according to beamforming weights received from the beamformer processor.

In some embodiments, the DSP is configured to: convert the beamformed frequency-domain IQ data from the first-tier beamformed frequency-domain IQ data packet to a first-tier beamformed time-domain signal; convert the beamformed frequency-domain IQ data from selected ones of the second-tier beamformed frequency-domain IQ data packets to a second-tier beamformed time-domain signal; and, add the first-tier beamformed time-domain signal and the second-tier beamformed time-domain signal.

The apparatus may include a packet header processor configured to identify separate component carriers associated with the first-tier beamformed frequency-domain IQ data packet and the selected ones of the second-tier beamformed frequency-domain IQ data packets. The beamformer processor may be configured to transmit the second-tier beamformed frequency-domain IQ data packets for processing by transceiver ICs at an end of the transceiver IC subarray prior to transmitting second-tier beamformed frequency-domain IQ data packets for processing by transceiver ICs at a beginning of the transceiver IC subarray. The apparatus may also include a plurality of transceiver IC subarrays and a corresponding plurality of adjacent antenna element subarrays, configured to transmit the multi-tier beamformed signal.

Some alternative embodiments of an apparatus comprise: a beamformer processor configured to generate a first-tier beamformed time-domain IQ data packet and a plurality of second-tier beamformed time-domain IQ data packets; a transceiver integrated circuit (IC) subarray connected to the beamformer processor and having a plurality of interconnected transceiver ICs interconnected via a plurality of serial data connections; each transceiver IC of the transceiver IC subarray comprising: a digital front end signal processing circuit configured to form a multi-tier beamformed time-domain IQ data set and to generate a discrete-time-domain signal from the separate first-tier and second-tier beamformed time-domain IQ data sets. The first-tier and second-tier time domain IQ data may have different sampling rates, and the digital front end circuit may interpolate each of the first-tier and second-tier time domain IQ data to a common sample rate prior to additively combining the discrete time signals. Some embodiments include a radio frequency modulator configured to generate a modulated radio frequency (RF) signal from the discrete-time-domain signal; and, an antenna element subarray connected to the transceiver IC subarray configured to transmit a multi-tier beamformed signal by transmitting respective modulated RF signals from the transceiver ICs of the transceiver IC subarray. The transceiver IC subarray may comprise a first transceiver IC having a packet header processor configured to forward the first-tier beamformed time-domain IQ data packet from the first transceiver IC to additional transceiver ICs of the transceiver IC subarray for common processing and configured to forward only a subset of the second-tier beamformed time-domain IQ data packets from the first transceiver IC to the additional transceiver ICs. The packet header processor may be configured to identify the subset of the second-tier beamformed time-domain IQ data packets according to packet headers.

Some embodiments may utilize Full-Dimensional Beamformed Data Streams in Serially-Connected Transceiver Arrays. In these embodiments, each signal port has unique signals for full control over the beamforming phases. Thus, unique packets are sent to each transceiver IC subarray that are addressed (through a combination of one or more field IDs, or combinations of sets of IDs) to each transceiver in a subarray. The packets may be time ordered to accommodate latency so that IQ packets addressed to transceiver ICs at the end of serially-linked chain of transceiver ICs are sent first so they are received at the end of the array. Packets may thus be ordered in a round-robin fashion, where a first packet is sent to each transceiver IC so that processing may begin at each IC, followed by additional packets to each transceiver IC.

Each transceiver has a serial link and a packet header analyzer circuit for performing header inspection, where each stream to each subarray includes separate data packets with unique digital beam formed data addressed to individual transceivers within the serially-connected set of transceivers. The packet header analyzer within each transceiver Serdes may make packet-by-packet forwarding decisions. In one configuration, the packet bandwidth is allocated equally between two signal paths of each transceiver IC, such as packets for two signal ports (H and V).

When receiving signals in the serially-linked transceiver ICs in a subarray, the serial data rate is between ICs is limited and thus subarray beamforming may include receive IQ data combining prior to transmission back to the beamformer. In some embodiments, combining weights are provided to the transceivers in a given subarray so they would adjust phases as part of the receive combining. Electronic tilt is one such situation.

FIG. 4 is an alternative embodiment of a radio unit architecture having a hierarchical data distribution topology from the DL/UL beamformer 400 to the respective groups of serially connected transceiver ICs (e.g., one such transceiver IC subarray is the set of transceiver ICs connected via serial links 418 and 420). In this embodiment, the beamformer 400 has high rate serial data connections (e.g., 402) to intermediate Serdes MUX devices 404, (as well as connections to 422, 424, 426), each of which then provide separate serial data connections (e.g., a set of links 406). The separate serial connections from each Serdes MUX may utilize a lower data rate for connections to the respective subset of transceiver IC subarrays 421*a*, 421*b*, 421*c*, 421*d*. In the embodiment of FIG. 4, the subset of transceiver IC subarrays 421*a* contains 8 transceiver IC subarrays, with each subarray having three transceiver ICs connected to corresponding antenna elements. Note that the remaining sets of transceiver IC subarrays 421*b*, 421*c*, 421*d* are depicted in simplified fashion (including connectivity to a simplified set of antenna element subarrays) for clarity.

The transceiver IC subarrays of FIG. 4 are also configured in a Time Division Duplexed (TDD) configuration with SPDT (Single-Pole Double-Throw) switches 412. The receive signals may be filtered via a filter 410 and amplified with a low Noise Amplifiers (LNA) 408. Also depicted are signal couplers, e.g., 414, 416, that provide a signal copy (typically at a much lower power) of the transmitted RF signal to a monitoring, or observation, transceiver 428 via a calibration port 430.

Figure 5:
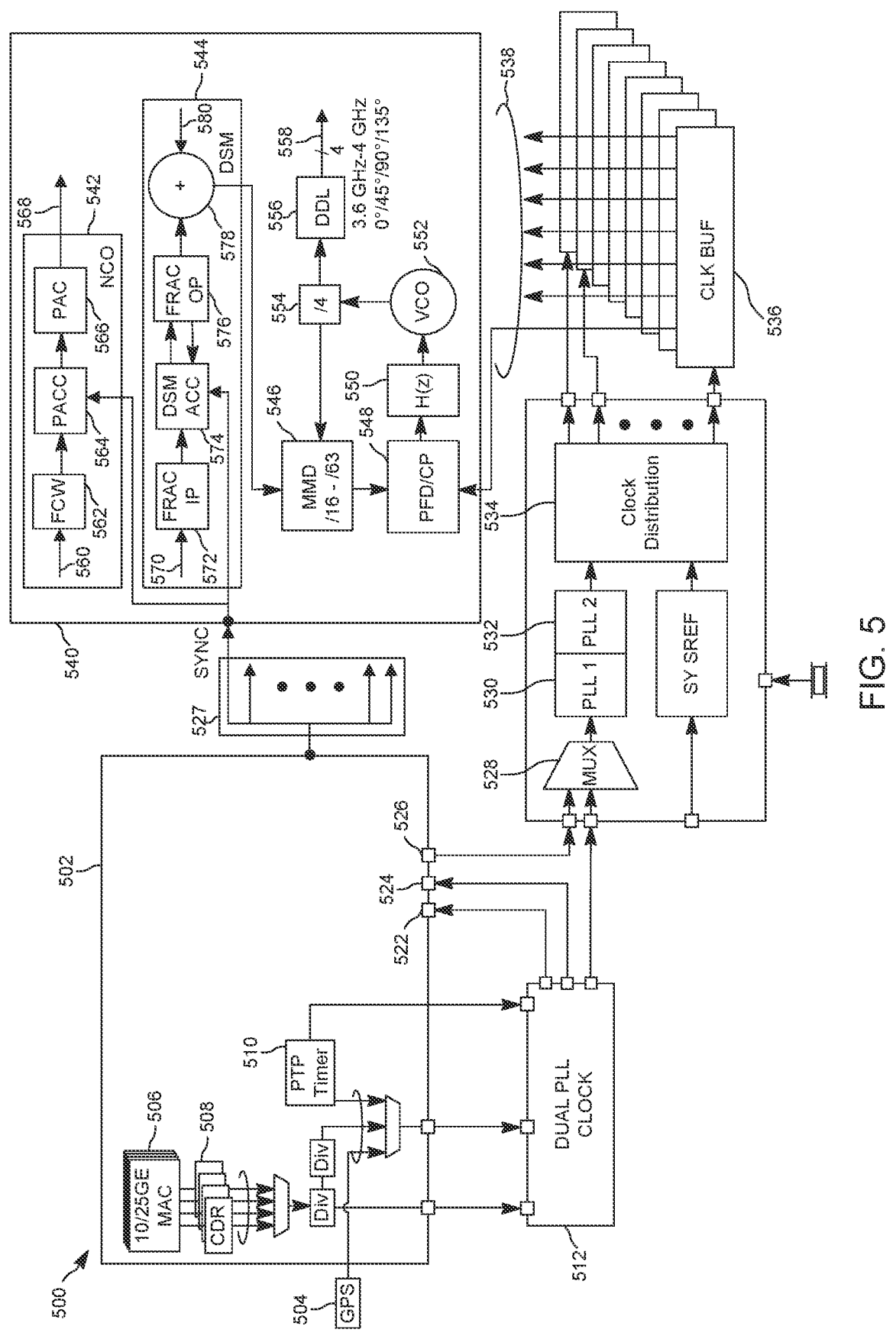
FIG. 5 depicts an embodiment of a synchronization and clock distribution circuit for use with the transceivers distributed across the active antenna array assembly.

FIG. 5 depicts an embodiment of a synchronization and clock distribution circuit 500 for use with the transceiver ICs distributed across the active antenna array assembly. More specifically, some embodiments include a method comprising: receiving a clock signal and at least one synchronization pulse signal at each transceiver IC of a plurality of transceiver IC subarrays, wherein each transceiver IC subarray contains a respective set of serially connected transceiver ICs. The method further includes, at each transceiver IC: (i) synchronizing the transceiver IC with other transceiver ICs of the respective set of serially connected transceiver ICs by resetting a delta-sigma modulator (DSM) circuit to a predetermined state in accordance with the received at least one synchronization pulse signal; (ii) generating a carrier frequency signal using a phase-locked loop (PLL) circuit that includes the DSM circuit; and (iii) using the generated carrier frequency signal to process frequency domain in-phase and quadrature (IQ) data.

Further, some embodiments include an apparatus comprising: a plurality of transceiver IC subarrays, wherein each transceiver IC subarray contains a respective set of serially connected transceiver ICs; a beamformer processor coupled to the plurality of transceiver IC subarrays, wherein the beamformer processor is configured to generate at least one synchronization pulse signal, and to provide the at least one synchronization pulse signal to each transceiver IC; and a plurality of clock buffer circuits coupled to the beamformer processor via a clock distribution circuit, wherein the plurality of clock buffer circuits are configured to output a plurality of clock signals, and to provide a respective clock signal to each transceiver IC, and wherein each transceiver IC is configured to: (i) receive the respective clock signal and the at least one synchronization pulse signal; (ii) synchronize the transceiver IC with other transceiver ICs of the respective set of serially connected transceiver ICs by resetting a delta-sigma modulator (DSM) circuit to a predetermined state in accordance with the received at least one synchronization pulse signal; (ii) generate a carrier frequency signal using a phase-locked loop (PLL) circuit that includes the delta-sigma modulator (DSM) circuit; and (iv) use the generated carrier frequency signal to process frequency domain IQ data.

Referring back to FIG. 5, within a beamformer processor circuit 502, data interface circuit(s) 506 may be used to generate clock signals from Clock and Data Recovery (CDR) circuits 508, which are then provided to a Dual PLL clock circuit 512 that provides clock signals 522, 524 for use by a beamformer processor 502, which may in turn generate a further clock signal on line 526. Clock signal distribution to the transceiver ICs (e.g., one such transceiver IC 540 is depicted in FIG. 5) over clocking lines 538 is provided by clock buffers 536 receiving inputs from a clock distribution circuit 534 driven by a PLL2 532, a PLL1, 530, based on a selection from a MUX 528, in conjunction with a System Reference clock. Hence, in some embodiments, the clock distribution circuit 534 is driven by the clock signal (on line 526) from the beamformer processor 502 and the System Reference clock.

In some embodiments, the distributed clock signal is a high-frequency signal in a frequency range of 50 MHz to 150 MHz. Further, in some embodiments, the clock buffer clock circuits 536 are configured to adjust clock signal timing at an output of each clock buffer circuit so that the respective clock signal is received by each transceiver IC at substantially same time. For example, in one illustrative embodiment, the clock buffer circuits 536 are programmable and configurable to adjust the clock signal timing at each output to accommodate signal transmission latencies associated with the clock signal paths so that the clock signals (specifically, rising and/or falling edge transitions of clock signals) arrive at each transceiver IC with low relative skew. In this regard, low skew means arrival at substantially the same time, having an arrival time distribution in the range of less than one or two nanoseconds of each other. In some embodiments, low skew refers to less than 333 picoseconds (⅓ nanosecond). In this regard, the clock buffers 536 may be adjusted according to a calibration procedure.

In some embodiments, in addition to receiving substantially synchronized clock signals, the transceiver ICs (e.g., the transceiver IC 540) are also synchronized with respect to each other at a macro timing level by an additional at least one synchronization pulse signal for one or more purposes. In particular, the transceiver ICs, which may be interconnected in transceiver IC subarrays via asynchronous serial data buses, and which are also interconnected directly or indirectly with the beamformer processor 502, as described herein, have one or more subsystems that may benefit from further synchronization. In some embodiments, as shown in FIG. 5, such synchronization pulse signal (denoted as "SYNC" pulse signal) is generated by the beamformer processor 502, and provided to each transceiver IC for further synchronization.

In some embodiments, as generally shown in FIG. 5, the synchronization pulse signal (the "SYNC" pulse) generated by the beamformer processor 502 may be processed through an additional buffer tree network 527 so that the respective synchronization pulse signal is received by each transceiver IC at substantially same time, in a similar manner as the clock signal. More particularly, in some embodiments, a number of transceiver ICs grouped into transceiver IC subarrays may be distributed in different locations across an antenna panel. Similar to the clock distribution described above, the respective synchronization pulse signals may have different signal transmission latencies associated with different physical signal paths to individual transceiver ICs that might be spread out across the antenna panel. For example, depending on a physical location of a given transceiver IC on the panel, longer signal paths of the SYNC pulse may suffer from a greater signal degradation that those that are shorter.

In some embodiments, the buffer tree network 527 may be configured to distribute the synchronization pulse signal in a tree-like manner by branching out the SYNC pulse to different panel regions in a synchronized manner. For example, in such network, a primary buffer circuit may provide a given number of outputs driving the corresponding number of at least secondary buffer circuits that are distributed across different regions of the panel and that provide the synchronization pulse signal to transceiver ICs located in those respective regions. In some embodiments, the timing of output signals from the primary buffer circuit may be, for example, adjusted accordingly (e.g., delayed) such the that the distributed secondary buffers receive the synchronized pulse signal at substantially same time. In turn, the secondary buffer circuits can each provide a number of separate outputs to drive the corresponding number of transceiver ICs in the respective region of the panel, and can adjust output signal timing (e.g., signal delay) such that that the respective synchronization pulse signal is received by each transceiver IC at substantially same time/simultaneously.

In one illustrative embodiment, the buffer tree network 527 may be implemented by a signal distribution chip/IC that may be programmable trough a suitable calibration procedure to adjust the timing of the synchronization pulse signal so that the SYNC pulse actually arrives at each transceiver IC substantially simultaneously. In this regard, such distribution chip could be configured to, e.g., selectively delay buffered signal outputs to accommodate signal transmission latencies associated with different signal paths of the SYNC pulse.

In one aspect, each of the transceiver ICs that are physically distributed across an antenna array assembly are configured for independently processing the low-skew distributed (e.g., high-frequency) clock signal and responsively generating a carrier frequency signal for processing transmit and receive modulated RF signals. As such, the voltage-controlled oscillator (VCO) of each transceiver IC that is used to generate the carrier phases for modulating the transmit signal and for mixing/downconverting the received RF signals are closely aligned across the transceiver IC subarrays that are distributed across the antenna array assembly.

In some embodiments, the transceiver IC VCOs employed herein use a VCO adjustment loop comprising a phase-locked loop (PLL) circuit) that includes a Delta Sigma Modulator (DSM) 544, a multiple-modulus divider (MMD) 546, a Phase/Frequency Detector (PFD) 548, a loop filter 550, a VCO 552, and a divider 554. Fractional dividers in the VCO adjustment loop function to adjust a modulus of frequency division (i.e., a divide ratio) used by the MMD 546. The MMD 546 utilizes a sequence of divisor values obtained from the DSM 544.

In this regard, as noted above, some embodiments described herein include the method comprising (among others) synchronizing the transceiver IC with other transceiver ICs of the respective set of serially connected transceiver ICs (in the respective transceiver subarray) by resetting the DSM circuit to the predetermined state in accordance with the received at least one synchronization pulse signal; and generating the carrier frequency signal using the PLL circuit that includes the DSM circuit.

Additionally, in one embodiment, to generate the carrier frequency signal using the PLL circuit (that includes the DSM circuit), each transceiver IC is configured to (i) use the DSM circuit to set a divide ratio of the MMD, and (ii) provide a divided-frequency signal from the MMD to the PFD for comparison against the clock signal to further adjust the divide ratio of the MMD. In a further embodiment, the DSM circuit includes a plurality of accumulators, and wherein to reset the DSM circuit to the predetermined state in accordance with the received at least one synchronization pulse signal, each transceiver IC is further configured to set the plurality of accumulators of the DSM circuit in accordance with the received at least one synchronization pulse signal.

As a general matter, various embodiments described herein utilize the DSM circuit (such as the DSM 544) to increase frequency resolution of carrier frequency signals generated by each transceiver IC for processing transmit and receive modulated RF signals. In this regard, in some embodiments, the DSM circuit is configured to use a time varying sequence representing a fractional input portion in combination with a fixed integer input portion to obtain a relatively high-resolution carrier frequency. In one example, with the use of the DSM circuit in the PLL circuit, the VCO frequency resolution may be as fine as 0.114 Hz. The DSM circuit operation is described in more detail below.

As depicted in FIG. 5, the DSM 544 may include a fractional input (FRAC IP) block 572, a DSM accumulator (DSM ACC) 574, a factional output (FRAC OP) block 576, and a summation circuit 578. In operation, the FRACP IP receives an input 570 including a digital fractional input value and generates a corresponding fractional input portion that is input into the DSM ACC 574. As further shown, the DSM accumulator 574 and the FRAC OP 576 form a loop. Generally, in this loop, the fractional input portion passed to the DSM accumulator 574 for the current time is also being referenced back to the DSM accumulator from the FRAC OP 576. Here, the current fractional output is subtracted from the current fractional input portion value stored in the accumulator 574. Although not explicitly shown in FIG. 5, in an illustrative embodiment, the DSM ACC 574 includes multiple accumulators where each accumulator may receive (i) a prior stored version of its accumulated output, (ii) use a feedback from the FRAC OP 576 to subtract the current fractional output, and (iii) pass the result to a subsequent accumulator.

As a result of the above-described operation, the overall fractional output generated by the FRAC OP 576 is provided to the summation circuit 578. In turn, the summation circuit 578 sums (adds) the fractional output portion with an actual integer input portion 580 to generate a desired divisor value provided as an input to the MMD 546. In some embodiments, the output of the DSM 544 is in the form of a divisor control word (e.g., a set of data bits) that configure the MMD 546 what divisor to use. Because of the time varying nature of the fractional input portion, the control word will be varying over time as well. However, for a given interval of operation, on the average, a desired ratio may be achieved.

As noted above, in one embodiment, the transceiver IC 540 is synchronized with other transceiver ICs of its respective transceiver IC subarray by resetting the DSM circuit (such the DSM 544) to the predetermined state in accordance with the received at least one synchronization pulse signal. In this regard, as further shown in the example of FIG. 5, the transceiver 540 is configured to receive such synchronization pulse signal (here, the "SYNC" pulse signal from the beamformer processor 502), where the synchronization pulse signal is provided to the DSM ACC 574 in order to set the plurality of accumulators of the DSM ACC 574 in accordance with the synchronization pulse signal.

In some embodiments, the reset provided by the synchronization pulse signal is a one-time event performed, for example, during startup. Thereafter, transceiver IC synchronization may be obtained automatically because of the globally shared high-speed clock distributed to each transceiver IC (as described above).

During normal operation, the MMD 546 will utilize a sequence of divisor ratios obtained from the DSM 544. In this manner, the sequence of divisors used to divide the VCO frequency from the VCO 552 (or an already frequency-divided signal provided by a divider such as the divider 554) will be the same across all of the transceiver ICs. Hence, in some embodiments, the MMD 546 is configured to utilize the sequence of divisor ratios provided by the DSM 544, where the sequence of divisors is synchronized across all of the transceiver ICs according to the synchronization pulse signal.

As further illustrated in FIG. 5, the divided frequency signal from the MMD 546 is provided to the PFD 548 for comparison against the high-frequency distributed clock signal from clock buffers 536. The PFD 548 generates a phase error signal that is then filtered by the loop filter 550 having a transfer function H (z). The filtered phase error signal is then provided to the VCO 552 to correct for the phase errors. Synchronization of the VCO phase error measurement circuits, such as the DSM 544 divisor sequences, across the transceiver ICs, provides reduction in jitter of the carrier frequencies used for transmit and receive signal processing between the transceiver ICs.

Further, as shown in FIG. 5, the output carrier frequency signal out of the divider 554 may be provided to a digital delay line (DDL) 556. In some embodiments, the DDL 556 is configured to generate carrier frequency signals with multiple phases at an output 558. By way of example, in one embodiment, the multiple phases may include at least four phases of 0, 45, 90, and 135 degrees, with the carrier frequency in the range of 3.6 GHz to 4 GHZ. As will be described in further detail below, the generated carrier phases (and, e.g., their inverses) may be used by a multiphase digital power amplifier for RF modulation. More specifically, in some embodiments, a discrete time-domain signal representative of a DL (downlink) frequency domain IQ data may be modulated onto the generated carrier frequency signal using the multi phase DPA, where the multiphase DPA uses selected phases of the generated carrier frequency signal for the RF modulation. The phases may be selected according to the discrete time-domain signal.

In another aspect, the transmit and receive signal processing circuits within transceiver IC may use numerically controlled oscillators (NCOs), such as an NCO 542 shown in FIG. 5. The NCOs may be used to provide frequency shifting (translation) via time-domain complex multiplications, as described herein with respect to FIGS. 13A, 13B.

The NCOs may also utilize components that may benefit from synchronization by the SYNC pulse signal. In some embodiments, the NCOs utilize a phase accumulator that is incremented by a frequency control word (FCW) at each clock interval. If various NCOs in different transceiver ICs have different phase accumulator values, then this may introduce phase offsets in the transmit and receive signal processing. Synchronization of the NCO phase accumulator circuits across the transceiver ICs provides reduction in phase offsets in the transmit and receive signal processing between the transceiver ICs.

Referring back to the example of FIG. 5, the NCO 542 includes an FCW register 562, a phase accumulator (PACC) 564, and a phase-to-amplitude converter (PAC) 566. As shown in FIG. 5, the FCW register 562 may receive an FCW input 560 (e.g., from a DSP or the like) and responsively generate an FCW to be loaded into the PACC 564 at each clock interval. In general, the FCW is a series of data bits and represents a phase increment value. In some embodiments, the FCW register 562 will be configured to use the FCW to generate a corresponding phase increment (e.g., via a look-up table or the like). In some embodiments, the PACC 564 is configured to add the corresponding phase increment to its internal memory register. In this manner, the phase value accumulated by the PACC 564 through a step-like phase increments is a binary representation of an angle that starts at 0 degrees, ramps up to 360 degrees, wraps around to 0 degrees again and starts all over at a next cycle (clock interval). The output phase value of the PACC 564 is then passed to the PAC 566 for conversion to a complex sinusoid to be output by the NCO 542. The PAC 566 is configured to convert the accumulated phase value from the PACC 564 to a dual output of sine and cosine functions of the angle corresponding to that phase value, representing real and imaginary components forming a complex sinusoid at an NCO output 568.

Additionally, in some embodiments, the NCO 542 receives the synchronization pulse signal to reset the NCO 542 in accordance with that synchronization pulse signal. This may synchronize NCO phase accumulator circuits across the transceiver ICs, as noted above. More specifically, in some embodiments, a phase accumulator of an NCO is reset in accordance with the received synchronization pulse signal. As shown in the example of FIG. 5, the SYNC pulse signal is provided to the PACC 564 of the NCO 542 to reset the PACC 564. With a benefit of such phase accumulation rest in each transceiver IC, all of the transceiver ICs distributed across the active antenna array assembly may start phase value accumulation at 0 degrees.

Note that (as described in connection with the operation of the DSM circuit), some embodiments provide the synchronization pulse signal reset as a one-time event performed, for example, sometime during startup. Thereafter, transceiver IC synchronization may be obtained automatically because of the globally shared high-speed clock distributed to each transceiver IC (as described above).

Figure 13A:
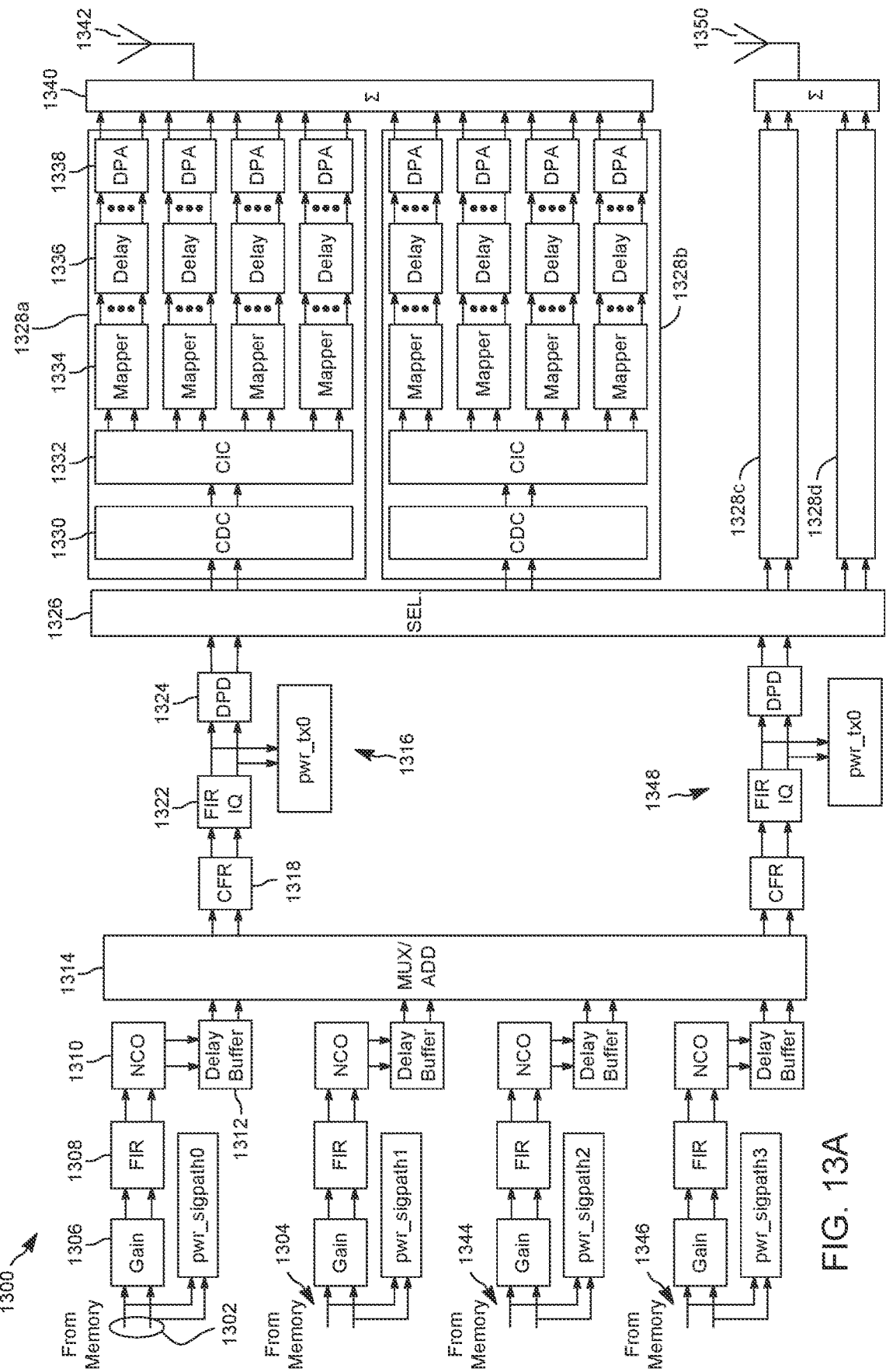
FIGS. 13A and 13B are block diagrams of the transceiver device transmit circuits of FIGS. 12A-B that generate a plurality of amplified multi-carrier RF signals, and of the transceiver device receive circuits of FIGS. 12A-B that generate a plurality of downconverted and sampled OFDM signals, respectively, in accordance with some embodiments.
Figure 13B:
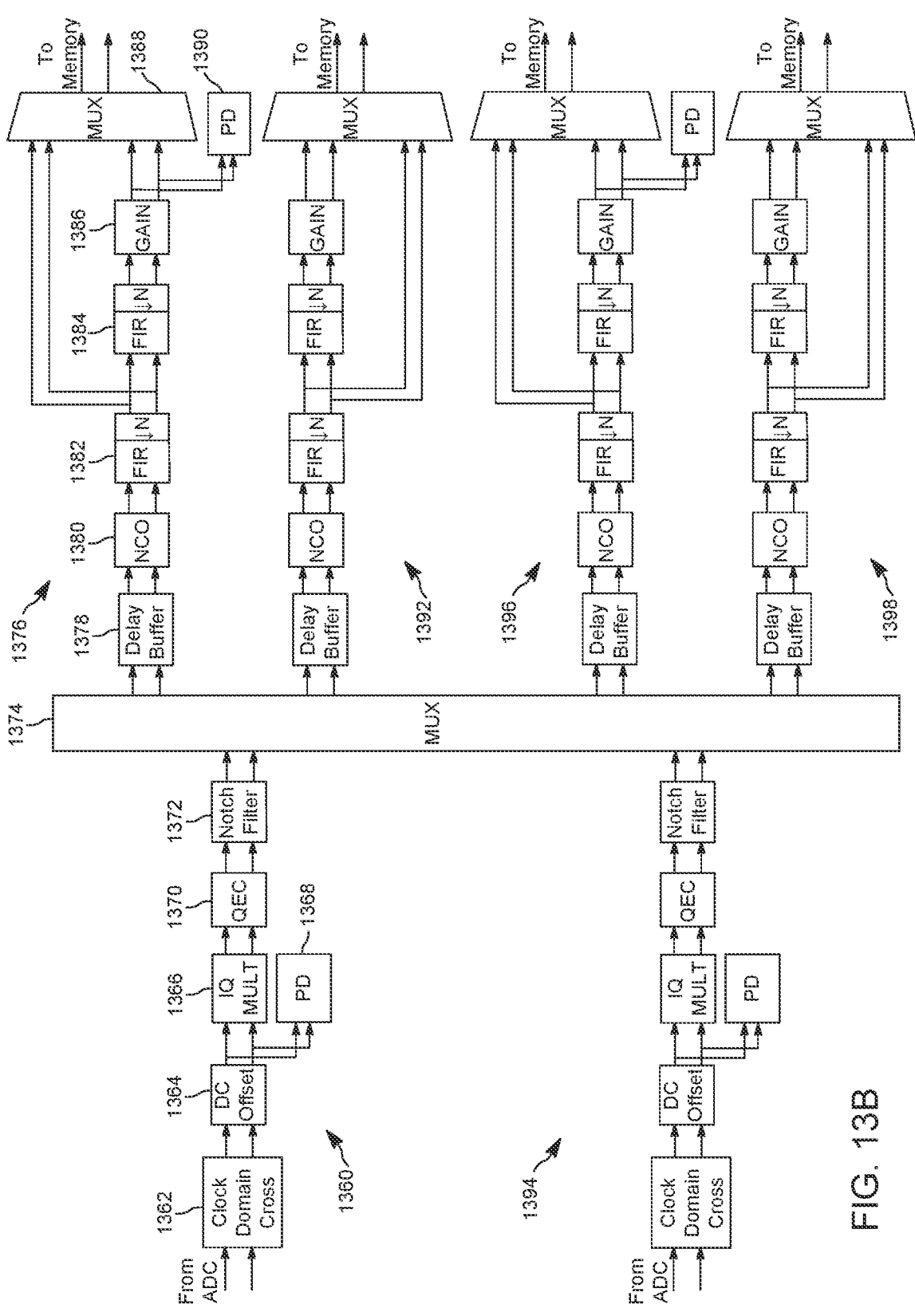

Further, the synchronized NCO 542 may be used to provide frequency shifting (translation) via time-domain complex multiplications, as described herein in more detail in connection with FIGS. 13A, 13B. For example, on a transmit side signal processing (FIG. 13A) within the transceiver 540, the NCO 542 may be configured to multiply the time domain signal by a complex sinusoid function to perform a frequency shift of a baseband signal to a desired frequency range, such as a separate frequency range that does not overlap with other component carriers. On a receive signal processing side (FIG. 13B), a complex multiplication via the NCO 542 can shift the signal received by the transceiver IC 540 to a desired baseband signal.

Additionally, in some embodiments, the synchronized NCO 542 may be used to operate on frequency-domain data to provide incremental phase rotations on the subcarrier-specific frequency-domain IQ data for electronic beam tilt, as described herein. Of course, multiple instances of NCO 542 may be utilized for various signal processing functions as described herein.

Figure 6:
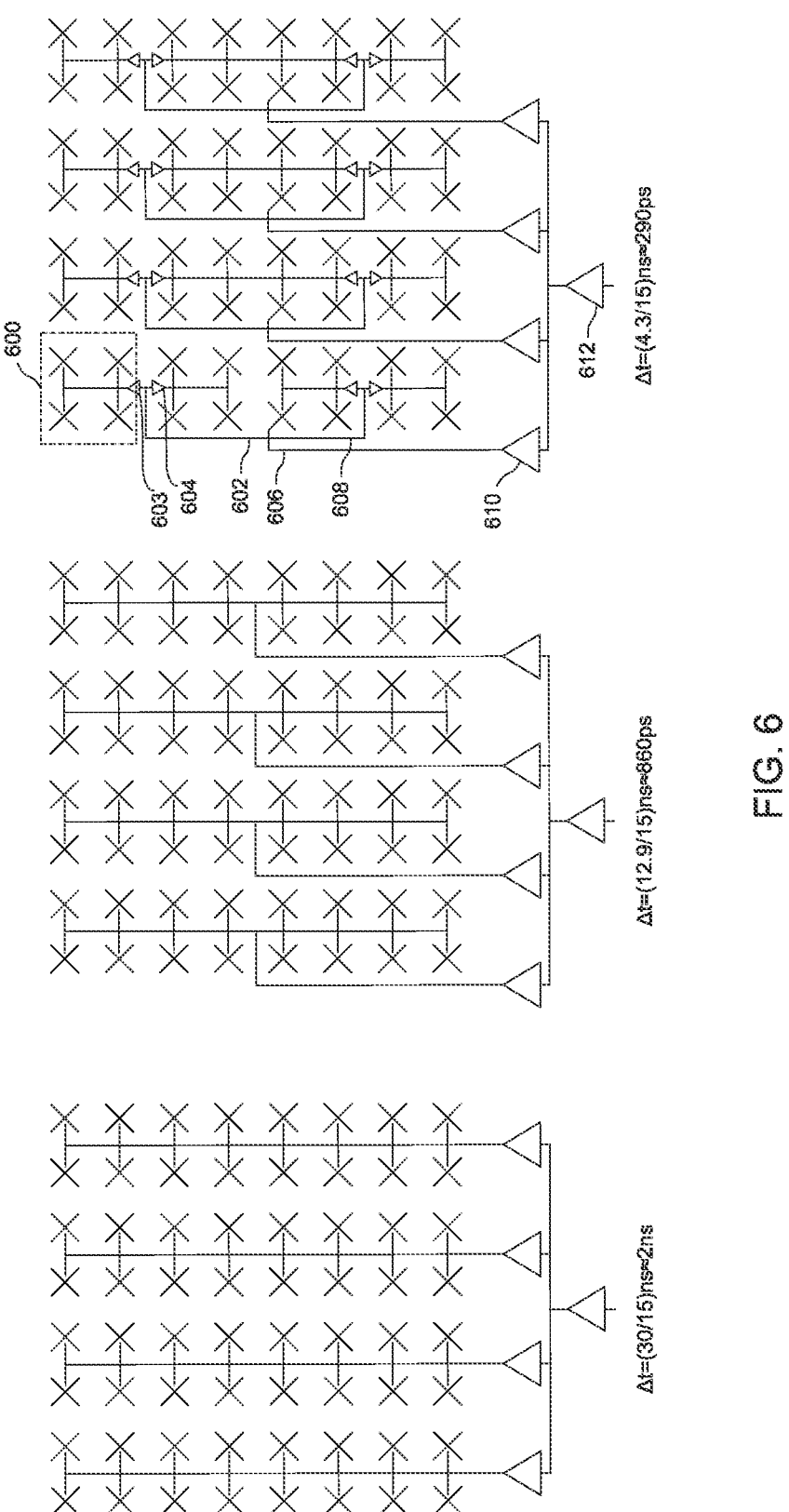
FIG. 6 depicts various clock distribution trees to provide clock signals to the transceiver arrays to reduce clock skew, in accordance with some embodiments.

Clock distribution is configured according to signal lines routed across the panel 102 as depicted in various embodiments illustrated in FIG. 6 to provide clock signals to the transceiver IC subarrays to reduce clock skew. As noted above, in some embodiments, the plurality of clock buffer circuits (e.g., 536) may be configured to adjust clock signal timing at an output of each clock buffer circuit so that the respective clock signal is received by each transceiver IC at substantially same time. In some further embodiments, the plurality of transceiver IC subarrays, the beamformer processor (e.g., 502) and the plurality of clock buffer circuits are all physically co-located within the antenna array assembly, and each clock buffer circuit is physically distributed across the antenna array assembly in physical locations corresponding to physical locations of one or more transceiver IC subarrays.

To illustrate, in one embodiment, the clock signal distribution has a tree-like structure symmetrically providing clock signals to each transceiver IC subarray, such as subarray 600 (which may be one or more transceiver IC subarrays). Specifically, in the embodiment shown, a given branch clock signal from a clock buffer 610 is conveyed to a clock signal conductor 606, which is split to provide clocking signals on lines 602, 608, which drive a further a set of clock buffers (e.g., a buffer 604 driven by the line 602) and then provided to transceiver IC subarray(s), e.g., 600. In one embodiment, the four clock buffers at the level of 610 may be provided by the clock distribution circuit 534. Further, each clock buffer 536 is physically distributed across an antenna array assembly to serve the transceiver IC subarrays that are also physically distributed across an antenna array assembly. In the embodiment shown, each clock buffer may provide eight separate clock outputs to eight separate transceiver ICs. In the embodiment of FIG. 6, one clock buffer circuit is depicted as clock buffers 603, 604, providing clocks signals to the four transceiver ICs within block 600, and the four transceiver ICs below it, as shown.

Figure 7:
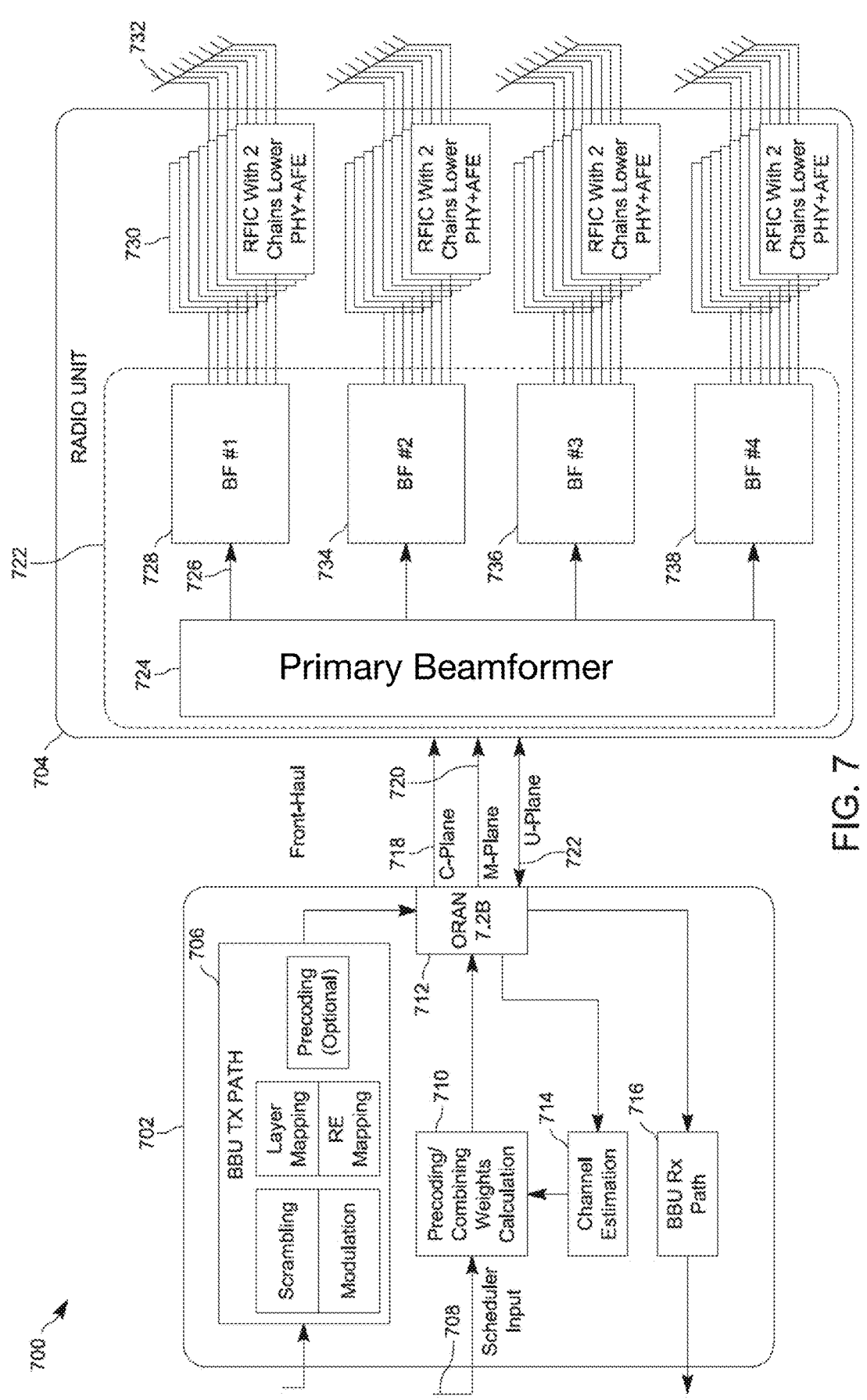
FIG. 7 is a block diagram of a distribution unit connected to a radio unit over a fronthaul data interface, and a hierarchical beamformer architecture within the radio unit, in accordance with some embodiments.

FIG. 7 is a system 700 block diagram of a distribution unit (DU) 702, having a baseband transmit unit 706, a precoding unit 710 (receiving scheduler input 708), channel estimation unit 714, and baseband receive unit 716. The DU 702 includes an ORAN interface 712 for connectivity to a radio unit (RU) 704, over a fronthaul data interface carrying control information (C-Plane 718), management information (M-Plane 720) and user data (U-Plane 722). Also depicted is a hierarchical beamformer architecture 722 within the radio unit 704. The hierarchical beamformer 722 includes main (primary) beamformer processor 724 (or "main beamformer 724," for short), and secondary beamformer processors BF #1 (728), BF #2 (734), BF #3 (736), and BF #4 (738) (or "second-tier beamformers," for short), connected by serial data links (e.g., a link 726 from the main beamformer 724 to BF #1). In one embodiment of the hierarchical beamformer architecture 722, the main beamformer 724 calculates a complete beamforming matrix (as more fully described with respect to FIGS. 8-10) and distributes portions of the beamforming matrix to the second-tier beamformers (e.g., BF #1-4).

Further, the main beamformer 724 also communicates associated layers of user data to each second-tier beamformer. As generally noted above, a beamforming processor within a radio unit may be configured to transmit and receive IQ data packets in either time domain or frequency domain. In some embodiments, each second-tier beamformer may receive associated layers of user data in the form of frequency-domain IQ data from the main beamformer 724, and then calculate signal-port specific aggregated frequency-domain IQ data packets for the transceiver ICs (or transceiver IC subarrays) that they serve. In alternative embodiments, each second-tier beamformer may similarly receive associated layers of user data over the respective serial data link 726 in the form of frequency-domain IQ data from the main beamformer 724, but instead convert that frequency-domain IQ data first into time-domain IQ data and then calculate signal-port specific aggregated IQ data packets (now containing time-domain data instead) for the transceiver ICs (or transceiver IC subarrays) that they serve. In this regard, each of the second-tier beamformers 728, 834, 736, and 738 will be configured with suitable iFFT processing (e.g., a digital signal processor (DSP) configured with suitable programming instructions to execute an algorithm for IFFT operation) for conversion of frequency-domain IQ data into time-domain IQ data.

In the embodiment shown in FIG. 7, the RU 704 is depicted as having beamformer connections to transceiver ICs 730, which may be individual transceiver ICs having two or four signal ports, for driving antenna elements 732, or may be transceiver IC subarrays of serially-connected transceiver ICs, according to various embodiments described herein. The Serdes mux devices of FIG. 4 (e.g.,

404) may also implement a partial BF processor 728 of the hierarchical beamformer apparatus.

As noted above, some embodiments, such as the one depicted in FIG. 7, include a hierarchical beamformer apparatus having the main (primary) beamforming processor 724 and a set of secondary beamformer processors 728, 734, 736, 738. In these embodiments, the primary beam processor assigns beamforming combining weights (in combination with precoder combining weights, as appropriate) to form the full beamforming matrix (as more fully described with respect to FIG. 8), and then distributes portions of the beamforming matrix to respective secondary beamformer processors. More particularly, in some embodiments, the transceiver IC subarrays may be partitioned according to their physical location on the panel (e.g., 100), with each set of transceiver IC subarrays in a given partition being serviced by and interconnected with a corresponding secondary beamformed processor, where the secondary beamformer processors may be distributed across the panel to be adjacent to or within the partition. In some embodiments, each distributed secondary beamformer processor also receives the frequency-domain subcarrier IQ user data layers, and applies the respective distributed beamforming weights to the IQ user data layers to calculate the fully beamformed IQ data points for distribution to its respective partitioned subset of transceiver IC subarrays (where the fully beamformed IQ data points may be in either frequency domain or time domain format, as noted above).

Embodiments of the secondary beamformer processors may include digital signal processor circuitry executing software instructions to perform matrix multiplication operations, or may take the form of data registers interconnected with hardware multiplier circuits to perform the matrix operations. The hardware may include hardware processors, Field Programmable Gate Arrays (FPGAs), dedicated digital logic, or combinations thereof. Further, in some embodiments, the secondary beamformer processors may also each include digital signal processor (DSP) configured to execute software instructions to perform iFFT processing for conversion of frequency-domain IQ data into time-domain IQ data (when, e.g., IQ data received from the primary beamformer processor is in the frequency domain), and to perform FFT processing for conversion of time-domain IQ data into frequency-domain IQ data (when, e.g., IQ data to be sent to the primary beamformer processor is in the time domain).

Figure 8:
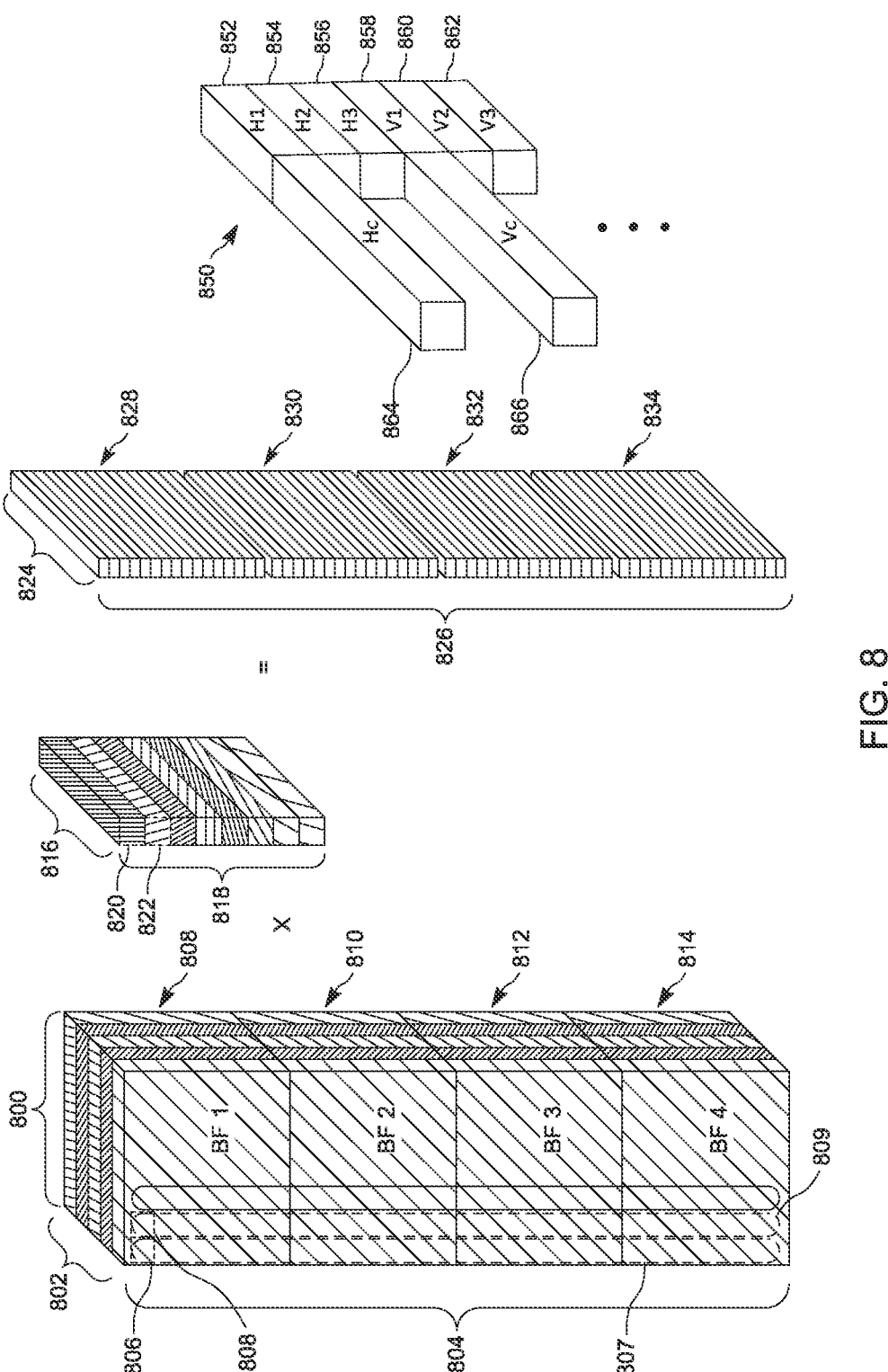
FIG. 8 is a graphical representation of a downlink transmit beamforming operation using a beamforming/precoding matrix operating on user data layers to generate antenna-specific IQ data, in accordance with some embodiments.

FIG. 8 is a graphical representation of a downlink transmit beamforming operation. The user data is represented by layers of data along dimension 818, with subcarrier-specific IQ data of each such layer depicted along dimension 816. In some embodiments, the user data layers along the dimension 818 are frequency-domain IQ data layers (e.g., such as the data layers distributed over the respective links 726 to individual secondary beamformers, as discussed in connection with FIG. 7). Each data layer, such as layers 820, 822, may in fact be aggregated user data for one or more users, with different users being assigned/allocated different subsets of subcarriers represented along dimension 816. Further, a given user may be allocated one or more layers of data (along the dimension 818), such as in the case of spatial multiplexing.

The beamformer (e.g., 202, 300, 400, 724 (the primary beamformer), etc.) calculates beamforming weights for the sets of carriers along dimension 802, specific to the user data layers represented by IQ data along dimension 800, and for the signal ports along dimension 804. As shown in FIG. 8, in accordance with matrix multiplication, the beamforming weights depicted on the top layer of the matrix (i.e., a horizontal slice of the matrix along dimensions 802 by 800) are applied to the data layers (816×818), to generate the top layer (at the top of dimension 826) of the beamformed IQ data, with the subcarriers along dimension 824. Note that for simplicity, the rows, or layers, along beamforming dimension 804 alternate between H and V polarizations, such that elements 806, 808, for example, each include separate signal port weights, such as an "H" weight and a "V" weight, that are in turn independently used to combine the data layers, such as layers 820, 822, respectively. The H/V pairs of weights, that are depicted as interleaved in the matrix columns in the vertical direction (dimension 804), may be related in some modes of operation, or may be fully independently-selected beams for H and V components (i.e., signal ports). A column of the beamforming matrix, such as column 807 or 809, may be applied to a given set of subcarriers in a corresponding given data layer according to a desired beamforming operation. Note that the beamforming matrix may also incorporate precoding matrix calculations to form linear combinations of data layers according to a desired precoding matrix. In this manner, the beamformer matrix is used to operate on user data layers to generate signal port-specific IQ data.

In the embodiment shown in FIG. 8, each set of beamformed IQ data points are packetized and transmitted to a corresponding transceiver IC subarray, as described with respect to FIG. 3. In some embodiments, the packetized IQ data may remain in the frequency domain. However, in other embodiments, the packetized IQ data may be instead converted to time-domain IQ data. In some embodiments, the IQ data for 64 signal ports along dimension 826 include IQ data for 32 H and for 32 V signal ports. Each of the four sections of signal-port specific IQ data 828, 830, 832, and 834, of 826, contain 16 beamformed IQ data packets that may be combined via concatenation into eight separate dual-signal port H/V packets similar in format to the packet 302 of FIG. 3. Each one of those eight HIV IQ packets contains either time-domain or frequency-domain IQ data and is sent over a single serial data link to a respective transceiver IC subarray, such as one of the respective eight transceiver IC subarrays along the row of subarrays 238a depicted in FIG. 2. The IQ data of sections 830, 832, and 834, are each similarly packetized into eight unique IQ data packet streams and sent to eight corresponding transceiver subarrays within transceiver subarray rows 238b, 238c, and 238d, respectively. In this embodiment, each dual-signal port IQ data packet may be commonly processed by two serially-connected transceiver ICs. Alternatively, each of the eight H/V packets obtained from section 828 may be sent to a respective transceiver IC subarray in the first row of transceiver IC subarrays 421a of FIG. 4, with similar distribution of dual-signal port IQ packets to rows of transceiver IC subarrays 421b, 421c, 421d. In the embodiment of FIG. 4, each beamformed IQ data packet is commonly processed by three serially-connected transceiver ICs.

With respect to the multi-tier beamformed IQ data packets 850, which represent beamformed IQ data for one embodiment of a transceiver IC subarray, a beamformer processor may be configured to generate commonly-processed IQ data packet 864 (in either time-domain or frequency-domain format) for one signal port (representing, e.g., subcarrier IQ data for all subcarriers, or a subset of subcarriers of one component carrier of a signal port), and a second commonly-processed IQ data packet 866 for a second signal port (where the second commonly-processed IQ data packet 866 is in either time-domain or frequency-domain format depending, e.g., on the format of the commonly-processed IQ data packet 864 for the first port), for use by transceiver ICs processing signals according to a first tier of beam forming, while also generating higher resolution beamforming of a second tier. The second-tier beamforming is performed according to fully-digital beamformed IQ packets 852, 854, 856 for processing by individual transceiver ICs and their respective horizontal signal ports (H1, H2, H3, as denoted in FIG. 8), and fully-digital beamformed IQ packets 858, 860, 862 for processing by individual transceiver ICs and their respective vertical signal ports (V1, V2, V3, as denoted in FIG. 8), as described previously with respect to FIG. 3. Further, as previously described, the second-tier beamformed IQ data packets may contain subcarriers associated with the same component carrier as the commonly-processed IQ data packets, or subcarriers associated with a second component carrier.

More specifically, a first beamformed IQ data packet may include the IQ data 864 (labeled Hc, where "c" designates IQ data for common processing), 866 (Vc), for common processing by all transceiver ICs in a given transceiver IC subarray (e.g., three separate transceiver ICs, each capable of 2T2R operation). Three additional packets of transceiver IC specific IQ data containing, respectively, data 852 concatenated with data 858; data 854 concatenated with data 860; and data 856 concatenated with data 862, are also transmitted to the transceiver IC subarray, wherein a first transceiver IC combines commonly-processed data 864 with data 852, and combines commonly-processed data 866 with data 858. Another transceiver IC combines commonly-processed data 864 with data 854, and combines commonly-processed data 866 with data 860, and a third transceiver IC combines commonly-processed data 864 with data 856, and combines commonly-processed data 866 with data 862.

Figure 9:
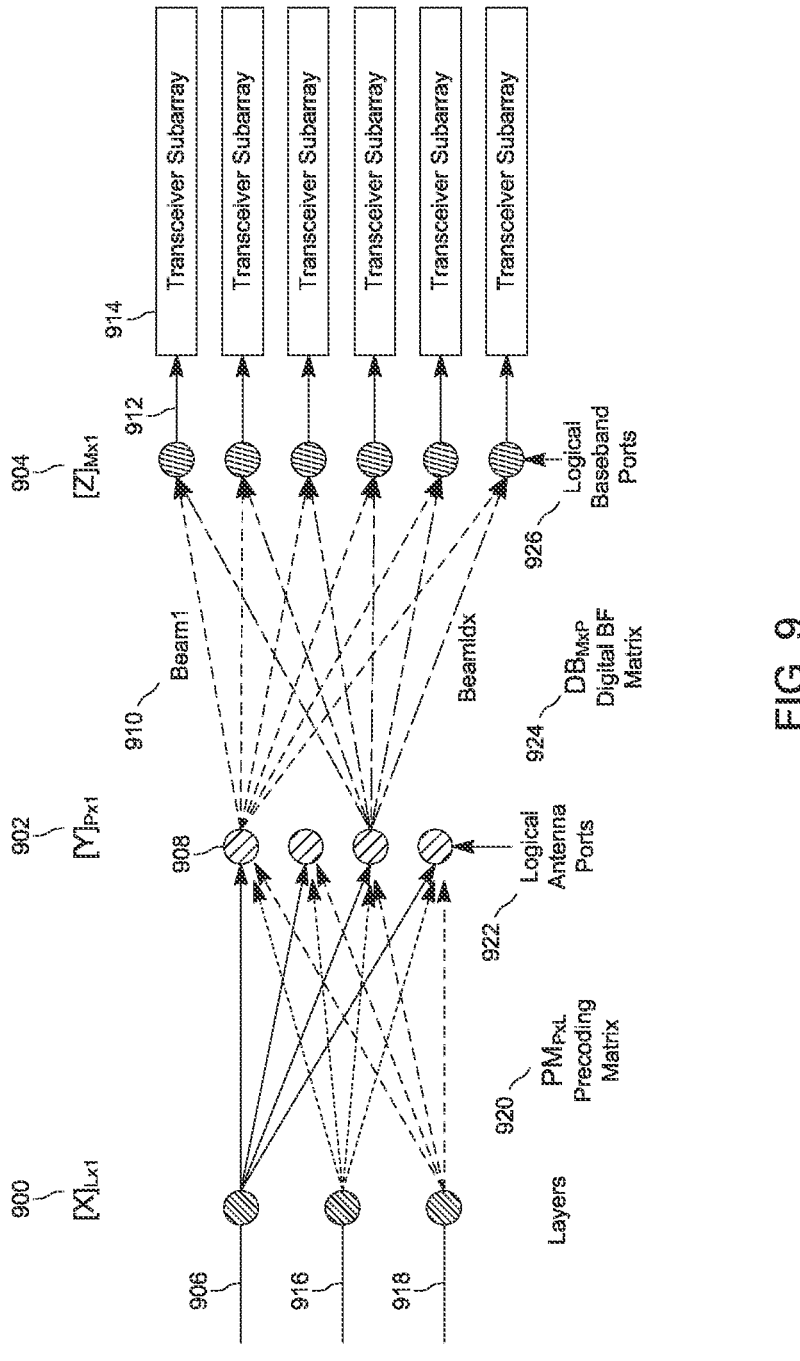
FIG. 9 is an illustration of the conversion of user data layers to beamformed downlink transmit data streams according to a precoding operation followed by a beamforming operation, in accordance with some embodiments.

FIG. 9 is a graphical illustration of the conversion of user data layers 906, 916, 918, represented by matrix [X] 900 of dimension L (i.e., a number of layers), to beamformed downlink transmit IQ data packets at logical baseband ports 926'm,k=uiu represented by matrix [Z] 904 of dimension M. In some embodiments, the user data layers 906, 916, 918 remain in a frequency-domain format until the data associated therewith is beamformed. After the beamforming operation is completed, in some embodiments, the beamformed downlink transmit IQ data may be packetized to form frequency-domain beamformed downlink transmit IQ data. However, in other embodiments, after the beamforming operation is completed, the beamformed downlink transmit frequency-domain IQ data may be instead first converted to beamformed downlink transmit time-domain IQ data, and subsequently packetized prior to transmission to respective transceiver ICs (e.g., transceiver ICs 730, as in FIG. 7) or transceiver IC subarrays (e.g., transceiver subarrays 914, as in FIG. 9). According to the simplified signal processing depicted in FIG. 9, the data layers [X] 900 undergo a precoding operation by matrix PM 920, according to a precoding operation, to obtain logical antenna port signals 922 represented by matrix [Y] 902, followed by a beamforming operation by digital beamforming matrix DB 924, using various beamforming beam indices (e.g., "BeamIdx") having weights such as "Beam1" 910, which applies the beam weights and distributes the appropriately weighted precoded signal at node 908 (which is a pre-coded linear combination of data layers 906, 916, 918) across the various logical baseband ports 926, represented by matrix [Z] 904 (also depicted as IQ data 828, 830, 832, 834). Each beamformed packet of matrix [Z], such as IQ data packet 912, is conveyed to its corresponding transceiver IC subarray 914.

As noted above, in some embodiments, IQ data subjected to precoding and beamforming operation is a frequency-domain IQ data that may then be subsequently packetized to generate a frequency-domain IQ data packet 912 that is conveyed to its corresponding transceiver IC subarray 914. However, in other embodiments, following the precoding and beamforming operation, the beamformed/precoded frequency-domain IQ data that may be instead first converted to time-domain and then packetized to generate a time-domain IQ data packet 912 that is conveyed to its corresponding transceiver IC subarray 914.

Figure 10:
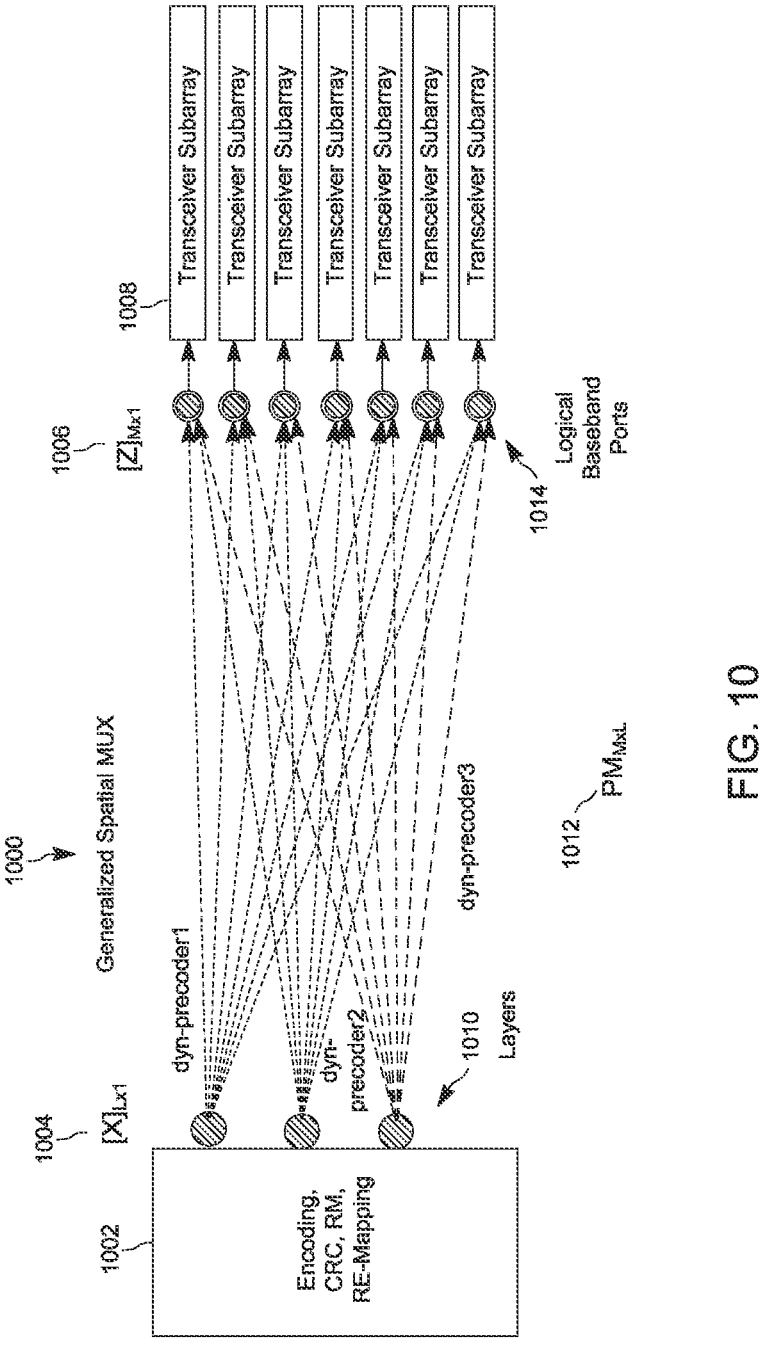
FIG. 10 is an illustration of the conversion of user data layers to beam formed data streams according to a generalized combined precoding and beamforming operation, in accordance with some embodiments.

FIG. 10 is an illustration of the conversion of user data layers to beamformed IQ data streams according to a generalized combined precoding and beamforming matrix 1012 operation 1000 resulting from a matrix multiplication of precoding matrix PM 920 and beamforming matrix DB 924. The user IQ data layers [X] 1004 are provided by processor 1002 which provides user IQ data that has been processed according to standard encoding, cyclic redundancy checks (CRC), rate matching (RM) and resource element (RE) mapping. The data layers [X] 1004 are processed according to the generalized spatial multiplexer/beamformer matrix PM in transformation 1000, to generate the logical baseband port IQ signal packets 1014 represented by signal port IQ data matrix [Z] 1006 for transmission over respective serial data links to transceiver IC subarrays, such as subarray 1008. As used herein, the term "beamforming" and "beamforming matrix" refer to the combined beamforming/precoding operation as described, whether implemented in a single matrix operation, or multiple separate matrix operations. As described in connection with FIG. 9, IQ data packet that is conveyed to its corresponding transceiver IC subarray 1008 from each respective logical baseband port 1014 (and hence following beamforming/precoding operations) may be either a time-domain IQ data packet (if converted to time domain) or a frequency-domain IQ data packet.

Figure 11:
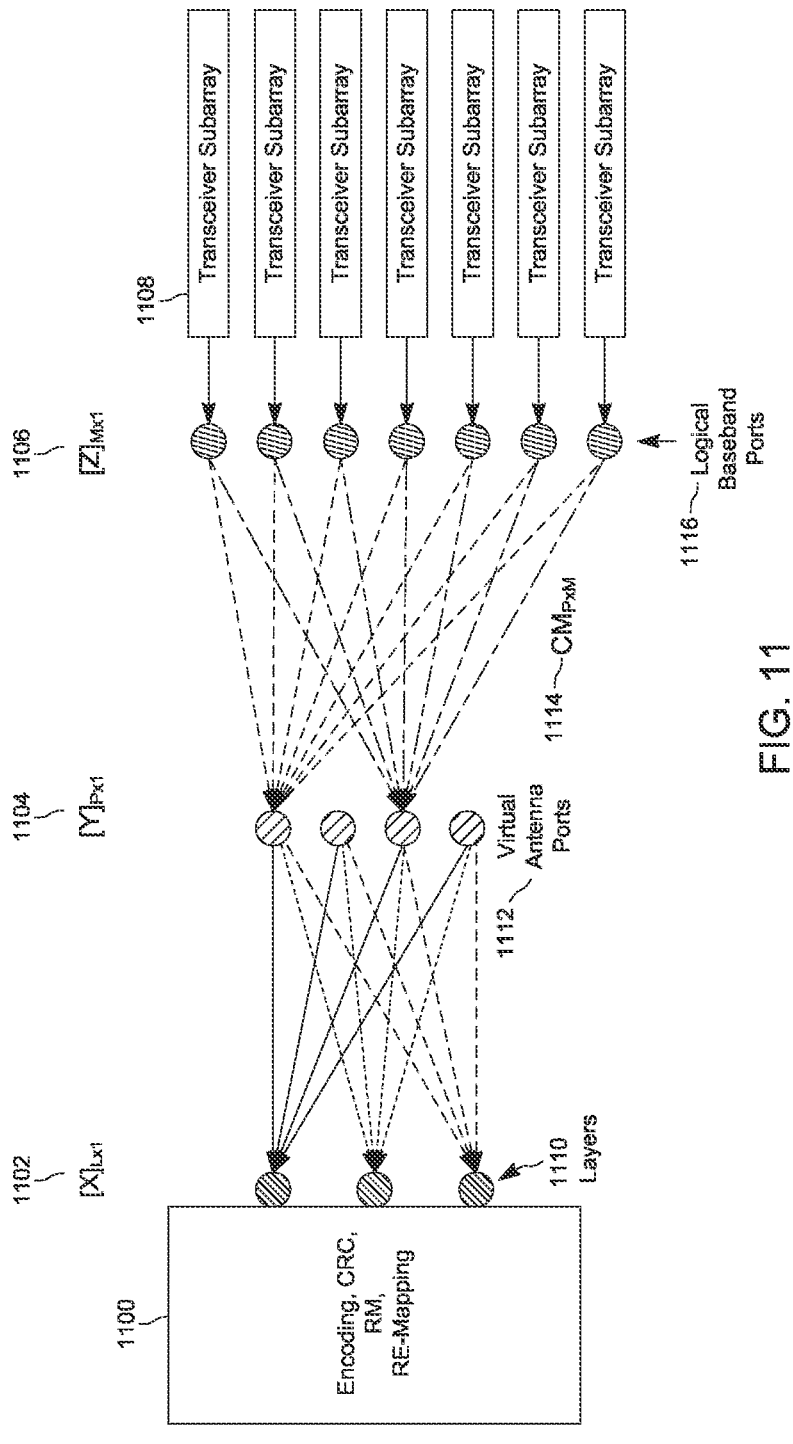
FIG. 11 is an illustration of receive uplink signal processing including receive beamforming and layer decoding, in accordance with some embodiments.

FIG. 11 is an illustration of receive uplink signal processing including receive beamforming and layer decoding. Each transceiver IC subarray 1108 provides received IQ data to a beamformer processor as logical baseband ports 1116 represented by matrix [Z] 1106. In some embodiments, the IQ data received by the beamformer processor may be either frequency-domain IQ data or time-domain IQ data. In the embodiments in which the received IQ data is in the time domain, a conversion to frequency-domain IQ data may be performed at the beamformer processor (when received via the logical baseband ports 1116) via an FFT operation. Virtual antenna port signals 1112 may be formed according to matrix [Y] 1104. Finally, the individual data layers 1110 represented by matrix [X] 1102 may be recovered.

Figure 12A:
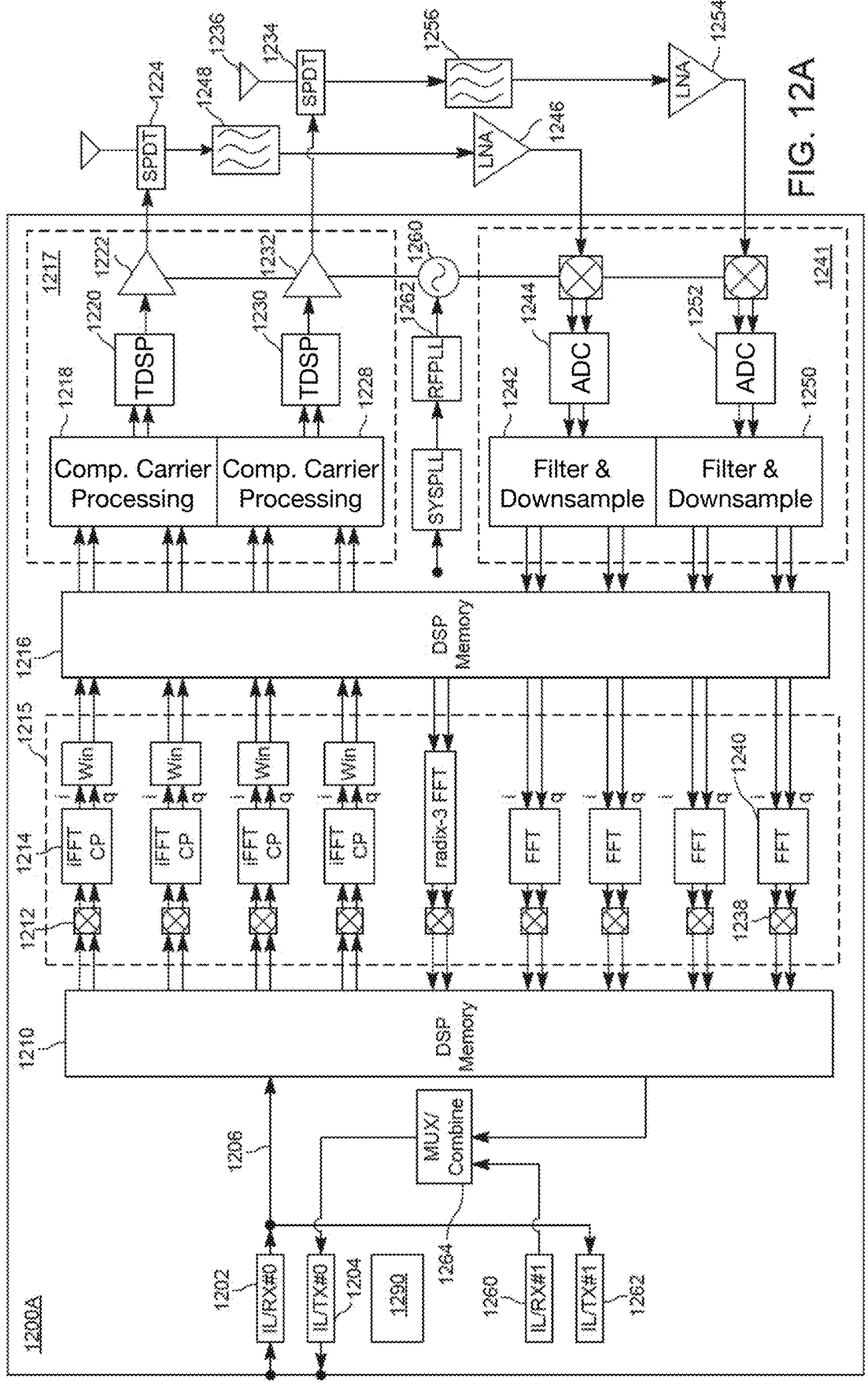
FIG. 12A is an example of a transceiver device architecture for forming groups of serially-connected transceivers, where each transceiver includes an integrated digital signal processor for converting frequency domain digital data to/from time domain digital data, a plurality of integrated digital power amplifiers for converting digital baseband time domain signals to amplified analog RF signals, and analog RF downconverters and analog to digital converters, in accordance with some embodiments.

FIG. 12A depicts a block diagram of an example of a single transceiver IC device architecture, in accordance with some embodiments. The transceiver IC device architecture illustrated in FIG. 12A is also suitable for forming groups of serially-connected transceivers. The transceiver IC is suitable for operation in a FDD mode and in a TDD mode. By way of example, the configuration depicted in FIG. 12A is connected for operation in a TDD mode. Further, it should be noted that the embodiment of FIG. 12A illustrates a scenario in which a transceiver IC 1200 receives and transmits frequency-domain IQ data packets (e.g., directly to/from a beamformer processor (e.g., the BFP 200, 300, 400, 722, etc., or to/from another transceiver IC)). The transceiver IC 1200 includes multiple signal processing paths for both transmit signal processing and receive signal processing. For DL transmit signal processing, transceiver IC 1200 includes a serial data receiver RX #0 1202 for receiving frequency domain IQ data packets via serial data receiver 1202. The serial data receiver 1202 includes a data buffer for storing a number of deserialized data words, and data analysis circuitry to perform packet header analysis, to determine if the received packet is intended for processing by the current transceiver IC and/or if it is intended for processing by one or more other transceiver ICs in the transceiver IC subarray. In the event that the packet is to be processed locally, it is forwarded via 1206, such as via a memory storage or direct memory access (DMA) operation, to DSP memory 1210 that is accessible to the integrated digital signal processor (DSP) 1215. In an alternative embodiment, the header inspection may be performed by the DSP 1215, which places the data in DSP memory 1210 designated for retransmission via a Serdes transmitter TX #1 1262.

The DSP 1215 includes programming stored in non-volatile memory that when executed causes the DSP 1215 to execute an algorithm 1214 for converting frequency-domain digital IQ data to time-domain digital data. The stored algorithm instructions contain processor instructions for an iFFT operation 1214, and further includes instructions for extending the converted data by the addition of a cyclic prefix (CP).

In subarray beamforming as described herein, each IC in a given subarray processes the same frequency-domain (or, alternatively, time-domain) IQ packets for transmission (referred to herein as "commonly processed" IQ data), and during reception generates frequency-domain (or, alternatively, time-domain) IQ packets that are aggregated at each transceiver IC as they traverse the set of cascaded set of transceiver ICs on their way towards the beamformer processor(s) (e.g., secondary beamformer processors and a primary beamformer processor, as described previously in connection with FIG. 7). Because the signals being commonly processed by the transceiver ICs are aggregated beamformed signals with components from multiple data layers and multiple individual beams, it is not possible to adjust individual beams within a given subarray of commonly processed IQ data packets. However, it is possible to apply unique phase rotations to the aggregated beamformed signal at each element (i.e., each signal port) in the subarray that will have the effect of tilting the entire composite/aggregated beamformed signal. Thus, when beam tilt is desired, the transceivers are configured to incrementally adjust the phases of each commonly processed IQ data packet according to the position of the radiating elements driven by the transceiver IC in the IC subarray. Without incremental adjustment of the phase at each subarray element, a true tilt is not obtained, as only perhaps only one of the elements would be aligned, and the wavefront from the remaining elements would incrementally lead (or lag) according to their position in the subarray for a given downward (upward) tilt. In this manner, beam tilt may be obtained through digital baseband signal processing without adjusting any signal component directly in the analog domain (including not adjusting VCO phases).

More specifically, when a linear array of antenna elements is physically "tilted" (either a vertical array tilted in altitude up/down, or a horizontal array tilted in azimuth left/right), the result may be viewed as an incremental time delay of signal transmissions (or reception) across the antenna elements of the array that thereby changes the direction in which the propagation wave fronts add constructively to form a main lobe (and destructively combine to form nulls). Electronic tilt is the process of imposing appropriate signal delays without actually physically repositioning the antenna.

The relationship between a time delay and the corresponding phase change of a signal is dependent upon the tilt angle as well as the frequency of the signal. That is, a given time delay between two signals amounts to a linear phase shift in the frequency content of the signals where a given time delay results in lower phase changes of lower frequencies within the signal and linearly higher phase changes at higher frequencies. Thus, for narrow-band signals, a specific time delay roughly translates to a specific phase shift between the delayed signals. But for wideband signals, such as OFDM signals of 50 or 100 MHz or greater, a given time delay affects the phase of the OFDM subcarriers differently. In a phased array where each subcarrier is nonetheless rotated by the same phase, this results in a non-linear phase characteristic commonly referred to as beam squint. Some amount of beam squint is acceptable in OFDM signals on the order of 100 MHz in bandwidth.

Thus, electronic beam tilting in a physically-static array may be accomplished by various methods carried out by the individual transceivers described herein, including: (i) applying an incremental phase rotation to each subcarrier frequency-domain IQ data point (via, e.g., and NCO), (ii) applying a constant phase rotation to each subcarrier frequency-domain IQ data point (e.g., via a complex multiplication), (iii) applying a constant phase rotation to each sample of the baseband time domain signal (e.g., via a complex multiplication), (iv) imposing time delays in the discrete time domain signals of the transmit baseband signals, or, (v) a combination of the above methods. Note that methods (ii) and (iii) will result in some amount of beam squint distortion.

In this regard, beam tilt may be implemented by applying a linearly increasing phase rotation across the subcarriers by complex multiplier 1212 implemented as a Numerically Controlled Oscillator (NCO) as described with respect to NCO 542 of FIG. 5. The NCO 1212 is configured to provide a sequence of complex numbers having a linearly increasing phase for multiplication by the corresponding sequence of subcarrier frequency-domain IQ data points. For a desired beam tilt, the initial phase and the incremental rate at which the phase increases from subcarrier to subcarrier is determined and the values are loaded into the NCO phase accumulator 564 and the FCW register 562, respectively. The phase increment value may be determined according to one or more various factors, including (i) a desired beam tilt angle, (ii) subcarrier spacing, (iii) the carrier frequency, and (iv) the location of the particular radiating element being driven by the transceiver IC. In general, to achieve a beam tilt of angle $\phi$, the phase rotation $\theta$ for a given subcarrier frequency $(1/\lambda)$, at a location n within the array, is given by $$\theta = n\pi(\lambda_c/\lambda)\sin(\phi),$$

where the elements are spaced a distance $d=\lambda_c/2$ apart, for carrier wavelength $\lambda_c$. In receive beam tilt operation, the NCO may be implemented in complex multiplier 1238 after FFT processing.

Alternatively, complex multiply 1212 may be configured to provide a constant phase rotation to each frequency domain IQ data point prior to transformation via iFFT 1214 to implement an approximate time delay to achieve beam tilt. For a desired beam tilt, the frequency-domain phase rotation, represented by a single complex number, is determined and the value loaded into the complex multiplier 1212. The frequency domain phase value may be determined according to one or more various factors, including (i) a desired beam tilt angle, (ii) the array location of the particular radiating element being driven by the transceiver IC, and (iii) the carrier frequency. In receive beam tilt operation, the constant phase rotation may be implemented in complex multiplier 1238 after FFT processing.

In some embodiments, beam tilt is implemented by applying a constant phase rotation to each sample of the baseband time domain signal (e.g., via a complex multiplication). For a desired beam tilt, the time-domain phase rotation, represented by a single complex number, is determined and the value loaded into a complex multiplier (which may also simultaneously implement a gain function). Such complex multiplier may be, for example a complex multiplier 1306, as depicted in FIG. 13A, that illustrates transmit time-domain signal processing portion of a transceiver IC, as will be described in more detail below. The time-domain phase value may be determined according to one or more various factors, including (i) a desired beam tilt angle, and (ii) the location of the particular radiating element being driven by the transceiver IC. In a receive beam tilt operation, the constant phase rotation may be, for example, implemented in a complex multiplier (while also implementing a gain function) prior to FFT processing that may be carried out either at the transceiver IC or beamformer processor(s), as noted hereinabove. Such complex multiplier may be, for example a complex multiplier 1386, as depicted in FIG. 13B, that illustrates receive time-domain signal processing portion of a transceiver, as will be described in more detail below.

In some further embodiments, beam tilt is implemented by imposing time delays (instead of phase rotations via complex multiplication, as in the above-described embodiment) in the discrete time domain signals of the transmit baseband signals. For a desired beam tilt, the time-domain delay is determined and the value loaded into a delay buffer 1312, which is shown in FIG. 13A. The time-domain delay value may be determined according to one or more various factors, including (i) a desired beam tilt angle, (ii) the time-domain sample rate, and (iii) the location of the particular radiating element being driven by the transceiver IC. In a receive beam tilt operation, the time delay may be implemented in a delay buffer 1378, which is shown in FIG. 13B.

In yet further embodiments, a combination of the above methods may be used. In one particular embodiment, electronic beam tilt may be composed of a coarse adjustment and a fine adjustment, where a coarse beam tilt may be implemented by applying a linearly increasing phase rotation across the subcarriers by complex multiplier 1212 implemented as an NCO using a limited resolution or limited number of bits, and the fine resolution may be implemented by a further adjustment in the time domain, such as a time delay or a time-domain constant phase rotation.

For the various embodiments of beam-tilt phase adjustments, the phase rotations may be specified by control message(s) provided to the transceiver ICs. The specific phase values may be provided, or a phase index value may be included in the control message, or in the header of the IQ data packet itself. The phase index value may be used to retrieve precomputed phase values from, e.g., a look up table. In some embodiments, transceiver ICs may combine factors to calculate the specific rotations to be applied (e.g., a desired tilt angle may be provided, and the transceiver IC may adjust the phase rotations according to its predetermined location within the array and/or transceiver IC sub-array). Such phase rotations may be used to implement a beam-tilt phase rotation.

In some embodiments, the beam tilt may be implemented using a combination of linear phase rotations applied in the frequency domain, followed by either a constant phase rotation in the time domain, or a time delay in the time domain after iFFT conversion. In some embodiments, the frequency domain rotations may achieve a coarse tilt, or an approximation of the desired beam tilt, while the time domain rotations may a fine tilt. This may be particularly useful when larger tilt angles are desired.

In further embodiments, a dynamic adjustment of tilt angles may be implemented on a slot by slot basis, greatly enhancing the available scan range and coverage from a panel array using subarray beam forming. In such embodiments, the beam tilt information as well as which time slots, subcarriers or component carriers may be specified via in control messages.

In one embodiment, an electronic antenna beam tilt is implemented in a transceiver subarray by distributing a beamformed IQ data packet to a plurality of serially-connected transceiver ICs for common processing by the transceivers. The IQ data packet has individual IQ values for a respective plurality of subcarriers. At each transceiver IC, an electronic beam tilt phase rotation is applied. In some embodiments, applying a beam tilt phase rotation is done by altering the phase of each IQ modulated subcarrier based on a desired antenna tilt and an array position. The phase alteration may be a constant phase rotation applied to all subcarriers, or it may be a linearly increasing phase rotation that increases from subcarrier to subcarrier. The phase adjustment may be specified according to one or more control messages. The control messages may be specific to a given subarray, a transceiver IC within a subarray, or to an individual transceiver IC. The phase adjustment may be specified in terms of a time delay, frequency-domain multiplicative rotation, or time domain complex rotation, or equivalent data. A given transceiver IC may also combine the phase adjustment data with array position data unique to the transceiver IC to calculate the final phase adjustment.

Referring back to FIG. 12A, the time-domain IQ data is stored in DSP memory 1216, which is accessible by transmit time-domain signal processing circuit 1217 (further described with respect to FIG. 13A). In the embodiment of FIG. 12, circuit 1217 includes two parallel component carrier processing circuits 1218, 1228, and corresponding time domain signal processing (TDSP) circuits 1220, 1230, each providing a baseband time-domain OFDM signal (each being a single or multi-component carrier signal) to a corresponding digital power amplifier (DPA) circuit 1222, 1232.

In one embodiment, the DPAs 1220, 1232, perform simultaneous RF modulation and amplification, which amplification may be a final power amplification of the RF signals. In some embodiments, the DPAs provide for a pre-amplification of the RF signals that are then applied to an external power amplifier that drives the radiating antenna element(s). The external power amplifiers are distributed across the active antenna panel assembly in an element-wise adjacency. The DPAs 1220, 1232 are provided with a plurality of RF carrier phases originating from the system phase-locked-loop (SYSPLL), further processed by the synchronized RF PLL 1262, which drives the RF carrier generator VCO 1260. The selected RF carrier phases are used to switch amplifier cells within the DPAs. As described herein, the specific RF carrier phases, and the respective number of activated cells that determine their relative magnitudes, are selected according to the time-domain IQ data points provided by circuits 1220, 1230.

The transceiver IC 1200A also includes a receive time-domain signal processing circuit 1241 (further described with respect to FIG. 13B) for downconverting analog RF signals via IQ mixers driven by the VCO 1260, and which generate separate baseband I and Q analog signals for sampling by an analog to digital converter (ADC) within circuits 1244, 1252. The sampled signals are then processed by time-domain filtering and downsampling circuits 1242, 1250. The processed time domain signals are then stored in DSP memory 1216 for further processing, including CP removal and conversion to the subcarrier-specific frequency domain IQ data via FFT algorithm ("FFT" 1240 in FIG. 12). The DSP 1215 includes programming stored in non-volatile memory that when executed causes the DSP 1215 to execute an algorithm for converting time domain digital data to frequency domain digital IQ data. NCOs (e.g., 1238) may then be used to apply a linearly increasing phase rotation to each frequency domain IQ (i.e., subcarrier) value, which is also an embodiment of electronic beam tilt. The receive IQ frequency domain data is then processed by MUX/combine circuit 1264, for transmission to the serial data bus via serial transmitter TX #0 1204.

Figure 12B:
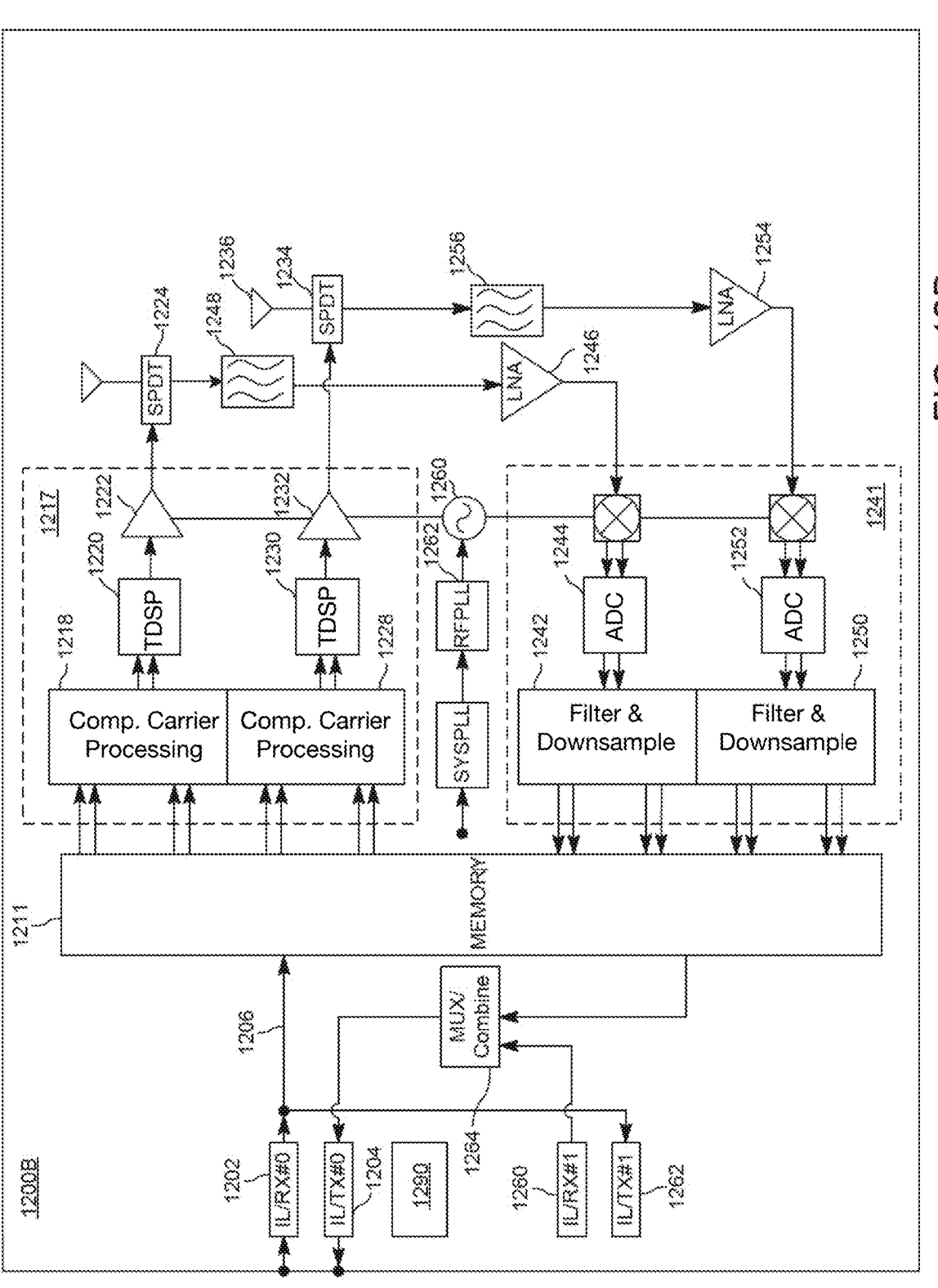
FIG. 12B is another example of a transceiver device architecture excluding an integrated digital signal processor for converting frequency domain digital data to/from time domain digital data, in accordance with some embodiments.

FIG. 12B depicts a block diagram of another example of a single transceiver IC device architecture, in accordance with some embodiments. Similar to the embodiment of FIG. 12A, the transceiver IC device architecture illustrated in FIG. 12B is also suitable for forming groups of serially-connected transceivers. Like in FIG. 12A, a transceiver IC 1200B is suitable for operation in a FDD mode and in a TDD mode. By way of example, the configuration depicted in FIG. 12B is connected for operation in a TDD mode. Further, it should be noted that unlike the embodiment of FIG. 12A, an alternative embodiment of FIG. 12B illustrates a scenario in which the transceiver IC 1200B receives and transmits time-domain IQ data packets to/from a beam-former processor (e.g., directly from/to the BFP 200, 300, 400, 722, etc., or to/from another transceiver IC). The transceiver IC 1200B includes multiple signal processing paths for both transmit signal processing and receive signal processing. However, in the present embodiment, the transceiver IC 1200B is configured to process IQ data entirely in time domain, without an additional processing element(s) involved a frequency-to-time domain conversion of IQ data (transmit side) and a frequency-to-time domain conversion of IQ data (receive side), as described in connection with the transceiver IC device architecture shown in FIG. 12A.

More particularly, for DL transmit signal processing, the transceiver IC 1200B includes the serial data receiver RX #0 1202 that is now configured for receiving time-domain IQ data packets via the serial data receiver 1202. As in the transceiver IC device architecture of FIG. 12A, the serial data receiver 1202 includes a suitable data buffer for storing a number of deserialized data words, and data analysis circuitry to perform packet header analysis, to determine if the received time-domain IQ data packet is intended for processing by the current transceiver IC and/or if it is intended for processing by one or more other transceiver ICs in the transceiver IC subarray. In the event that the packet is to be processed locally, it is forwarded via the link 1206, such as via a memory storage or direct memory access (DMA) operation, to a memory 1211. In an alternative embodiment, the header inspection may be performed, e.g., via a dedicated DSP element (not shown) coupled to the memory 1211, which places then places the data in the memory 1211 to be retransmitted via the Serdes transmitter TX #1 1262.

Recall that in the embodiment of FIG. 12A, a frequency-domain IQ data packet was stored in the DSP memory 1210 accessible by the DSP 1215 configured to execute the algorithm 1214 for converting frequency-domain digital IQ data to time-domain digital IQ data, where such algorithm includes processor instructions for the iFFT operation 1214, and further for extending the converted data by the addition of a cyclic prefix (CP)). Although not explicitly shown, in some embodiments, the memory 1211 may be a DSP memory readable by a DSP processor (not shown) configured with suitable programming instructions to execute an addition of the CP to the time-domain digital IQ data. In an alternative embodiment, such CP addition could instead be carried out by a dedicated circuit (not shown) configured to, e.g., re-read a portion of the time-domain IQ data from the memory 1211, whereby such re-read portion could serve as the CPE and be subsequently fed by the dedicated circuit to the transmit time-domain signal processing circuit 1217 with the rest of the time-domain IQ data.

Note that the addition of the CP to the time-domain IQ data would normally increase an amount of data for subsequent time-domain baseband signal processing. Hence, ideally, the addition of CP occurs at the digital front end circuitry of transceiver IC 1200B to reduce the amount of data that would need to be communicated over serial data links between a beamformer processor and a given transceiver IC/transceiver subarray. However, in alternate embodiments, it may be possible that the addition of the CP occurs at the beamformer processor instead.

Referring back to FIG. 12B, in some embodiments, the time-domain IQ data stored in the memory 1211 is accessible (directly or indirectly) by the transmit time-domain signal processing circuit 1217 (further described with respect to FIG. 13A). As described previously in connection with FIG. 12A, the circuit 1217 includes the two parallel component carrier processing circuits 1218, 1228, and the corresponding time-domain signal processing circuits 1220, 1230, each providing a baseband time-domain OFDM signal (each being a single or multi-component carrier signal) to the corresponding digital power amplifier (DPA) circuit 1222, 1232. The operation of the DPAs 1220 and 1232 is essentially the same as that described in connection with the embodiment of FIG. 12A and will be omitted here for brevity.

As in the transceiver IC 1200A, in some embodiments, the transceiver IC 1200B similarly includes the receive time-domain signal processing circuit 1241 (further described with respect to FIG. 13B) for downconverting analog RF signals via IQ mixers driven by the VCO 1260, and which generate separate baseband I and Q analog signals for sampling by the analog to digital converter (ADC) within circuits 1244, 1252. As in FIG. 12A, the sampled signals are then processed by the time-domain filtering and downsampling circuits 1242, 1250.

In the present embodiment, the processed time domain signals may be then stored in the memory 1211 for further processing. In some embodiments, the further processing may include CP removal. As noted above, in some embodiments, the memory 1211 may be a DSP memory readable by a DSP processor (not shown) configured with suitable programming instructions to further execute the removal of the CP on the receive side from the time-domain digital IQ data. In an alternative embodiment, such CP removal could be instead carried out by a dedicated circuit (not shown) configured to, e.g., re-read a portion of the time-domain IQ data from the memory 1211, remove the rea-read portion as the CP, and store modified time-domain IQ data back in the memory 1211.

As noted above, in some embodiments the transceiver IC 1200B is configured to process IQ data entirely in time domain, without an additional processing element(s) involved in a frequency-to-time domain conversion of IQ data (transmit side) and a frequency-to-time domain conversion of IQ data (receive side), as described in connection with the transceiver IC device architecture shown in FIG. 12A. Hence, on the receive side, the processed time-domain digital data does not need to be converted to frequency-domain digital IQ data via an FFT operation as in the embodiment of FIG. 12A. Rather, the receive time-domain IQ data may be processed by the MUX/combine circuit 1264, for transmission to the serial data bus via the serial transmitter TX #0 1204, such for transmission to a beamformer processor for example. Subsequent time-to-frequency IQ data conversion may be carried out at the beamformer processor, as described earlier herein.

As discussed earlier, when beam tilt is desired, transceiver ICs described herein may be configured to incrementally adjust phases of each commonly processed IQ data packet according to the position of the radiating elements driven by a transceiver IC in a given IC subarray. Further, electronic beam tilt is the process of imposing appropriate signal delays without actually physically repositioning the antenna. As discussed earlier, electronic beam tilting in a physically-static array may be accomplished by various methods carried out by the individual transceivers described herein, including: (i) applying an incremental phase rotation to each subcarrier frequency-domain IQ data point (via, e.g., and NCO), (ii) applying a constant phase rotation to each subcarrier frequency-domain IQ data point (e.g., via a complex multiplication), (iii) applying a constant phase rotation to each sample of the baseband time domain signal (e.g., via a complex multiplication), (iv) imposing time delays in the discrete time domain signals of the transmit baseband signals, or, (v) a combination of the above methods. Detailed discussion of those various method have been provided hereinabove, and hence will not be repeated.

However, note that, in the embodiment of FIG. 12B (unlike in that of FIG. 12A), the transceiver IC 1200B is configured to process IQ data entirely in time domain. Hence electronic beam tilting methods that involve applying, e.g., phase rotations (e.g., incremental or constant) to each subcarrier frequency-domain IQ data point (or any other suitable frequency-domain-based electronic beam tilting technique(s) for that matter) are not applicable to the transceiver IC device architecture in FIG. 12B. Instead, the electronic beam tilt may be achieved via any suitable time-domain techniques, such as by applying a constant phase rotation to each sample of the baseband time domain signal (e.g., via a complex multiplication) or imposing time delays in discrete time domain signals of transmit baseband signals, as discussed herein. For example, in FIG. 12B, time-domain IQ data (post CP addition operation) passed to the transmit time-domain signal processing circuit 1217 (further described with respect to FIG. 13A) and processed for electronic beam tilt therein by performing complex multiplication in time domain or by imposing time delays.

FIG. 13A is a block diagram 1300 of an example of the time domain signal processing circuit 1217, in accordance with some embodiments. Time-domain IQ data is received from memory, either directly or indirectly, over lines 1302 (and similarly, lines 1304, 1344, and 1346), and is applied to signal path power detector and to a gain unit 1306 for adjusting the power level. As described above, the memory may be a DSP memory or may be memory coupled to a dedicated circuit (e.g., as in some embodiments described above in connection with FIG. 12B). Further, in some embodiments, the gain multiplier may also include a complex phase that rotates each time domain value by the same phase. This time-domain phase rotation may be used to apply an approximate time delay that can be used to implement an electronic beam tilt. While this corresponds to a phase rotation of each constituent subcarrier by the same phase, rather than a linearly incremented phase rotation, it is sufficiently accurate for bandwidths on the order of 100 MHz in the frequency ranges of the bands used for LTE and 5G signal. The signal is filtered by FIR filter stage 1308, which also includes one of more interpolation stages to increase the sample rate of the discrete time domain signal. The discrete time digital UL signal is then processed by numerically controlled oscillator (NCO) 1310. The NCOs (e.g., 1310) may be configured to multiply the time domain signal by a complex sinusoid function to perform a frequency shift of the baseband signal to a desired frequency range, such as a separate frequency range that does not overlap with other component carriers. In some embodiments, one transmit signal may be slightly shifted up in frequency, while another transmit signal, such as a separate component carrier provided on connection 1304, may be slightly shifted downward with the corresponding NCO, such that the two time domain signals representing e.g., two component carriers, may be added together without the frequency content of one signal overlapping that of the other. The signal is further processed by a delay buffer 1312 that allows refined time offset adjustments of the transmit signal. In some embodiments, the delay buffer 1312 is used to provide a per-carrier delay adjustment. The delay buffer 1312 compensates for the different processing times of the different supported sub carrier spacing (SCS) and bandwidths. Assuming all the filtering is done with a FIR filter for every carrier, the adjustable delay per carrier is the difference between the larger delay and the shortest one, on the order of 10 us. However, sharing that function with windowing relaxes that requirement.

Other discrete time domain signals on the lines 1304, 1344, and 1346 are similarly processed as the discrete time domain signal on the line 1302. In some embodiments, the discrete time domain signals on the lines 1302, 1304, 1344, and 1346 result from the frequency-domain to time-domain conversion from the DSP 1215, as described in more detail in connection with FIG. 12A. In other embodiments, the discrete time domain signals on the lines 1302, 1304, 1344, and 1346 result from time-domain IQ data received by a transceiver IC, as described in more detail in connection with FIG. 12B. Each of those signals may then be combined and/or routed via MUX/ADD circuit 1314 to transmit signal processing circuits 1316, 1348, for crest factor reduction (e.g., a CFR 1318), further FIR filtering (including further upsampling/interpolation) and IQ multiplication to perform phase adjustments and/or corrections (e.g., a FIR IQ circuit 1322). Each signal may also undergo digital pre-distortion (DPD, e.g., a DPD circuit 1324) to correct for phase and amplitude distortion present in the modulator/amplifiers DPA 1328a, 1328b, for a first signal port 1342 from an RF signal summer 1340 (and for DPA 1328c, 1328d, for a signal port 1350). Each section 1328a-d of the respective DPA (e.g., the DPA 1222 and 1232, as shown in FIGS. 12A-B) includes a clock domain crossing circuit 1330, Cascaded Integrator-Comb (CIC) filters 1332, mapper circuits 1334, delay circuits 1336 and a final DPA stage 1338.

FIG. 13B depicts an example of the receive time-domain signal processing circuit 1241, in accordance with some embodiments. Digital samples from the ADCs are received by a clock domain crossing circuit 1362 and adjusted for DC offsets by a DC offset circuit 1364. An IQ multiplier 1366 may be used to provide an automatic gain control of the baseband time-domain signal in response to power measured by power detector a PD 1368. A Quadrature Error Compensation circuit (QEC 1370) provides compensation for frequency dependent quadrature error in the RX analog frontend. In one embodiment, the QEC circuit 1370 divides the time domain signal (having, e.g., a sample rate of 245.76 MHz) into 16 frequency bins of 15.36 MHz each. Each frequency bin is added to the mirror frequency bin content shaped by a complex multiplier. Notch filter 1372 may be used to reduce any undesired out-of-band signals.

The MUX 1374 may be configured so as to selectively direct the receive signal samples from either path RX0 (1360), or RX1 (1394) to any or all the RX signal paths 1376, 1392, 1396, or 1398. Some examples of different possibilities are: RX0 to all 4 RX signal paths; RX1 to all 4 RX Signal paths; RX0 to RX Signal path 1376 and 1392 and RX1 to RX Signal path 1396 and 1398; and, RX0 to RX Signal path 1376 and RX1 to RX Signal paths 1392, 1396, and 1398. Each RX Signal path includes delay buffers (e.g., 1378), NCOs (e.g., 1380), FIR filter and downsamplers (e.g., 1384, 1382), and power detectors (e.g., PD 1390). Note that gain multipliers (e.g., 1386), may also implement a constant phase rotation to the time domain signal. In such an embodiment, this is equivalent to a constant phase shift applied to each subcarrier, rather than a linearly increasing phase shift across the subcarriers, but nonetheless provides for an adequate approximation of a time delay for purposes of implementing electronic beam tilt. FIR 1382 may also include a notch filter for removing a component carrier that is not being processed by the given signal path. In some embodiments, the NCO 1380 may be used to apply a time-domain frequency shift that moves the desired component carrier to the low-pass passband of the notch filter 1382.

Figure 14:
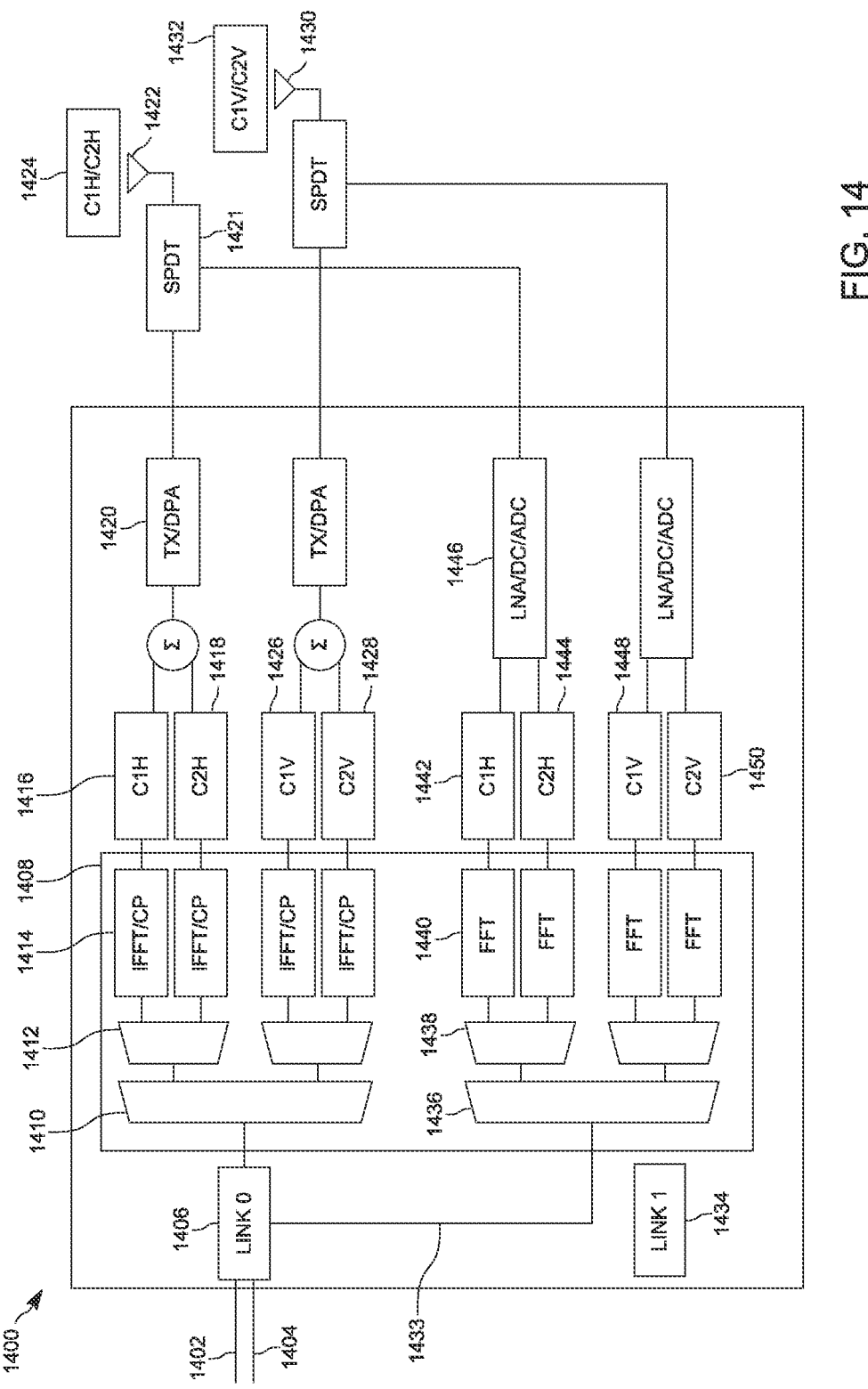
FIG. 14 shows signal processing flows through the transceiver device of FIGS. 12A, 12B, 13A and 13B for a dual-carrier, dual-polarized communication signal, in accordance with some embodiments.

FIG. 14 depicts a generalized configuration of example signal processing through the transceiver IC device of FIGS. 12A-B and 13A-B for a dual-carrier, dual-polarized communication signal, in accordance with some embodiments. More specifically, an example of signal processing configuration illustrated in FIG. 14 may be applicable in embodiments involving communication of data packets associated with two different carriers (e.g., two component carriers), with each carrier signal having two polarizations (e.g., horizontal and vertical polarizations, as described hereinbefore). In illustrative embodiments, the transceiver device is a transceiver IC. Further, in the example configuration of FIG. 14, the transceiver IC operates in a TDD mode within an OFDM modulated wireless network such as an LTE or 5G-based communication system.

As shown in FIG. 14, a transceiver device (IC) 1400 includes a first serial communication port 1406 (e.g., a first serial port transmitter/receiver, such a Serdes transmitter/receiver) (denoted as "Link 0" in FIG. 14) and a second serial communication port 1434 (e.g., a second serial port transmitter/receiver, such a Serdes transmitter/receiver) (denoted as "Link 1" in FIG. 14). Note, however, that although the transceiver IC is shown as having two separate serial communication ports (1406 and 1434), in the example embodiment of FIG. 14, only one of the ports 1406 and 1434 is being used. More specifically, as shown, only the serial communication port 1406 is connected to serial data links 1402 and 1404 for communicating data to/from the transceiver IC, while the serial communication port 1434 is not being actively used. However, in some embodiments, the transceiver IC may be further serially-connected to a second transceiver IC via the port 1434 (e.g., as in various embodiments described herein (see, e.g., FIGS. 2-4).

In general, as has been illustrated earlier, the transceiver IC may be configured to process four separate transmit component carriers and four separate receive component carriers. The transceiver ICs are configured with at least two separate transmit signal port paths (chains) and at least two separate receive signal port paths (chains), typically associated with two corresponding antenna radiating elements, although other configurations are possible, as described herein. Also, generally, the transceiver IC may include numerous signal processing elements, such as for example, an integrated digital signal processor (DSP) for converting frequency-domain digital data to/from time-domain digital data (via a number of iFFTs and FFTs), and for cyclic prefix addition and removal (in the embodiments where IQ data packets received by/transmitted from the transceiver IC are in the frequency domain), a plurality of integrated modulating digital power amplifiers (DPAs) for converting digital baseband time-domain signals to amplified analog RF signals, analog RF downconverters, and analog to digital converters, etc.

Referring to FIG. 14, in some embodiments, the serial communication port 1406 may receive (e.g., from a beamformer processor), via the serial data link 1402, data packet streams (e.g. four multiplexed data packet streams) for DL (downlink) transmission, where the packets include packets for a first component carrier (hereinafter, "a carrier C1") and IQ data packets for a second different component carrier (hereinafter, "a carrier C2"), for each of horizontal (H) and vertical (V) polarizations. For sake of brevity, the combinations of two different component carriers and the horizonal and vertical polarizations are denoted herein as "C1H," "C2H," "C1V," and "C2V," respectively. In an UL (uplink) direction, the serial communication port 1406 may receive IQ data packet streams (e.g., four multiplexed sets of IQ data for four sets of OFDM subcarriers) for each of the two carriers C1 and C2, for each of the two H and V polarizations, and transmit those (e.g., to the beamformer processor) via the serial data link 1404.

Note that the example transceiver IC configuration illustrated in FIG. 14 assumes that the data packets received at or transmitted from the serial port communication port 1406 contain frequency-domain subcarrier-specific digital IQ data. However, it should be understood that, in alternative embodiments, the transceiver IC 1400 may be configured to receive and transmit (e.g., to/from the beamformer processor) data packets containing time-domain subcarrier-specific digital IQ data instead (see, e.g., FIG. 12B and the corresponding description for one example of such configuration). In such alternative (time-domain only) embodiments, iFFT and FFT processing may be shifted from the transceiver IC to, e.g., the beamformer processor, as described hereinbefore. Additionally, in some embodiments, different-carrier packets destined for the same transceiver IC (containing either frequency-domain or time-domain IQ data) may contain unique carrier IDs and be addressed to the same transceiver IC.

As shown in FIG. 14, the serial communication port 1406 may be coupled to a signal processing unit 1408 that includes a number of elements configured to provide various digital signal processing functions, as, e.g., previously described in connection with FIGS. 12A_B and 13A_B. In some embodiments, the signal processing unit 1408 may be a single Digital Signal Processor (DSP) that performs all of the iFFT and FFT calculations and, e.g., other signal processing functions (not explicitly shown) associated with frequency-domain/time-domain I/Q data signals.

In operation, in a downlink (DL) transmit direction, the IQ packet data streams received via the Link 0 (1406) for DL transmission may be provided to a de-multiplexer (or a similar element, such as a section of memory according to a memory map) 1410 that may separate the received data into two respective data streams for two separate transmit chains: one stream of IQ data for a dual-carrier horizontally-polarized signal (C1H/C2H signal) to be transmitted out of a signal port coupled to a radiating element 1422 and another stream of IQ data for a dual-carrier vertically-polarized signal (C1V/C2V signal) to be transmitted out of a signal port coupled to a radiating element 1430. Elements 1412 (e.g., in the form of a DSP memory) may further separate out horizontal and vertical frequency-domain components (data points) for subcarriers of each respective component carrier C1 and C2, that are then sent to four separate iFFT/CP (IFFT/Cyclic Prefix) elements 1414 for frequency-domain to time-domain conversion to generate four separate discrete time-domain baseband data signals, two for each carrier frequency and two for each signal polarization. Although not explicitly shown, additional time-domain and frequency-domain processing may include, e.g., cyclic prefix addition, frequency offsets, phase and gain adjustments, filtering and sample rate conversions, etc.

In effect, as described above, the incoming data is split into four separate transmit paths. More specifically, illustrated in FIG. 14, the output of the unit 1408 includes (i) two separate discrete time-domain baseband data signals 1416 and 1418, denoted as C1H (1416) and C2H (1418), and (ii) two separate discrete time-domain baseband data signals 1426 and 1428, denoted as C1V (1426) and C2V (1428). As shown, following the frequency-domain to time-domain conversion, the time-domain signals C1H (1416) and C2H (1418) are added (summed) in time and C1V (1426) and C2V (1428) are added (summed) in time, and the results of the signal addition are provided to respective TX/DPA elements 1420 that generally represent transmit RF chains and digital power amplifiers to generate an amplified analog RF signal C1H/C2H (1424) for a horizontal signal port and an amplified analog RF signal C1V/C2V (1432) for a vertical signal port. The signals 1424 and 1432 are then provided to the corresponding radiating elements 1422 and 1430 via respective SPDTs for transmission. Note that although not explicitly shown, as described herein before, additional time-domain processing may include, e.g., additional sample rate conversions, Crest Factor Reduction (CFR), Digital pre-Distortion (DPD), etc.

In operation, in a receive direction, data-modulated dual-component carrier RF uplink signals may be received by the transceiver IC (1400) at the horizontal and vertical signal ports via the radiating elements 1422 and 1430. For ease of discussion and merely for the sake of example, assume that the amplified analog RF signal C1H/C2H (1424) and the amplified analog RF signal C1V/C2V (1432) are now uplink signals received by the transceiver IC. As shown in FIG. 14, the horizontally and vertically-polarized RF signals may be provided, via the respective SPDT, to separate LNA/DC/ADC elements 1446. The LNA/DC/ADC elements 1446 may perform RF to baseband signal conversion, analog to digital signal conversion, followed, e.g., by further time-domain processing (e.g., quadrature error correction, filtering, etc. (not explicitly shown)).

As further shown, the outputs of the elements 1446 include two copies of discrete time-domain baseband data signals. The two signals are filtered by FIR filters 1442,

1444, but one of the signals is first shifted in frequency by an NCO (within either the filter 1442 or 1444), to separate the component carriers. The separated carriers are denoted as C1H (1442) and C2H (1444). Two additional identical discrete time-domain baseband data signals are provided to filters 1426 and 1428, and generate time domain signals representing component carrier time domain signals (after NCO conversion and FIR filtering) denoted as C1V (provided by the filter 1448) and C2V (provided by the filter 1450). Those four separate time-domain baseband signals 1442, 1444, 1148, and 1450 (two for each carrier and two for each polarization) are next input into the DSP 1408 for signal processing, including CP removal and conversion (via FFT elements 1440) from time-domain IQ signal samples to frequency-domain IQ data representing the magnitude and phase of the respective subcarriers of the corresponding component carriers.

Hence, in the present embodiment, the receive RF signals are effectively split into four discrete time-domain baseband data signals to be processed on four separate receive paths. More specifically, the C1H signal (1442), the C2H signal (1444), the C1V signal (1448), and the C2V signal (1450) are parsed, such as by memory mapping, for four separate FFT signal processing operations (e.g., 1440) for time-domain to frequency-domain conversion (via FFT) to generate four separate frequency-domain IQ data packets (or streams of packets, with each packet in the stream representing a symbol time within a slot), for each of the two component carrier frequencies, for each signal polarization.

Although not explicitly shown, other time-to-frequency pre-conversion signal processing may include, e.g., sample rate conversion, filtering, cyclic prefix detection and removal, etc., as described hereinabove. Following the conversion performed by the FFT elements 1440, elements 1436, 1438 (e.g., in the form of a DSP memory and digital logic) may subsequently formulate IQ data packets for the different component carriers associated with both component carriers C1 and C2 for each polarization (H or V). Note that in alternative embodiments that do not involve the time-to-frequency domain conversion (as indicated above), the IQ data packets for the different component carriers associated with both component carriers C1 and C2 for each polarization (H or V) may be instead formulated in the time domain.

Figure 15:
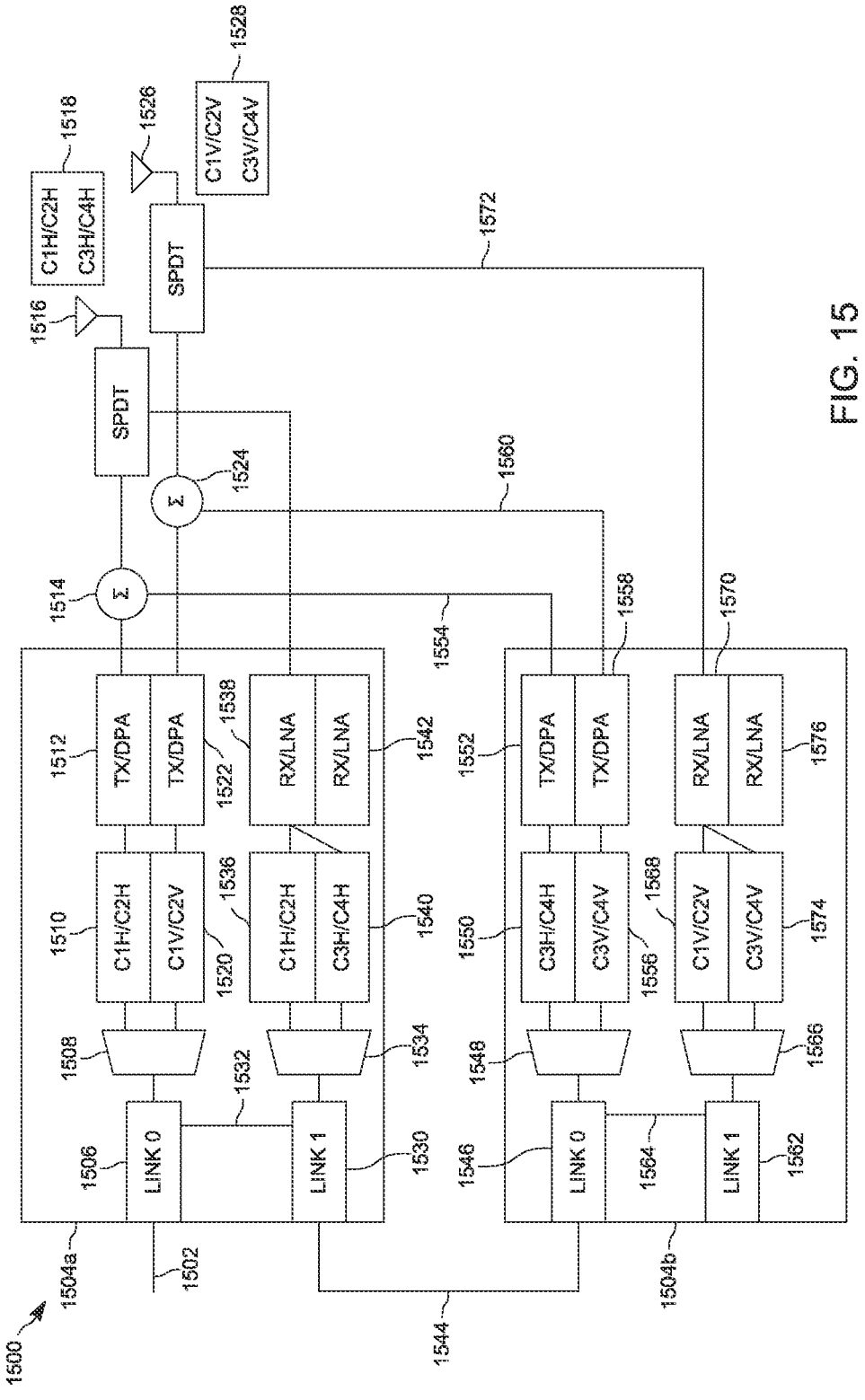
FIG. 15 shows signal processing flows through two serially connected transceiver devices of FIGS. 12A, 12B, 13A and 13B to generate a four-carrier, dual-polarized communication signal, in accordance with some embodiments.

As a further illustration of other embodiments, FIG. 15 depicts a generalized configuration of example signal processing through two serially-connected transceiver devices of FIGS. 12 and 13 to generate a four-carrier, dual-polarized communication signal, in accordance with some embodiments. More specifically, FIG. 15 shows a transceiver device architecture 1500 including a first transceiver device 1504a and a second transceiver device 1504b. As in FIG. 14, in illustrative embodiments, the transceiver device is a transceiver IC and operates in a TDD mode within an OFDM modulation system such as a 5G or LTE-based communication system. Note that various principles of operation and nomenclature described in connection with FIG. 14 apply to the embodiment of FIG. 15, and hence some details of operation will be omitted or generalized for ease of discussion.

Referring to FIG. 15, the first transceiver device (IC) 1504a includes a first serial communication port 1506 (e.g., a first serial port transmitter/receiver, such a Serdes transmitter/receiver) (denoted as "Link 0" in FIG. 15) and a second serial communication port 1530 (e.g., a second serial port transmitter/receiver, such a Serdes transmitter/receiver) (denoted as "Link 1" in FIG. 15). Similarly, the second transceiver device (IC) 1504b includes a first serial communication port 1546 (e.g., a first serial port transmitter/receiver, such as a Serdes transmitter/receiver) (denoted as "Link 0" in FIG. 15) and a second serial communication port 1562 (e.g., a second serial port transmitter/receiver, such a Serdes transmitter/receiver) (denoted as "Link 1" in FIG. 15). The transceiver devices (ICs) 1504a and 1504b are serially-connected via a bi-directional serial data link 1544.

In some embodiments, the serial communication port 1506 may receive (e.g., from a beamformer processor), via the bi-directional serial data link 1502, IQ data packet streams (eight sets of IQ data, packetized in four carrier-specific H/V combinations, or packetized as eight separate data packet streams in the embodiment depicted) for DL transmission, where the packets include IQ subcarrier data for four different component carriers (hereinafter, "a carrier C1," a "carrier C2," a "carrier C3," and a "carrier C4") for each of horizontal (H) and vertical (V) polarizations. For sake of brevity, the combinations of four different carriers on the horizontal and vertical polarizations are denoted herein as "C1H," "C2H," "C3H," "C4H," "C1V," "C2V," "C3V," and "C4V," respectively. In an UL (uplink) direction, the serial communication port 1506 may receive data packet streams (e.g., eight multiplexed data packet streams) for each of the four carriers C1, C2, C3, and C4 for each of the two H and V polarizations, and transmit those (e.g., to the beamformer processor) via the same bi-directional serial data link 1502.

Note that in the transceiver device architecture 1500 illustrated in FIG. 15, it will be assumed, by way of example, that the packets received at or transmitted from the serial port communication port 1506 contain frequency-domain subcarrier-specific digital IQ data. However, it should be understood that, in alternative embodiments, each transceiver device 1504a and 1505b may be configured accordingly (see, e.g., FIG. 12B and the corresponding description for one example of such configuration) so that the packets received at or transmitted from the serial port communication port 1506 (e.g., from/to the beamformer processor) contain time-domain subcarrier-specific digital IQ data instead. In this regard, the iFFT and FFT processing may be shifted from the transceiver-device (IC) side to the beamformer processor, as described hereinbefore.

In operation, in a DL transmit direction, the first transceiver IC (1504a) receives the packetized IQ data streams via the port 1506 for DL transmission. The first transceiver IC is configured to process data associated with the first two carriers, for each polarization, i.e., C1H, C2H, C1V, and C2V. Similar to the transmit operation described in connection with FIG. 14, the first transceiver IC (1504a) performs signal processing to separate (via a de-multiplexer or a similar element (1508) the received IQ data for the carriers C1 and C2 into respective data sets for two separate transmit paths: one stream of IQ data for a dual-carrier horizontally-polarized signal (C1H/C2H signal) and another stream of IQ data for a dual-carrier vertically-polarized signal (C1V/C2V signal). As generally shown by elements 1510 and 1520 (denoted as "C1H/C2H" and "C1V/C2"), as in FIG. 14, horizontal and vertical frequency-domain components for subcarriers of each respective component carrier C1 and C2 may be further split and processed by four separate iFFT/CP elements to generate four separate discrete time-domain baseband data signals (two for each component carrier and two for each signal polarization) that are subsequently pairwise added in time, where the results of the signal addition (C1H+C2H, and C1V+C2V) are provided to respective TX/DPA elements 1512 and 1522 to generate a modulated and amplified analog RF signal C1H/C2H for a horizontal signal port of transceiver IC 1504a and an amplified analog RF signal C1V/C2V for a vertical signal port of transceiver IC 1504a.

Unlike the embodiment of FIG. 14, the packet data associated with the other two carriers C3 and C4 received at the port 1506 are forwarded to the second transceiver IC (1504b) for processing. More specifically, the first transceiver IC (1504a) may be configured to forward the IQ data packets for the carriers C3 and C4, for each polarization, i.e., C3H, C4H, C3V, and C4V, to the second transceiver IC (1504b) for processing. In some embodiments, different carrier packets destined for either the first or second transceiver IC may contain unique carrier IDs and be addressed to the respective transceiver ICs through one or more identification fields in the IQ data packets. Hence the first transceiver IC may be configured to examine the incoming packets to determine which packets are intended for the first transceiver IC and which packets are to be forwarded to the second transceiver IC.

In some embodiments, the first transceiver IC may forward those packets over an internal path 1532 to its second serial communication port 1530 that is serially interconnected over the serial data link 1544 with the second transceiver ICs (namely, the serial communication port 1546 within the second transceiver IC). The second transceiver IC performs similar signal processing as that of the first transceiver IC via elements 1548, 1550, 1556, 1552, and 1558 (but with respect to the carriers C3 and C4) to output amplified analog RF signal C3H/C4H and C3V/C4V on the two signal ports of transceiver IC 1504b.

Subsequently, (i) the two signals C1H/C2H and C3H/C4H for the horizontal polarization may be combined via a summing element 1514 to produce a combined signal 1518 that is provided, via a first SPDT, to the radiating element 1516 for transmission, while (ii) the two signals C1V/C2V and C3V/C4V for the vertical polarization may be combined via a summing element 1524 to produce a combined signal 1528 that is provided, via a second SPDT, to the radiating element 1526 for transmission.

Similarly, in a receive direction, data-modulated four-carrier, dual-polarized RF uplink signals may be received by the two serially-connected transceiver ICs (1504a and 1504b) via the radiating elements 1516 and 1526 corresponding to the horizontal and vertical signal ports, respectively. As in FIG. 14, for ease of discussion and merely for the sake of example, assume that the analog RF signal C1H/C2H/C3H/C4H (1518) and the analog RF signal C1V/C2V/C3V/C4V (1628) are now the received uplink signals.

As shown in FIG. 15, the RF signal (1518) received on the horizontally polarized antenna element 1516 is provided, via the respective SPDT, to RX/LNA element 1538 within the first transceiver IC (1504a), while the RF signal (1528) received on the vertically-polarized antenna element is provided, via the respective SPDT, to RX/LNA element 1570 within the second transceiver IC (1504b). Similar to the processing illustrated in FIG. 14, each of the respective horizontal and vertical receive RX/LNA chains may be configured to perform RF to baseband signal conversion, analog to digital signal conversion, etc. to output a first four-carrier discrete time-domain domain signal on the horizontal receive path and a second four-carrier discrete time-domain domain signal on the vertical path. Hence, in some embodiments, the output of the RX/LNA 1538 element may be the first four-carrier discrete time-domain signal on the horizontally-polarized receive path and the output of the RX/LNA element 1570 the second four-carrier discrete time-domain signal on the vertically-polarized receive path. Note that, in this embodiment, each transceiver IC processes four component carriers in one of the RX/LNA elements, while the other RX/LNA elements (1542, 1576) is disabled.

Referring back to the signal processing illustrated in FIG. 15, with respect to the horizontal polarization, the output of the RX/LNA element 1538 includes discrete time-domain baseband data signals 1536 and 1540 to be processed on two separate signal-processing branches, with (i) the carriers C1 and C2, denoted as C1H/C2H (1536), being processed on one branch, and (ii) the carriers C3 and C4, denoted as C3H/C4H (1540), being processed on the other branch. Similarly, with respect to the vertical polarization, the output of the RX/LNA element 1570 may include discrete time-domain baseband data signals 1568 and 1574 to be processed on two separate signal-processing branches, with (i) the carriers C1 and C2, denoted as C1V/C2V (1568), being processed on one branch, and the carriers C3 and C4, denoted as C3V/C4V (1574), being processed on the other branch.

Various principles of operation of receive signal processing (including, e.g., a conversion from time-domain signal to frequency-domain IQ data), as described in connection with FIG. 14, will similarly apply on the receive path of the arrangement of FIG. 15 and will not be repeated here in detail. To illustrate, in some embodiments, the received C1H/C2H signal (1536) for the horizontal polarization may be separated from C3H/C4H by time domain FIR filtering, notch filtering, and the like, and further separated into the constituent component carriers C1H and C2H by time-domain filtering in one signal path to remove C2H components to obtain C1H, while another path includes complex multiplication via a numerically controlled oscillator (NCO) frequency to shift the C2H component to a desired baseband signal, followed by additional filtering to remove the residual components of C1H. Thus, one transceiver IC (1504a) may receive four component carriers on a single receive RF signal port (e.g., via either one of the H or V polarized antenna elements) and resolve the signal into four separate component carriers. In the embodiment shown, the four separate component carriers C1H, C2H, C3H, C4H are all separated using time domain signal processing, which are then sent to four separate FFT operations (all performed by a single DSP processor, in some embodiments) for time-domain to frequency-domain conversion. Similarly, the C1V/C2V/C3V/C4V signal (1528) for the vertical polarization, initially processed by a single LNA and ADC 1570, is processed via filtering, frequency offset (i.e., NCO modulation), and further filtering, to be conditioned for four separate FFT operations for time-domain to frequency-domain conversion. Although not explicitly shown, other time-to-frequency pre-conversion signal processing may include, e.g., sample rate sample rate conversion, filtering, cyclic prefix detection and removal, etc., as described hereinabove.

Following the time-to-frequency domain conversion, in the present embodiment, the elements 1534 and 1566 (on the horizontal and vertical path, respectively) subsequently route and/or store in memory, the IQ data points for the subcarriers associated with individual component carriers C1, C2, C3, and C4 for each respective polarization (H or V). The frequency-domain IQ data for all four component carriers, for each polarization, may be further combined into packet data streams (e.g., eight packet data streams, or four combined V/H packet streams) for transmission from the two serially-connected transceiver ICs (1504*a* and 1504*b*) over the bi-directional serial link 1502 (e.g., to the beam-former processor).

More specifically, in this regard, the frequency domain IQ packet data corresponding to vertically-polarized signals for the four carriers C1, C2, C3 and C4 may be received at the serial-communication port 1562 of the second (transceiver IC (1504*b*). The second transceiver IC may be configured to forward those data packets over an internal link 1564 to its other serial-communication port 1546 that is serially inter-connected over the serial data link 1544 with the first transceiver ICs (namely, the serial communication port 1530 within first transceiver IC). Although not explicitly shown in FIG. 15, in some embodiments, the packet data output by the element 1534 (for the horizontal polarization for all four carriers C1, C2, C3, C4) may be combined by multiplexing the packet data corresponding to vertically-polarized signals for the four carriers C1, C2, C3 and C4 that is received at the serial-communication port 1530 to produce IQ data packet streams to be sent onto the data link 1532 to the serial data link transceiver 1506 for communication to the beamformer processor via the serial-communication link 1502. Note, however, that in alternative embodiments that do not involve the time-to-frequency domain conversion (as indicated above), the frequency-domain IQ data for all four compo-nent carriers, for each polarization, may be combined into packet data streams (for transmission over the bi-directional serial link 1502 (e.g., to the beamformer processor)) in the time-domain instead.

Additionally, that in the embodiment of FIG. 15, the DL and UL signal processing is not performed symmetrically across the serially-connected transceiver ICs: the DL trans-mit signal processing is divided according to the component carriers (both H and V polarities of C1 and C2 being processed in first transceiver IC (1504*a*), and both polarities of C3 and C4 being processed in the second transceiver IC (1504*b*), while UL receive signal processing is divided according to the polarity (all H polarities of C1, C2, C3, and C4 being processed by the first transceiver IC (1504*a*), and all V polarities of C1, C2, C3, and C4 being processed by the second transceiver IC (1504*b*)). In some embodiments, this has the advantage on the transmit side of relaxing the bandwidth requirements on the transmit modulator to span only two component carriers (e.g., C1, C2 being processed in the first transceiver IC (1504*a*), and C3, C4 being pro-cessed in the second transceiver IC (1504*b*)), while having the advantage on the receive side of not splitting the receive RF signal to two different signal ports of the two different transceiver ICs prior to processing via downconversion and sampling via an ADC. Thus, in the embodiment described, a dual-polarized four-component-carrier system may be implemented using the wideband capabilities of the receiver portions of the transceiver IC to process a receive signal having a bandwidth of four component carriers, while also relaxing the transmit modulator/amplifier bandwidth requirements to accommodate a transmit signal having a bandwidth of only two component carriers.

The invention claimed is:

1. A method comprising:
receiving a first-tier beamformed frequency-domain in-phase and quadrature (IQ) data packet and a plurality of second-tier beamformed frequency-domain IQ data packets at a transceiver integrated circuit (IC) subarray having a plurality of interconnected transceiver ICs, the transceiver ICs interconnected via a plurality of serial data connections;

54 at each transceiver IC of the transceiver IC subarray:
forming a multi-tier beamformed frequency-domain IQ data set by combining beamformed frequency-do-main IQ data from the first-tier beamformed fre-quency-domain IQ data packet with beamformed frequency-domain IQ data from selected ones of the second-tier beamformed frequency-domain IQ data packets of the plurality of second-tier beamformed frequency-domain IQ data packets;
generating a discrete-time-domain signal from the multi-tier beamformed frequency-domain IQ data set using a digital signal processor (DSP) within the transceiver IC;
generating a modulated radio frequency (RF) signal from the discrete-time-domain signal; and,
transmitting a multi-tier beamformed signal by transmit-ting respective modulated RF signals from the trans-ceiver ICs of the transceiver IC subarray via a corre-sponding adjacent antenna element subarray.

2. The method of claim 1 wherein receiving a first-tier beamformed frequency-domain IQ data packet and a plu-rality of second-tier beamformed frequency-domain IQ data packets at a transceiver integrated circuit (IC) subarray further comprises:
forwarding the first-tier beamformed frequency-domain IQ data packet from a first transceiver IC of the transceiver IC subarray to additional transceiver ICs of the transceiver IC subarray for common processing; and,
forwarding only a subset of the second-tier beamformed frequency-domain IQ data packets of the plurality of second-tier beamformed frequency-domain IQ data packets from the first transceiver IC to the additional transceiver ICs.

3. The method of claim 2 wherein the subset of the second-tier beamformed frequency-domain IQ data packets is identified according to packet headers.

4. The method of claim 1 wherein combining beamformed frequency-domain IQ data from the first-tier beamformed frequency-domain IQ data packet with beamformed fre-quency-domain IQ data from selected ones of the second-tier beamformed frequency-domain IQ data packets com-prises concatenating beamformed frequency-domain IQ data from the first-tier beamformed frequency-domain IQ data packet with the beamformed frequency-domain IQ data from selected ones of the second-tier beamformed fre-quency-domain IQ data packets prior to a frequency-to-time domain conversion.

5. The method of claim 1 wherein combining beamformed frequency-domain IQ data from the first-tier beamformed frequency-domain IQ data packet with beamformed fre-quency-domain IQ data from selected ones of the second-tier beamformed frequency-domain IQ data packets com-prises forming a weighted sum of beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion.

6. The method of claim 5 wherein the weighted sum is calculated according to beamforming weights received from a beamformer.

7. The method of claim 1 wherein combining beamformed frequency-domain IQ data from the first-tier beamformed frequency-domain IQ data packet with beamformed fre-quency-domain IQ data from selected ones of the second-tier beamformed frequency-domain IQ data packets com-prises:

converting the beamformed frequency-domain IQ data from the first-tier beamformed frequency-domain IQ data packet to a first-tier beamformed time-domain signal;

converting the beamformed frequency-domain IQ data from selected ones of the second-tier beamformed frequency-domain IQ data packets to a second-tier beamformed time-domain signal; and, adding the first-tier beamformed time-domain signal and the second-tier beamformed time-domain signal.

8. The method of claim 7 wherein the first-tier beamformed frequency-domain IQ data packet and the selected ones of the second-tier beamformed frequency-domain IQ data packets are associated with different component carriers.

9. The method of claim 1 wherein receiving the first-tier beamformed frequency-domain IQ data packet and a plurality of second-tier beamformed frequency-domain IQ data packets further comprises receiving second-tier beamformed frequency-domain IQ data packets for processing by transceiver ICs at an end of the transceiver IC subarray prior to receiving second-tier beamformed frequency-domain IQ data packets for processing by transceiver ICs at a beginning of the transceiver IC subarray.

10. The method of claim 1 wherein transmitting the multi-tier beamformed signal further comprises transmitting respective modulated RF signals from transceiver ICs of a plurality of transceiver IC subarrays via a corresponding plurality of adjacent antenna element subarrays.

11. An apparatus comprising:

a beamformer processor configured to generate a first-tier beamformed frequency-domain in-phase and quadrature (IQ) data packet and a plurality of second-tier beamformed frequency-domain IQ data packets;

a transceiver integrated circuit (IC) subarray connected to the beamformer processor and having a plurality of interconnected transceiver ICs interconnected via a plurality of serial data connections;

each transceiver IC of the transceiver IC subarray comprising:

a digital signal processor (DSP) configured to form a multi-tier beamformed frequency-domain IQ data set and to generate a discrete-time-domain signal from the multi-tier beamformed frequency-domain IQ data set;

a radio frequency modulator configured to generate a modulated radio frequency (RF) signal from the discrete-time-domain signal; and, an antenna element subarray connected to the transceiver IC subarray configured to transmit a multi-tier beamformed signal by transmitting respective modulated RF signals from the transceiver ICs of the transceiver IC subarray.

12. The apparatus of claim 11 wherein the transceiver IC subarray comprises a first transceiver IC having a packet header processor configured to forward the first-tier beamformed frequency-domain IQ data packet from the first transceiver IC to additional transceiver ICs of the transceiver IC subarray for common processing and configured to forward only a subset of the second-tier beamformed frequency-domain IQ data packets from the first transceiver IC to the additional transceiver ICs.

13. The apparatus of claim 12 wherein the packet header processor is configured to identify the subset of the second-tier beamformed frequency-domain IQ data packets according to packet headers.

14. The apparatus of claim 11 wherein the DSP is configured to combine beamformed frequency-domain IQ data from the first-tier beamformed frequency-domain IQ data packet with beamformed frequency-domain IQ data from selected ones of the second-tier beamformed frequency-domain IQ data packets by concatenating beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion.

15. The apparatus of claim 11 wherein the DSP is configured to combine beamformed frequency-domain IQ data from the first-tier beamformed frequency-domain IQ data packet with beamformed frequency-domain IQ data from selected ones of the second-tier beamformed frequency-domain IQ data packets by forming a weighted sum of beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion.

16. The apparatus of claim 15 wherein the DSP is configured to calculate the weighted sum according to beamforming weights received from the beamformer processor.

17. The apparatus of claim 11 wherein the DSP is configured to:

convert the beamformed frequency-domain IQ data from the first-tier beamformed frequency-domain IQ data packet to a first-tier beamformed time-domain signal;

convert the beamformed frequency-domain IQ data from selected ones of the second-tier beamformed frequency-domain IQ data packets to a second-tier beamformed time-domain signal; and, add the first-tier beamformed time-domain signal and the second-tier beamformed time-domain signal.

18. The apparatus of claim 17 further comprising a packet header processor configured to identify separate component carriers associated with the first-tier beamformed frequency-domain IQ data packet and the selected ones of the second-tier beamformed frequency-domain IQ data packets.

19. The apparatus of claim 11 wherein the beamformer processor is configured to transmit the second-tier beamformed frequency-domain IQ data packets for processing by transceiver ICs at an end of the transceiver IC subarray prior to transmitting second-tier beamformed frequency-domain IQ data packets for processing by transceiver ICs at a beginning of the transceiver IC subarray.

20. The apparatus of claim 11 further comprising a plurality of transceiver IC subarrays and a corresponding plurality of adjacent antenna element subarrays, configured to transmit the multi-tier beamformed signal.

* * * * *